United States Patent
Eidsmore

(10) Patent No.: US 11,440,752 B2
(45) Date of Patent: Sep. 13, 2022

(54) VEHICLE LOADING SYSTEM

(71) Applicant: MASTERHAUL LLC, Santa Cruz, CA (US)

(72) Inventor: Paul G. Eidsmore, Santa Cruz, CA (US)

(73) Assignee: MASTERHAUL LLC, Santa Cruz, CA (US)

(*) Notice: Subject to any disclaimer, the term of this patent is extended or adjusted under 35 U.S.C. 154(b) by 0 days.

(21) Appl. No.: 17/051,652

(22) PCT Filed: Apr. 30, 2019

(86) PCT No.: PCT/US2019/029949
§ 371 (c)(1),
(2) Date: Oct. 29, 2020

(87) PCT Pub. No.: WO2019/213104
PCT Pub. Date: Nov. 7, 2019

(65) Prior Publication Data
US 2021/0053780 A1    Feb. 25, 2021

Related U.S. Application Data

(60) Provisional application No. 62/664,918, filed on Apr. 30, 2018.

(51) Int. Cl.
*B65G 67/02* (2006.01)
*B60P 1/02* (2006.01)
(Continued)

(52) U.S. Cl.
CPC ............ *B65G 67/02* (2013.01); *B60P 1/02* (2013.01); *B60P 1/365* (2013.01); *B60P 1/38* (2013.01);
(Continued)

(58) Field of Classification Search
CPC .. B60P 1/02; B60P 1/4414; B60P 1/64; B65G 67/02; B66F 7/0625; B66F 9/06
See application file for complete search history.

(56) References Cited

U.S. PATENT DOCUMENTS 3,768,673 A    10/1973  Nydam et al.
4,288,195 A *   9/1981  Brewer ................ B66F 7/08
                                              187/269
(Continued)

OTHER PUBLICATIONS

PCT/US2019/029949, International Search Report and Written Opinion, dated Aug. 21, 2019.
Extended European Search Report for Application No. 19796834.0 dated Jan. 19, 2022.

*Primary Examiner* — Mark C Hageman
(74) *Attorney, Agent, or Firm* — Fay Sharpe LLP

(57) ABSTRACT

A loading/unloading system for an associated truck bed includes first and second laterally spaced rails configured for re) receipt in the associated truck bed. First and second support leg assemblies are operatively associated with the first and second rails, respectively. First and second motors are received on the first and second leg assemblies, respectively, and are configured to selectively raise and lower the first and second rails. A sensor assembly is mounted on the rails to monitor the position of the first rail relative to the second rail. The sensor assembly is interconnected to the first and second motors for maintaining the rails at the same height relative to one another.

30 Claims, 92 Drawing Sheets

(51) Int. Cl.
*B60P 1/36* (2006.01)
*B60P 1/38* (2006.01)
*B60P 1/44* (2006.01)
*B60P 1/64* (2006.01)
*B60P 7/08* (2006.01)
*B60P 9/00* (2006.01)
*B66F 7/06* (2006.01)
*B66F 9/06* (2006.01)
*B66F 9/19* (2006.01)

(52) U.S. Cl.
CPC .............. *B60P 1/4414* (2013.01); *B60P 1/649* (2013.01); *B60P 1/6427* (2013.01); *B60P 7/08* (2013.01); *B60P 9/00* (2013.01); *B66F 7/0683* (2013.01); *B66F 9/06* (2013.01); *B66F 9/19* (2013.01); *B66F 9/195* (2013.01); *B65G 2203/0283* (2013.01); *B65G 2203/044* (2013.01)

(56) References Cited

U.S. PATENT DOCUMENTS

| | | | | |
|---|---|---|---|---|
| 6,024,528 | A * | 2/2000 | Taylor | A61G 3/062 |
| | | | | 414/921 |
| 6,431,319 | B1 * | 8/2002 | Myers | B66F 7/0625 |
| | | | | 187/244 |
| 9,540,220 | B2 * | 1/2017 | Stewart | B66F 7/0625 |
| 10,577,201 | B2 * | 3/2020 | Putcha | B65G 67/08 |
| 10,940,786 | B2 * | 3/2021 | Weinmeister | B60P 1/4442 |
| 2014/0259420 | A1 | 9/2014 | Lambarth et al. | |
| 2015/0003944 | A1 | 1/2015 | Eidsmore | |
| 2016/0159264 | A1 * | 6/2016 | Ochenkowski | B60P 1/4442 |
| | | | | 414/544 |
| 2016/0167888 | A1 * | 6/2016 | Messina | B65G 41/008 |
| | | | | 198/315 |
| 2016/0287454 | A1 | 10/2016 | Magill et al. | |
| 2016/0367416 | A1 | 12/2016 | Lambarth et al. | |

\* cited by examiner

VEHICLE LOADING SYSTEM

BACKGROUND

This application is related to U.S. Pat. No. 9,545,869, issued Jan. 17, 2017, and claims the priority benefit of U.S. provisional application Ser. No. 62/664,918, filed Apr. 30, 2018, the entire disclosures of which are expressly incorporated herein by reference.

This invention relates to an apparatus for loading and unloading cargo, equipment, materials, tools, mulch, topsoil, debris, etc. (generally referred to herein as cargo) from the cavity or truck bed (generally referred to herein as a truck bed) of truck, SUV, hatchback of a vehicle, etc. (generally referred to herein as a vehicle). A need exists for a vehicle platform, bin, storage container, or the like that can be easily loaded or unloaded from the truck bed, or alternatively pivoted relative to the vehicle for dumping the contents thereof. U.S. Pat. No. 9,545,869 discloses a suitable system and apparatus for loading/unloading or dumping cargo from a truck bed. However, a need exists for an arrangement that provides still further improvements, and other features and benefits.

SUMMARY

Benefits and advantages of the present disclosure will become more apparent from reading and understanding the following detailed description.

DETAILED DESCRIPTION

Figure 1:
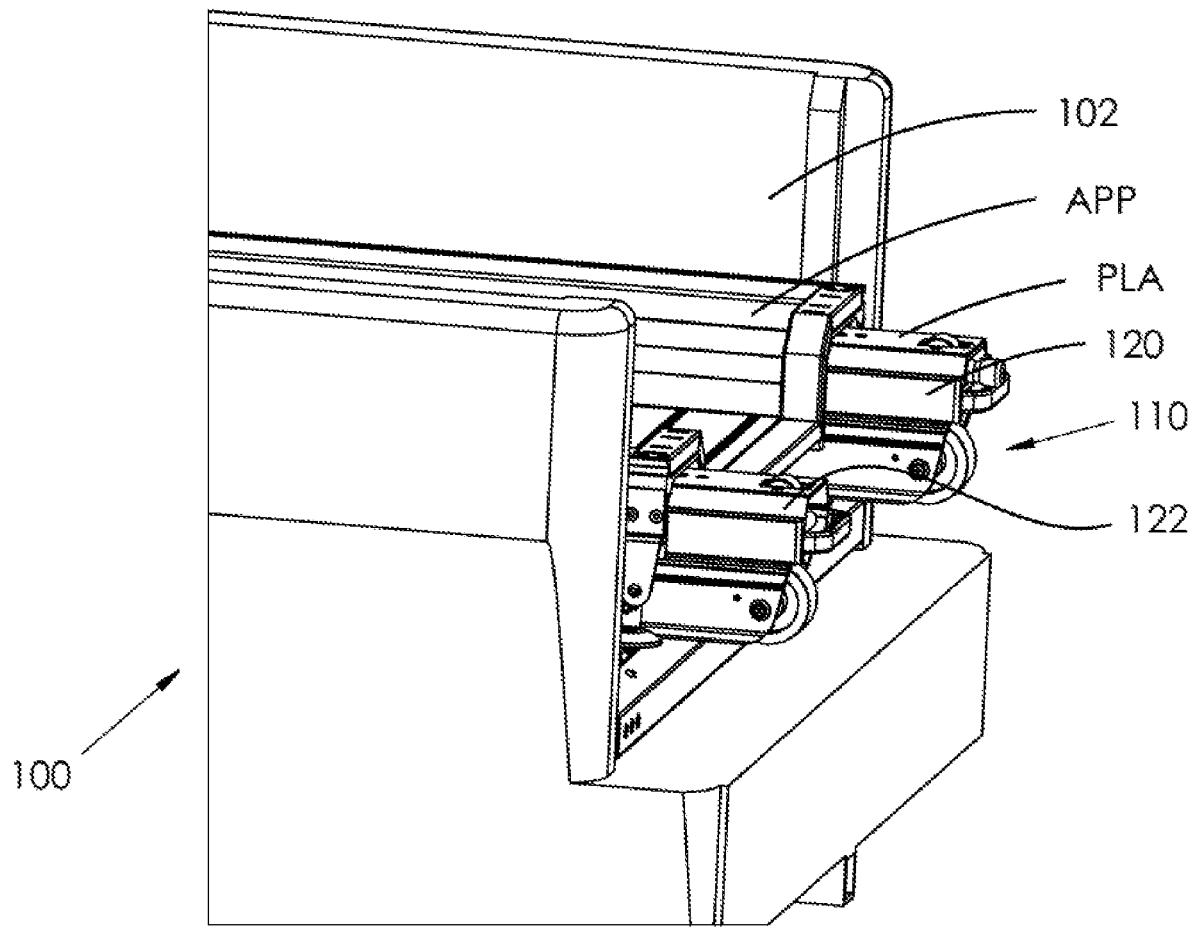
FIGS. 1-14 are images that illustrate a progressive series of steps of unloading or removing a cargo carrier or deck from a truck bed (and likewise, if reversed, FIGS. 14-1 illustrate progressive steps for loading a cargo carrier or bin into a truck bed).

In FIG. 1, a rear portion of an automotive vehicle such as a pickup truck 100 is illustrated, although it will be appreciated that the vehicle could also be an SUV, van, or still another type of vehicle with an enlarged storage compartment with ease of rearward access. The tailgate has been removed from the vehicle 100 and provides access to a cavity or truck bed 102. A loading/unloading system 110 is mounted in the truck bed 102 and the system includes, for example, truck rails TR, a power loader assembly PLA, and an application deck/(bin in other embodiments) APP/B as will be individually and collectively described in greater detail below. FIG. 1 illustrates initial advancement of the power loader assembly PLA rearwardly from a nested, stowed location within the truck bed 102 and particularly nested with the truck rails TR and the application deck/bin APP/B of the system 110. Suitable controls (not shown) for operation of the loading/unloading system 110 including advancement/retraction of the power loader assembly PLA from the truck bed 102 may be provided in the vehicle 100, adjacent the truck bed, or via a remote controller, e.g. wired or wireless controller, tablet/phone app, etc.

Figure 2:
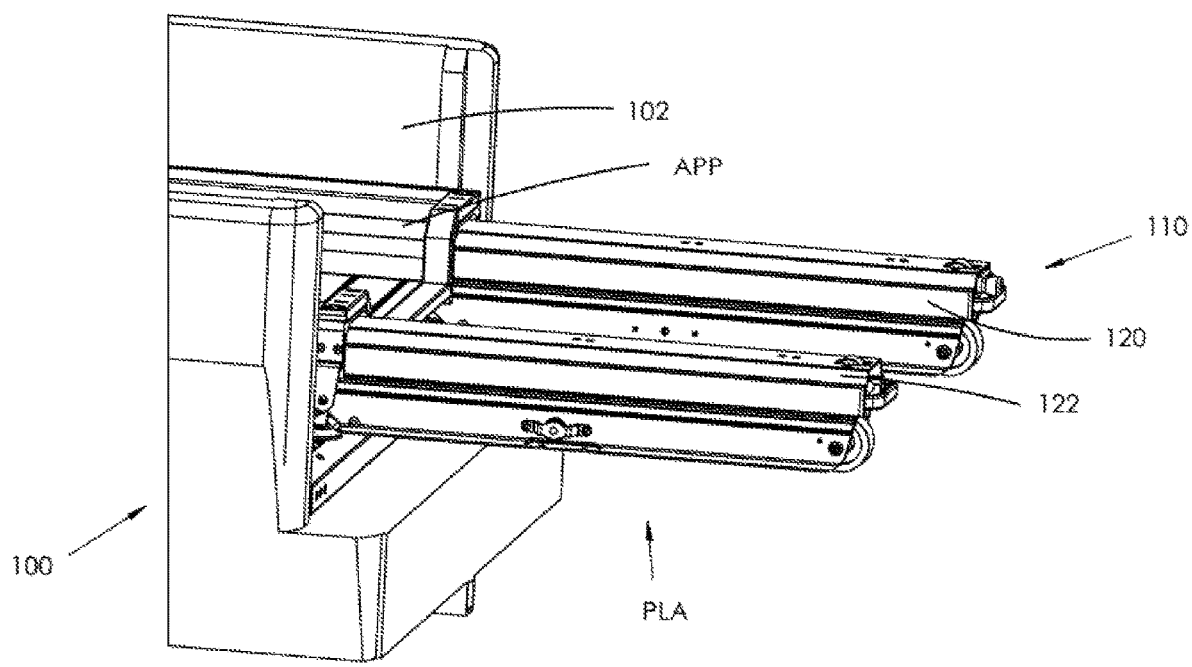
Figure 3:
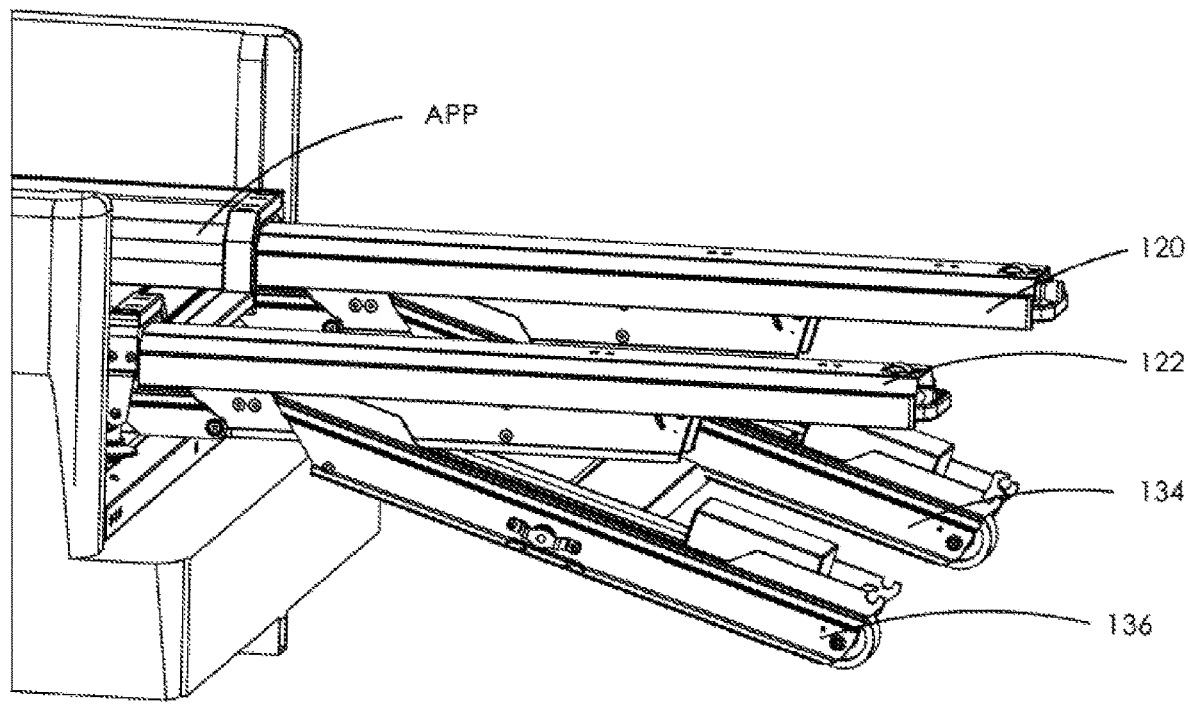
Figure 4:
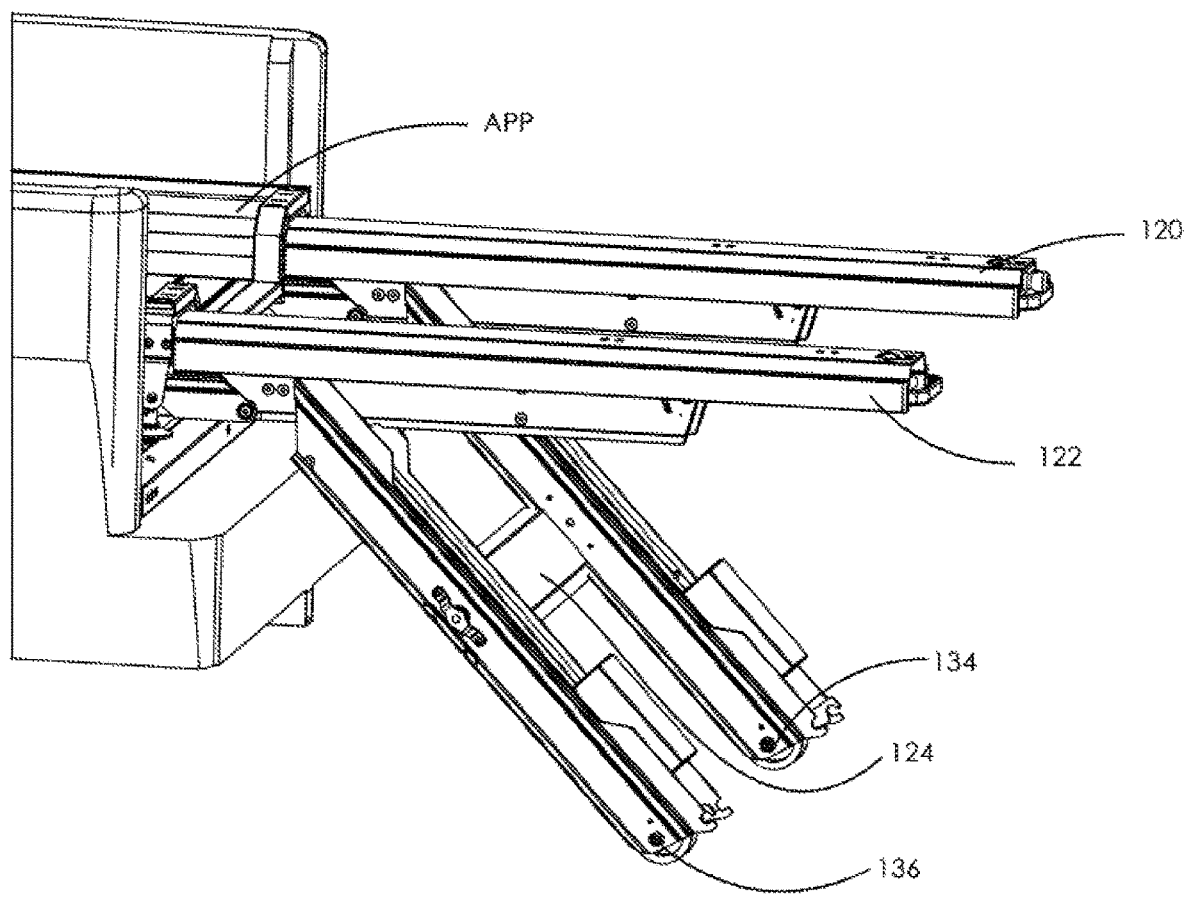
Figure 5:
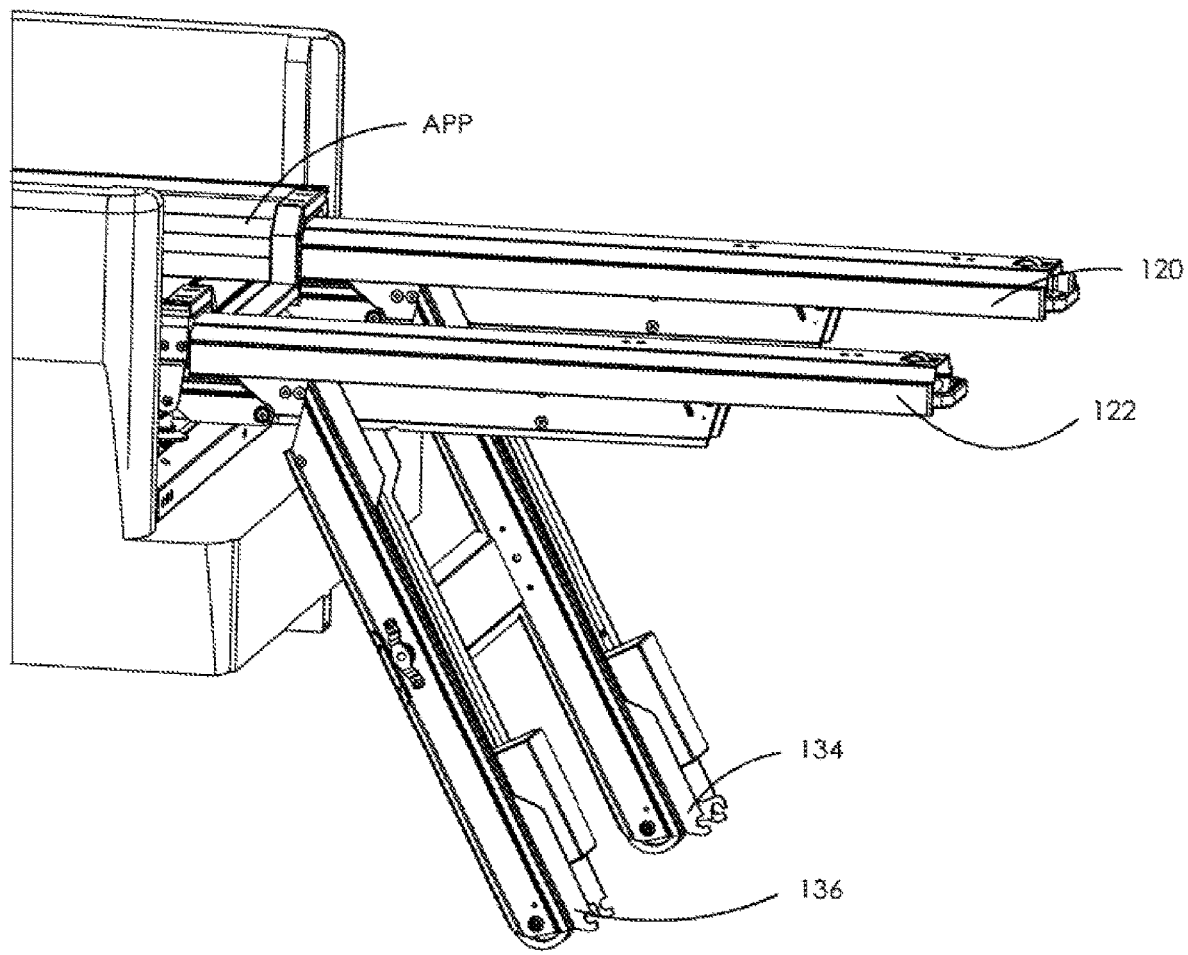
Figure 6:
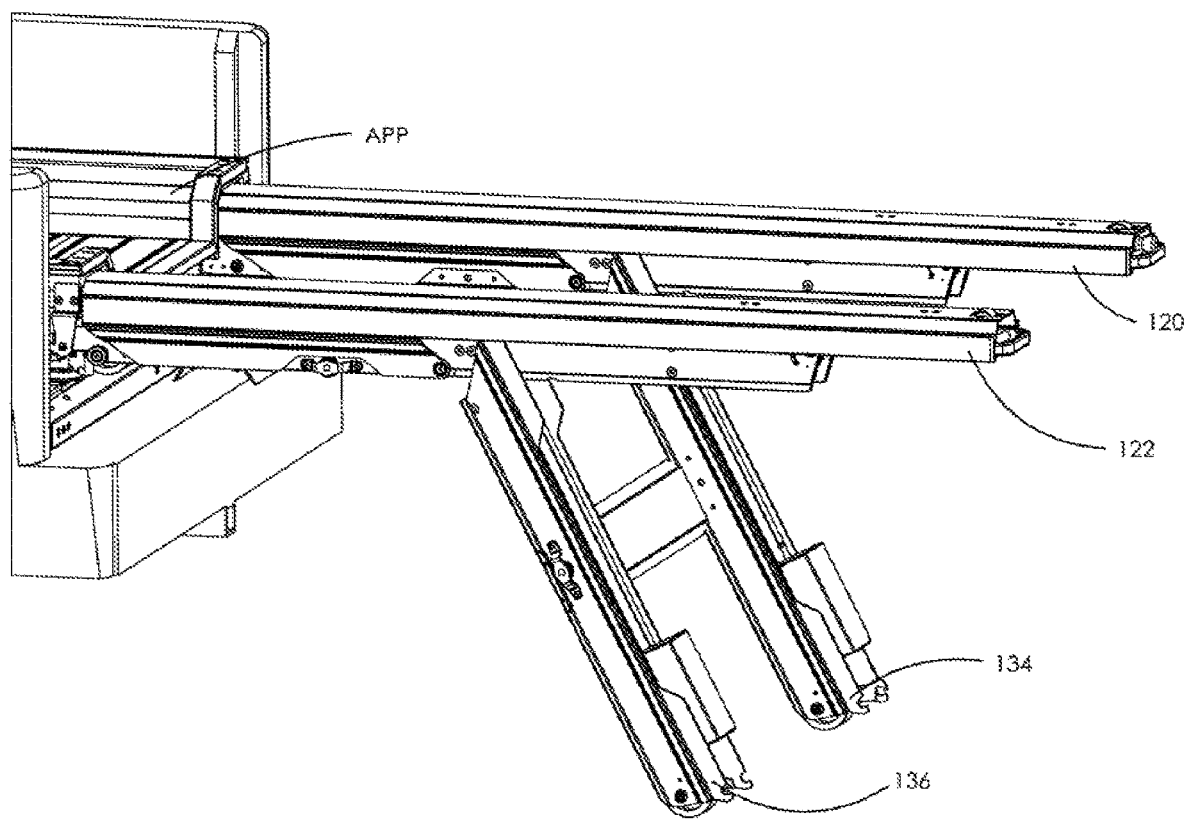
Figure 7:
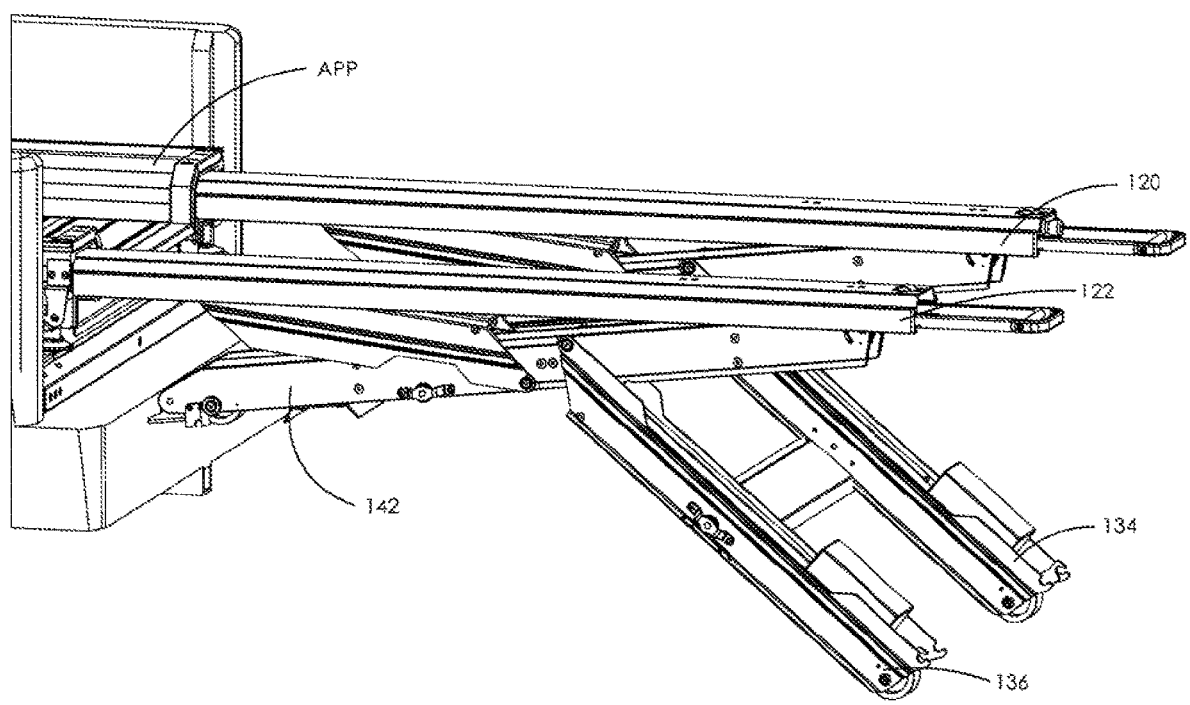
Figure 8:
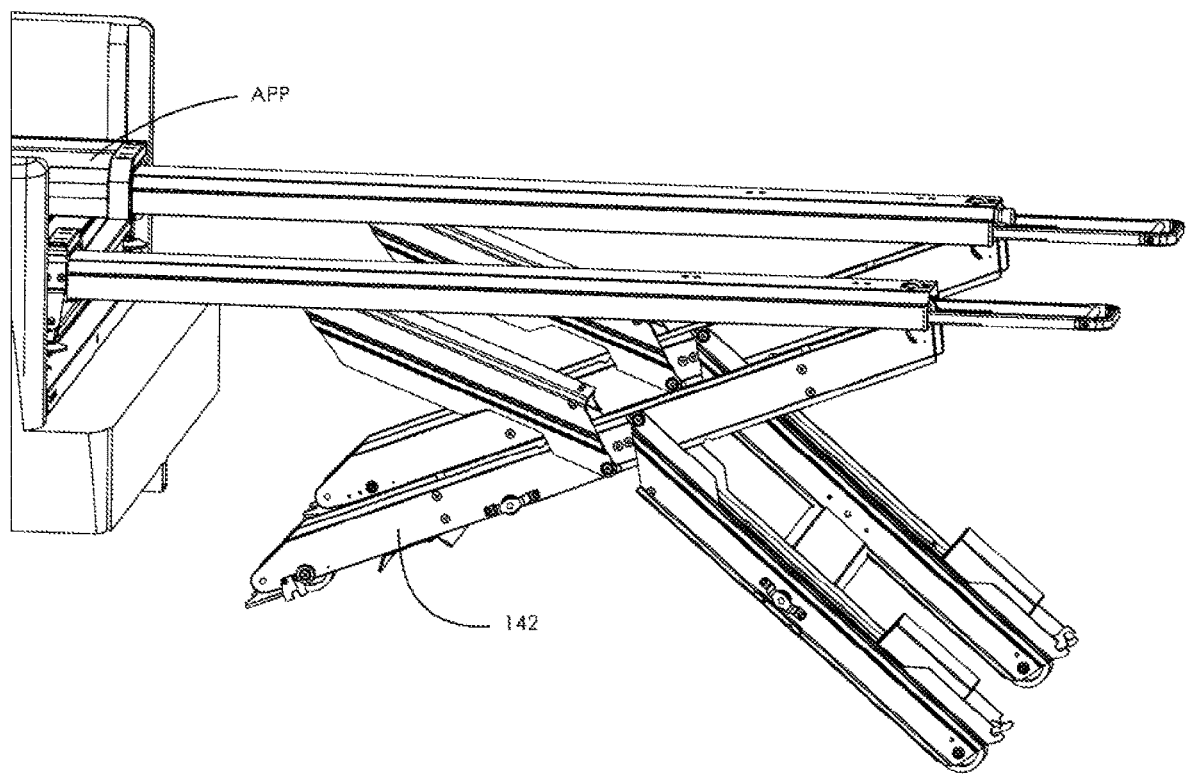

With continued reference to FIG. 1 and additional reference to FIGS. 2-8, the power loader assembly PLA includes first and second elongated, linear transfer rails 120, 122. The transfer rails 120, 122 are laterally spaced apart and disposed in parallel relation and maintained in this orientation by laterally interconnecting cross rails 124 (that actually interconnect the legs as will become more apparent below) (FIG. 4). The first transfer rail 120 has the same construction as the second transfer rail 122 so that description of one applies fully to the other unless noted otherwise, and likewise each cross rail 124 is substantially the same as other cross rails that interconnect the transfer rails. In a preferred arrangement, the transfer rails 120, 122 are inverted, substantially U-shaped channels such as extruded aluminum channels for light weight, strength, ease of construction, and functionality. This of course does not preclude use of other configurations, other materials, or other manners of forming the transfer rails 120, 122.

From the completely nested, stored position within the truck bed 102, the power loader assembly PLA may be selectively operated to load and unload the application deck/bin APP/B that is dimensioned or configured to receive various types of cargo. The power loader assembly PLA is advanced via motive power rearwardly relative to the remainder of the loading/unloading system 110. As shown in FIGS. 1 and 2, the transfer rails 120, 122 and associated leg assemblies 130, 132 of the power loader assembly are advanced rearwardly from the truck bed 102. Initially, the leg assemblies 130, 132 are in a collapsed condition and thus transfer rails 120, 122 and leg assemblies are disposed in linear, parallel relation (FIG. 2). In FIG. 3, advancement of the power loader assembly PLA is temporarily suspended/terminated while first or rear legs 134, 136, and particularly rear ends of half-leg portions 134a, 136a which are interconnected by a first cross rail 124a, pivot downwardly away from the transfer rails 120, 122 (note progressive pivoting or rotation illustrated in FIGS. 3-5). Rollers or wheels 138 are located at the terminal ends of the half-leg portions 134a, 136a and allow the leg assemblies 130, 132 to roll over the ground surface. Thus, once the half-leg portions 134a, 136a are fully pivoted and the rollers 138 engage the ground surface, the power loader assembly PLA is further advanced rearwardly from the truck bed 102 (compare FIGS. 5 and 6).

At this point in the unloading process, second or front legs 140, 142 begin to deploy from the parallel arrangement with the transfer rails 120, 122 toward engagement with the ground surface. Comparing FIGS. 7 and 8, it is evident that the transfer rails 120, 122 and first ends of the front legs 140, 142 that remain connected to the transfer rails move a limited distance relative to one another as the opposite, ground contacting end of the front legs move toward the ground surface. Pads 150 are provided at the ground contacting end of the front legs 140, 142. The pads 150 sit on the ground surface when the power loader assembly PLA is lifted. This prevents the power loader assembly PLA from rolling during the unloading and loading of cargo. When the power loader assembly PLA is lifted a small distance off the ground, rollers/wheels 152 located adjacent or behind the pads 150 contact the ground surface allowing the power loader assembly to be rolled back and forth on the ground surface.

Figure 9:
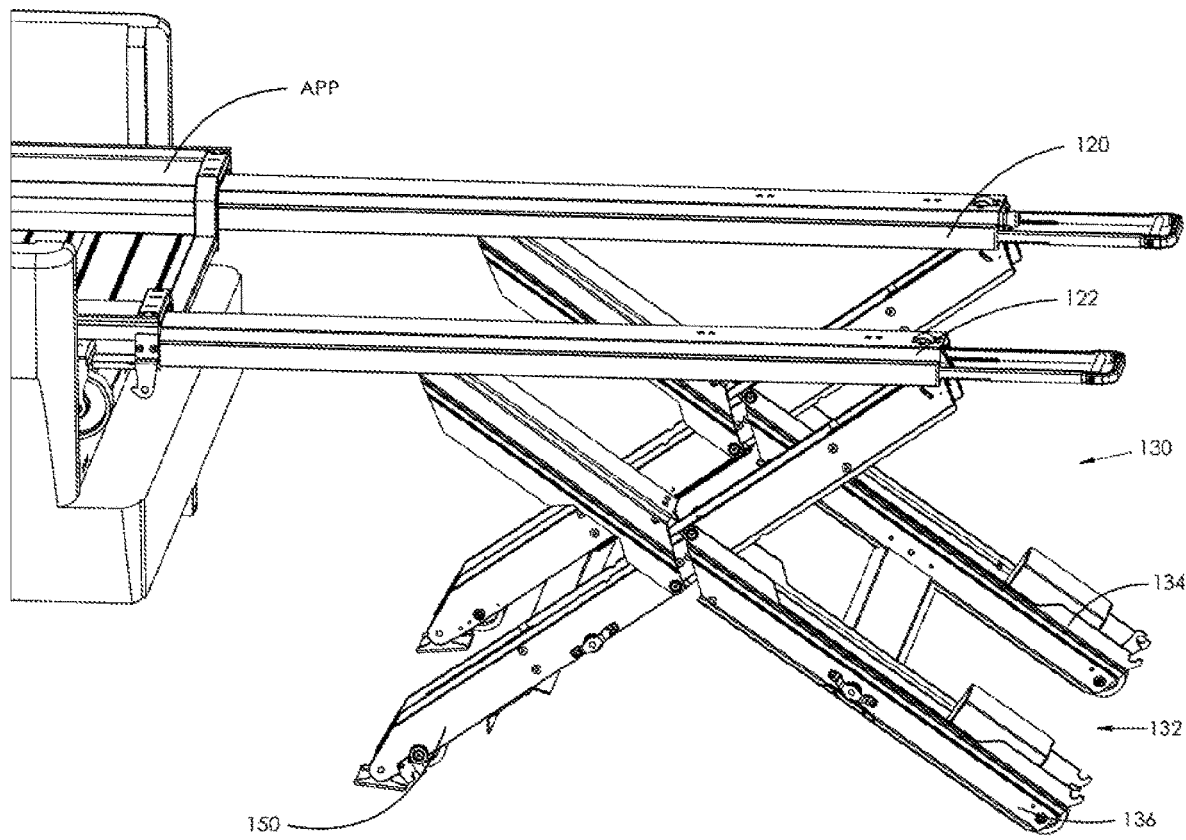
Figure 10:
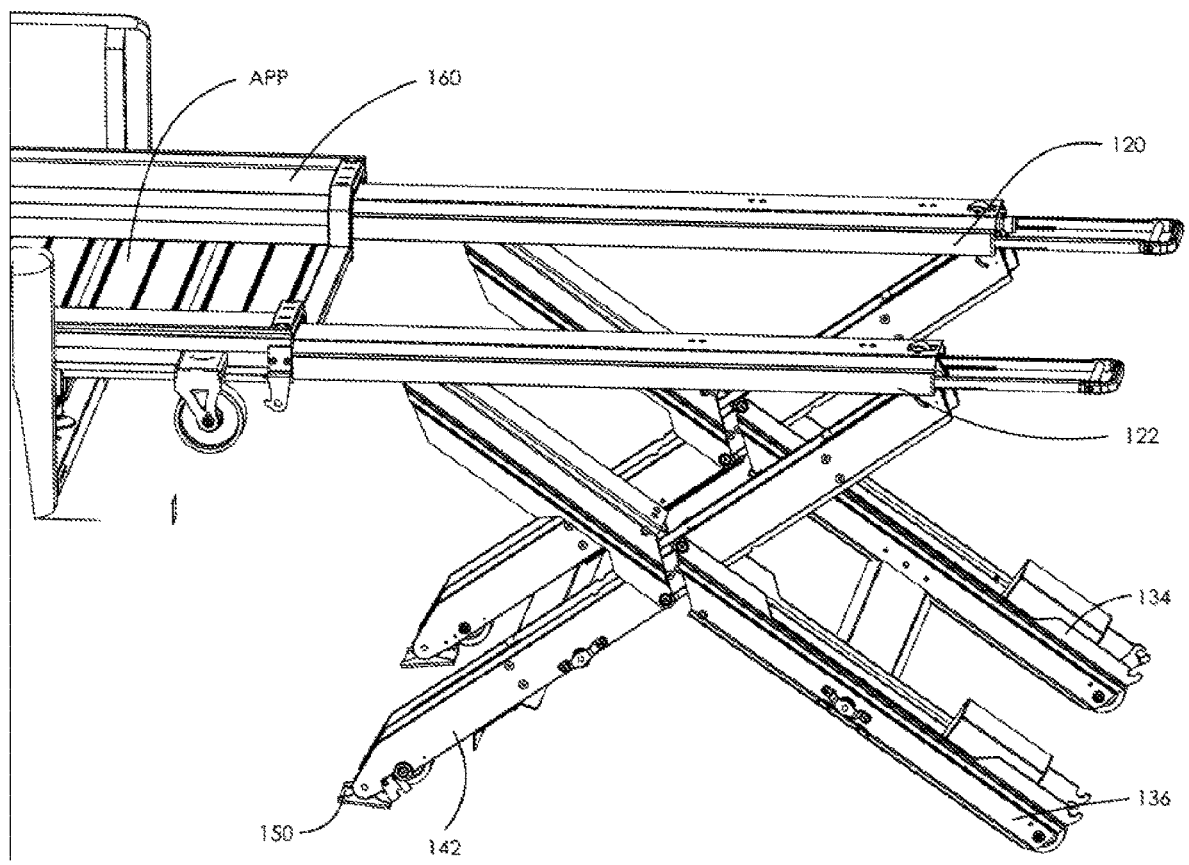
Figure 11:
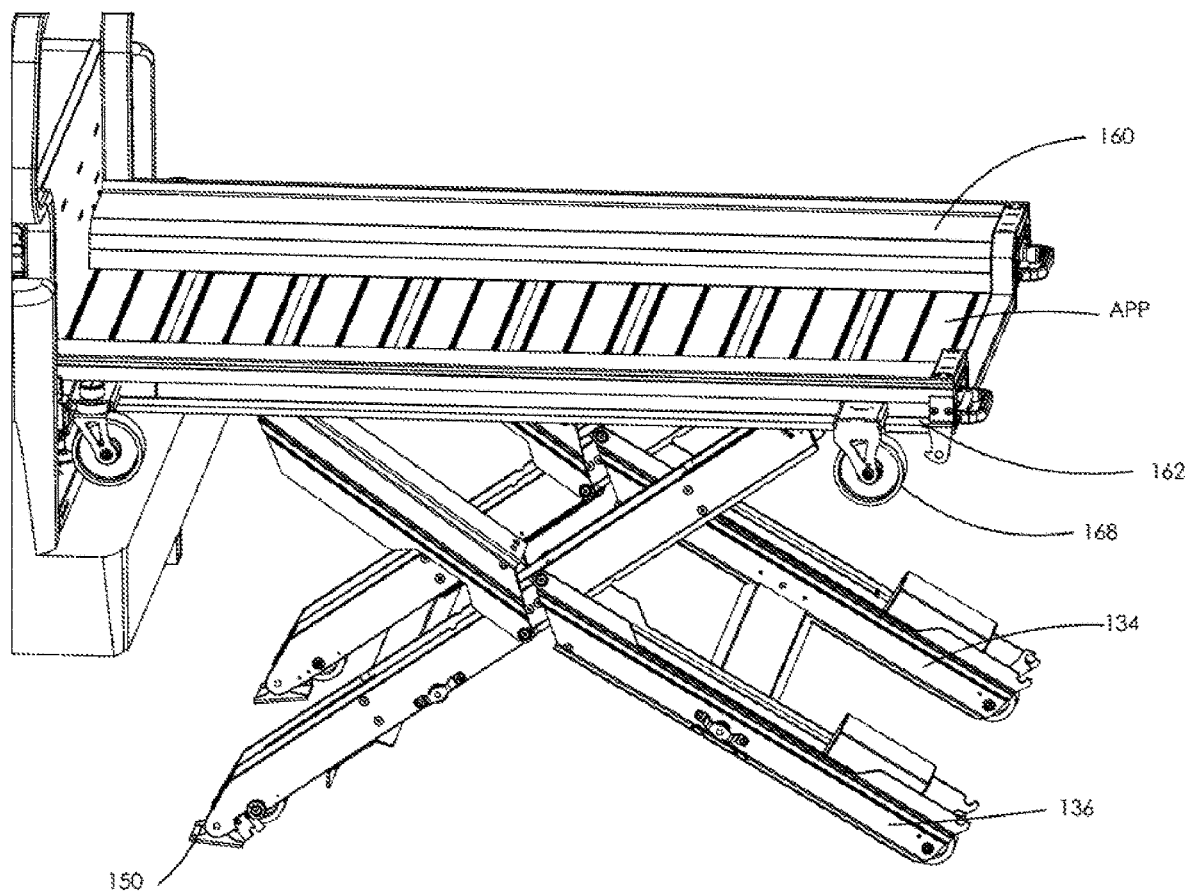

FIGS. 9-11 particularly illustrate movement of the application deck/bin APP/B from the truck bed 102 along the first and second transfer rails 120, 122 of the power loader assembly PLA. FIGS. 9 and 10 illustrate rearward movement of the application deck/bin APP/B along the transfer rails 120, 122 specifically, application deck/bin rails 160, 162 are configured for sliding movement along the transfer rails. The application deck/bin rails 160, 162 are also preferably extruded, U-shaped inverted channels dimensioned for receipt over the transfer rails 120, 122. Guide rollers are provided along rails 160, 162 to facilitate sliding receipt of the application deck/bin rails relative to the transfer rails 120, 122. Extending between the rails 160, 162 is(are) a floor panel(s) 164 that is(are) received along opposite, lateral edges in the grooves provided on the facing surfaces of the application deck/bin rails. This creates a weld-free, fastener-free, all aluminum deck/bin assembly APP/B. In addition, grooves 166 may also be formed in outer lateral faces of the application deck/bin rails 160, 162 to receive bin side supports or for installing tie-down brackets which will be described further below. The grooves 166 also receive casters 168 therein that slide relative to the rails 160, 162. Thus, as the application deck/bin APP/B is rolled into and out of the truck along the truck rails TR, the casters 168 can move a limited distance relative to rails 160, 162 so that the movement of the application deck/bin is not impeded if the casters were to engage the truck wheel wells that extend into the truck bed 102. Ultimately, the application deck/bin APP/B is completely transferred from the truck bed onto the transfer rails 120, 122 of the power loader assembly PLA (FIG. 11).

Figure 12:
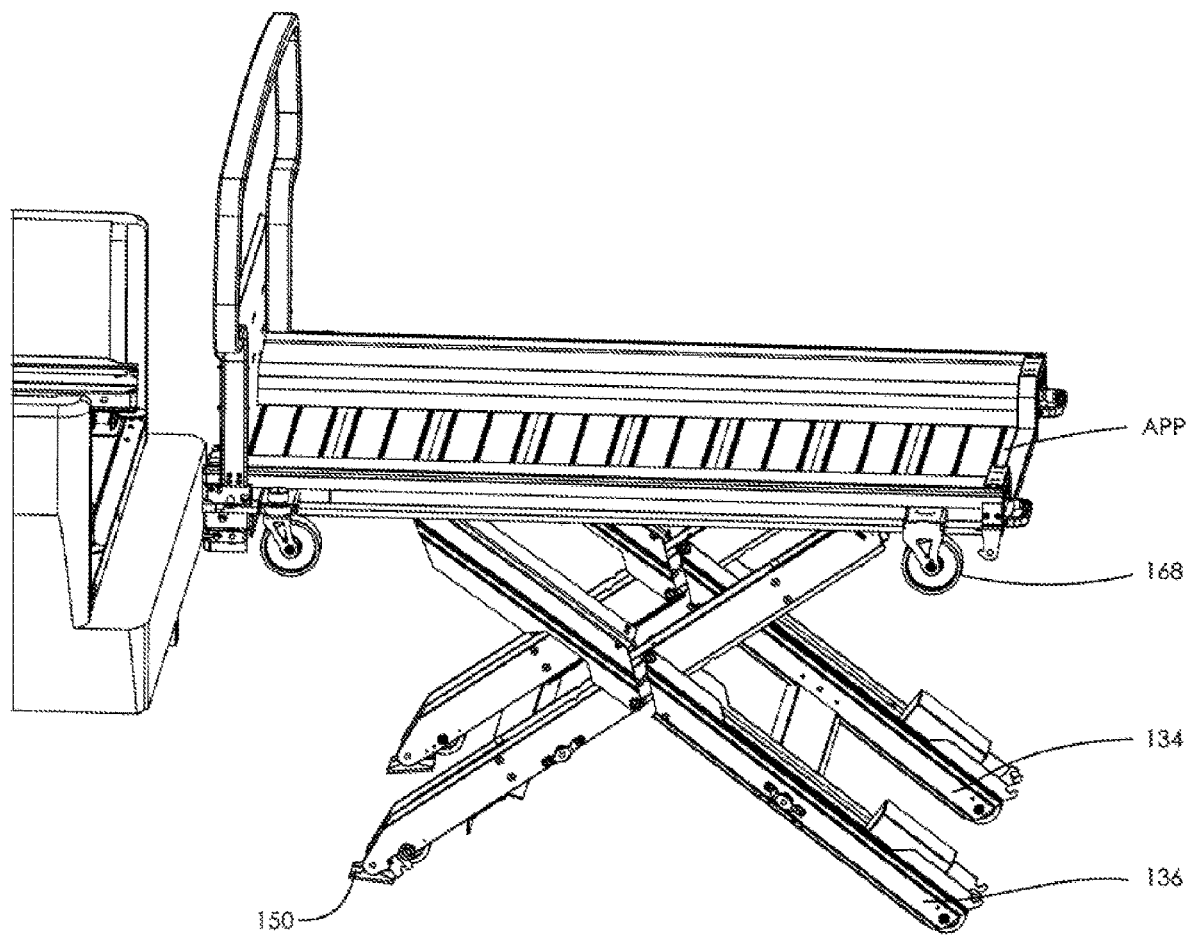

When the power loader assembly PLA lifts or lowers its front legs 140, 142, the transfer rails 120, 122 remain latched to the truck rails TR. Thus, the power loader assembly PLA must be moved rearwardly a short distance in order for the front legs 140, 142 to clear the bumper of the vehicle 100 (FIG. 12). To achieve this action, a slide mechanism is installed in the transfer rail and is linked to the rear leg to allow the power loader assembly to slide rearwardly and give the front legs 140, 142 clearance relative to the truck bumper. This slide mechanism may have a motor and drive screw installed in it for driving the front legs 140, 142 back and forth automatically. Preferably, the slide mechanism has two axles, the front axle engaging the upper, inner rear leg latch during normal lifting, and a rear one engaging a latch at the end of the rear outer legs for dumping. These latches will be described further below.

Figure 13:
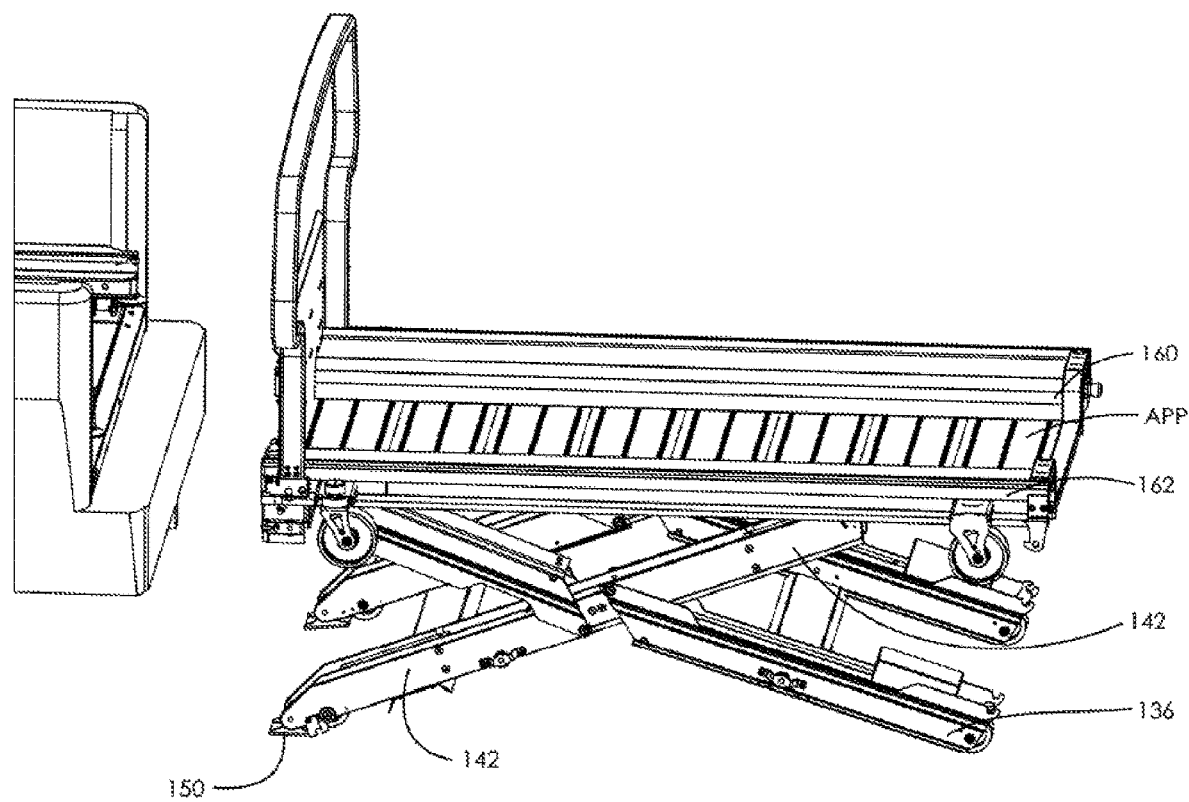
Figure 14:
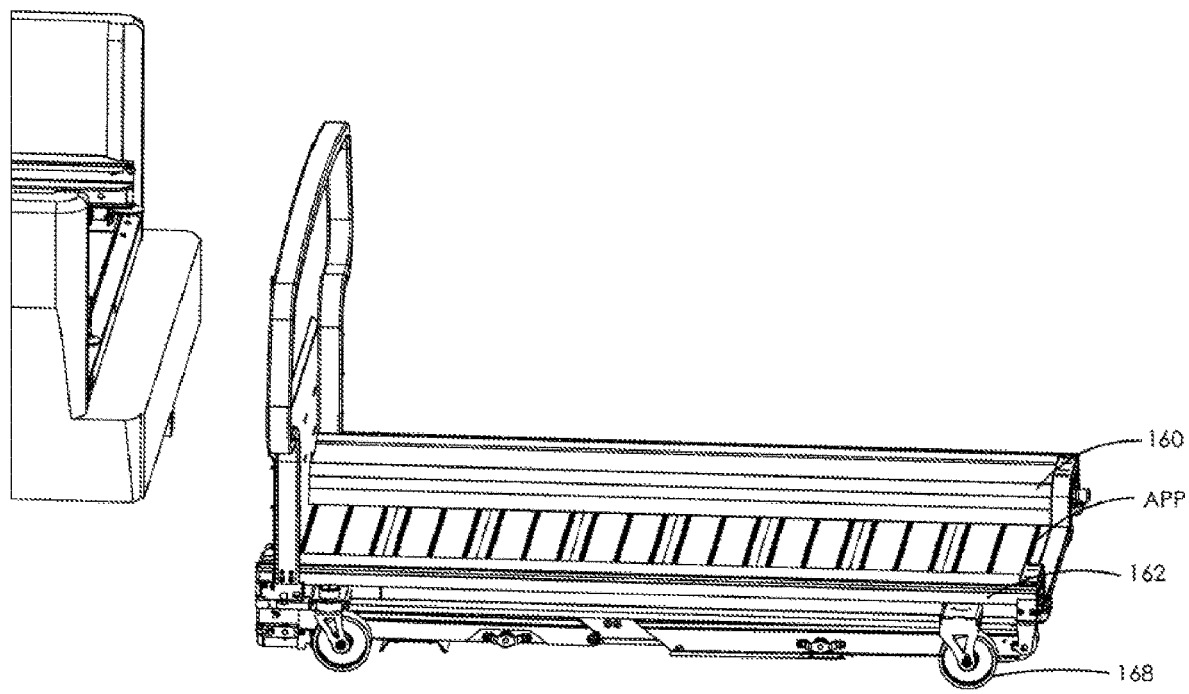
Figure 15:
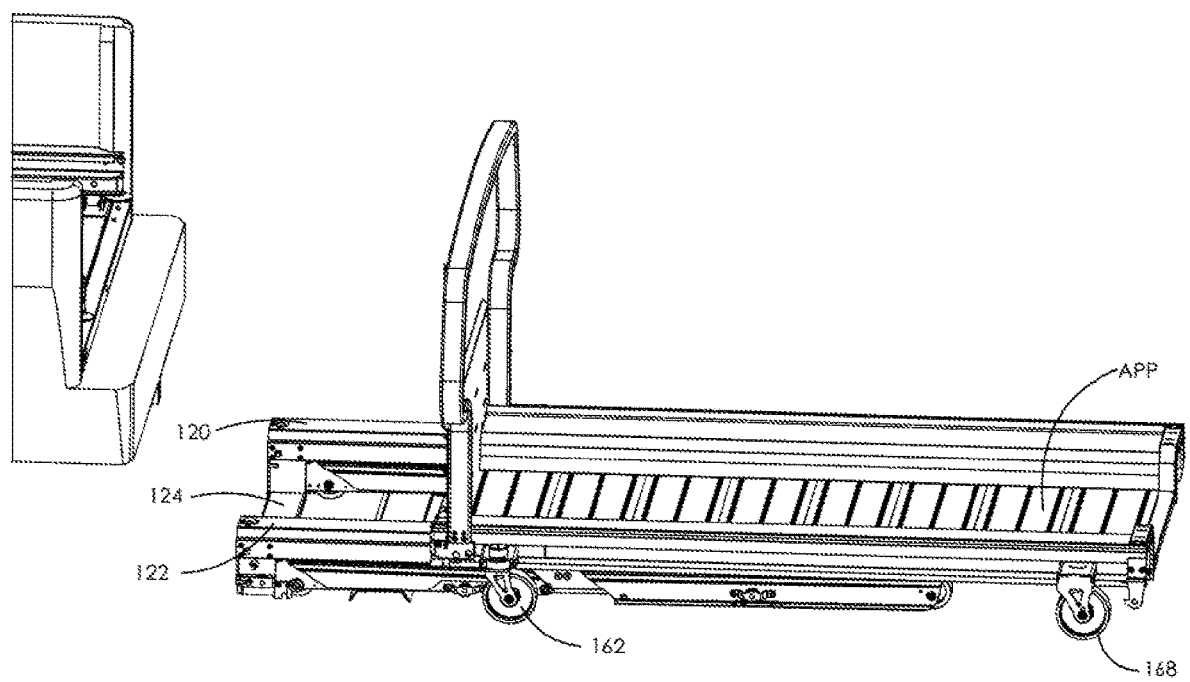
FIGS. 15-30 illustrate progressive steps for loading the carrier/bin with cargo into the truck bed.
Figure 16:
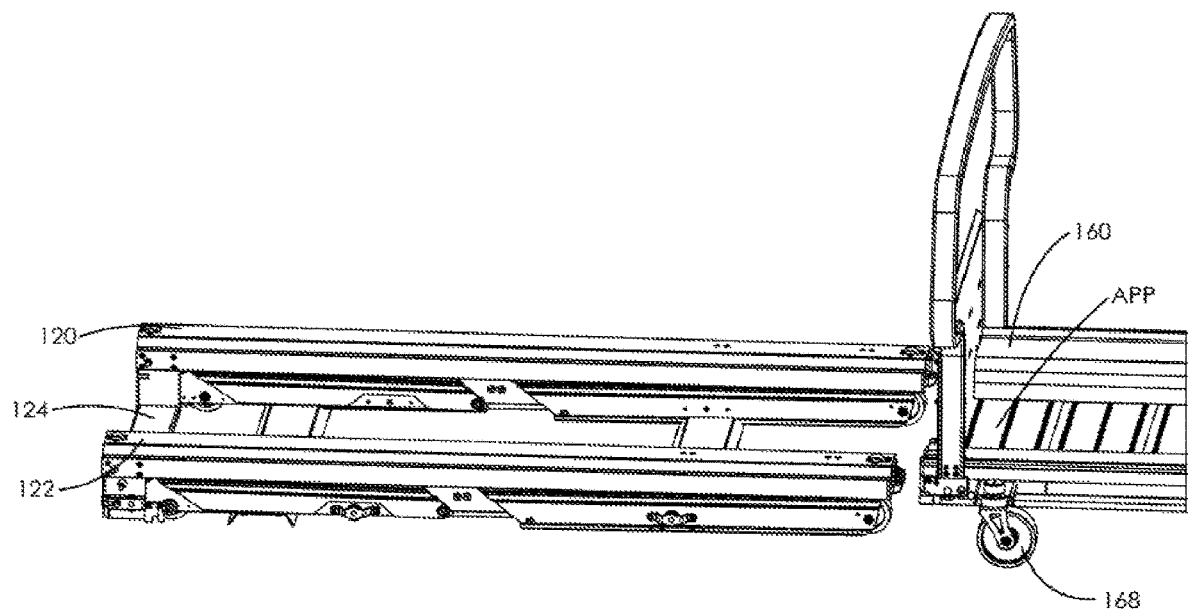

Once the application deck/bin APP/B locks on to the transfer rails 120, 122 (FIG. 13), the leg assemblies 130, 132 are then collapsed (FIG. 14) in order to lower the application deck/bin to the ground surface. When fully lowered, caster wheels 168 of the application deck/bin APP/B engage the ground surface because a latch 170 on each caster holds the casters from sliding in the grooves 166 of the respective rails 160, 162 when the application deck/bin is pushed around on the ground surface (FIGS. 15-16). Similarly, when the application deck/bin APP/B is rolled onto the truck rails TR, this latch 170 is moved or lifted upwardly by the truck rails disengaging the casters from the application deck/bin and thereby allowing the casters 168 to slide within the application deck grooves 166.

Figure 17:
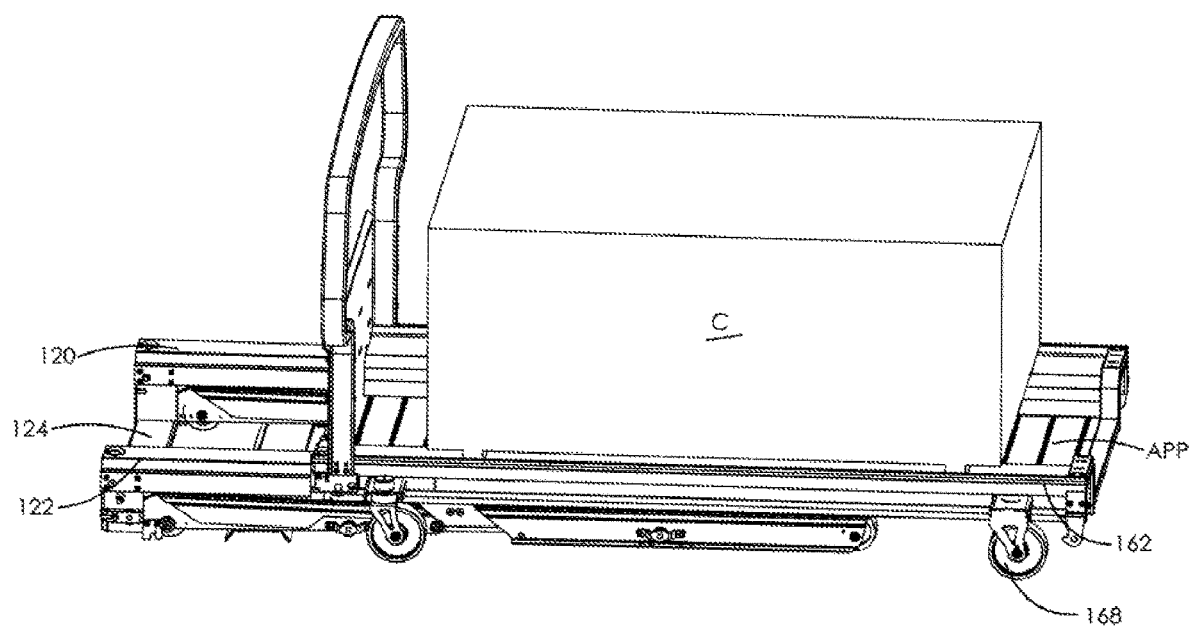
Figure 18:
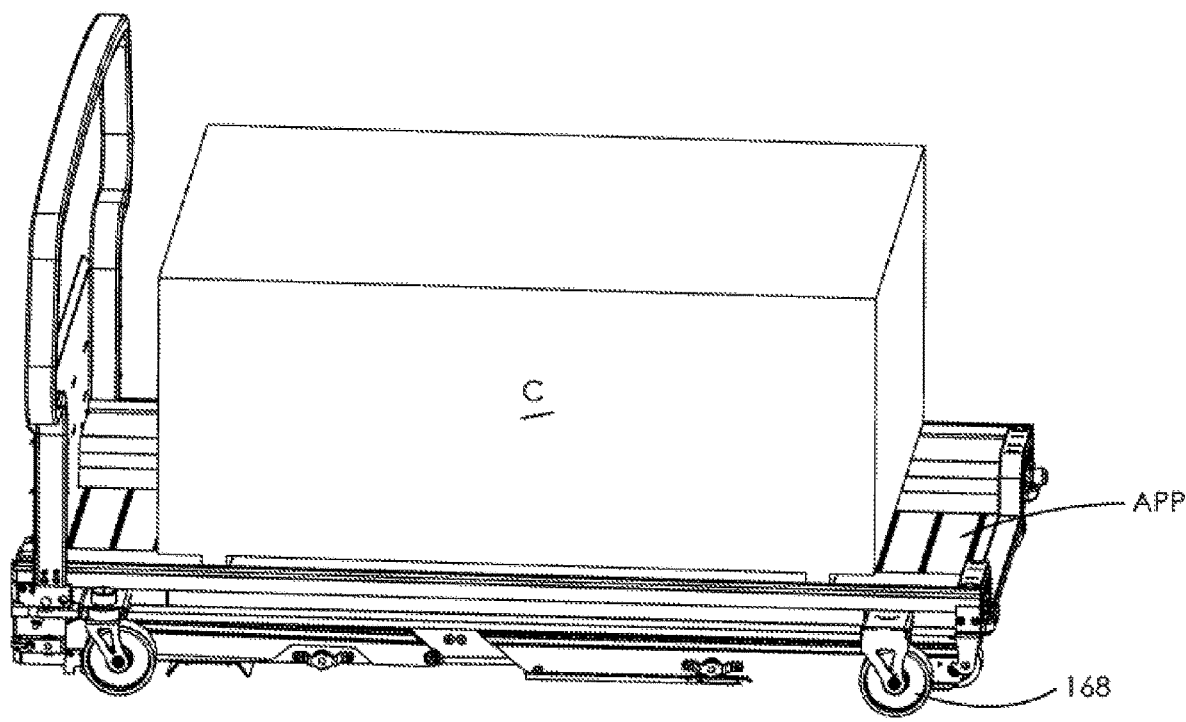
Figure 19:
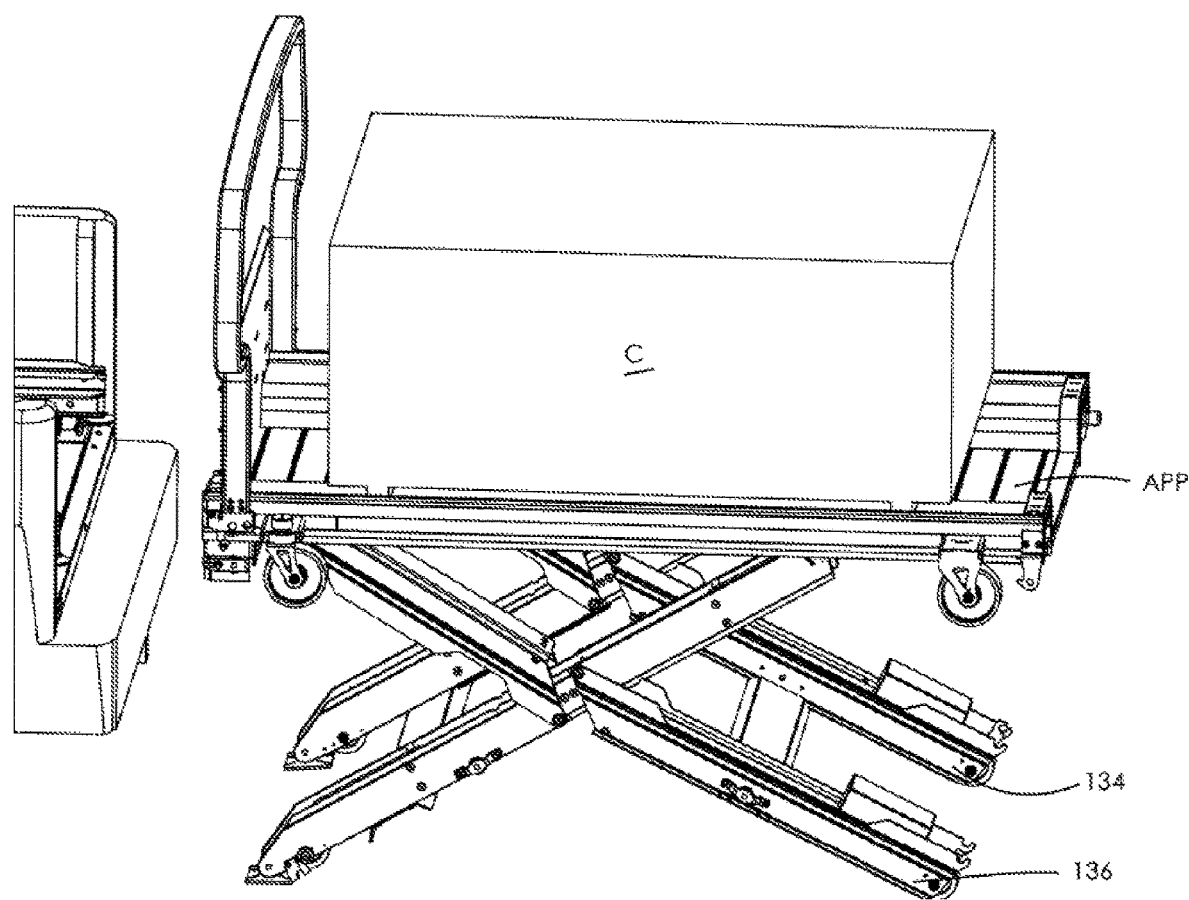
Figure 20:
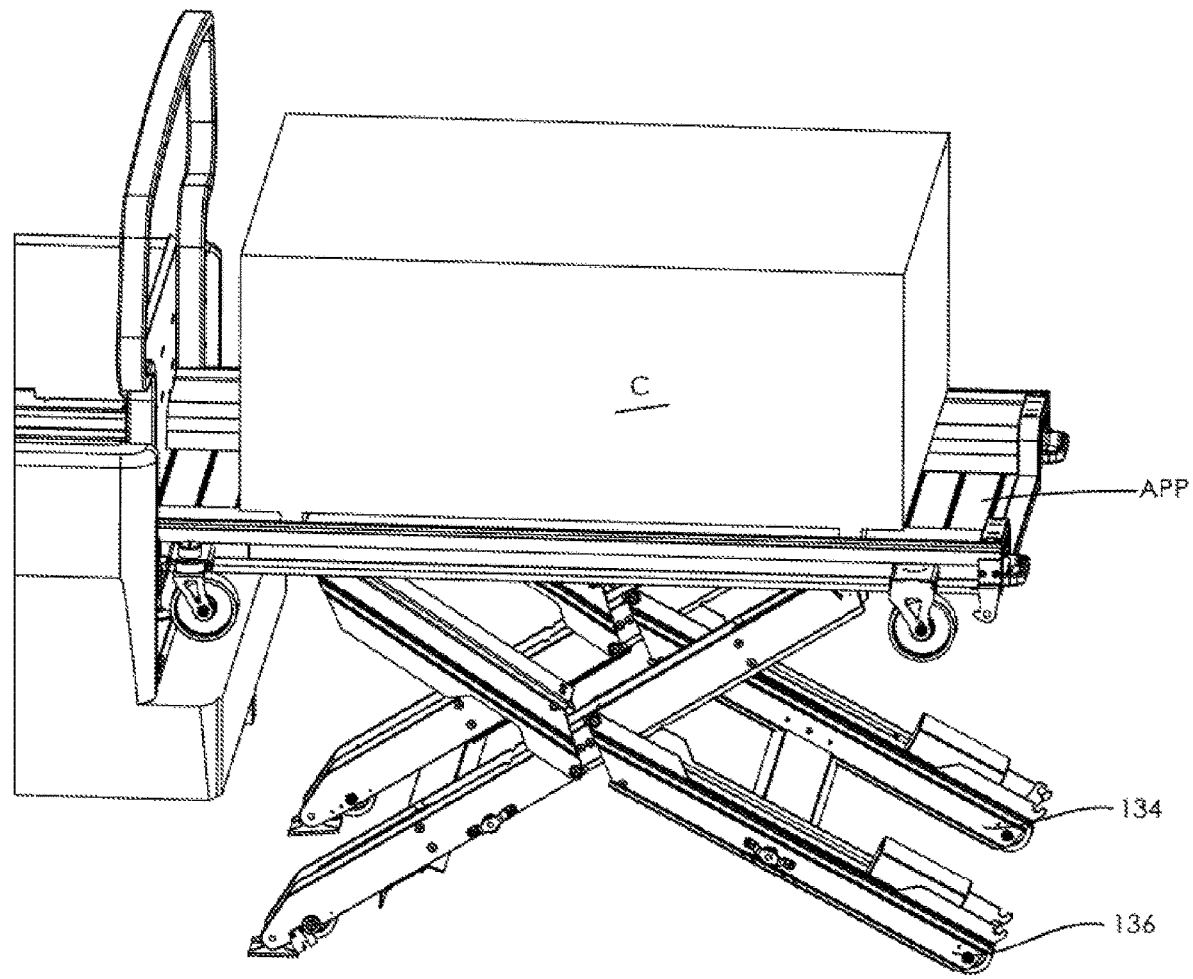
Figure 21:
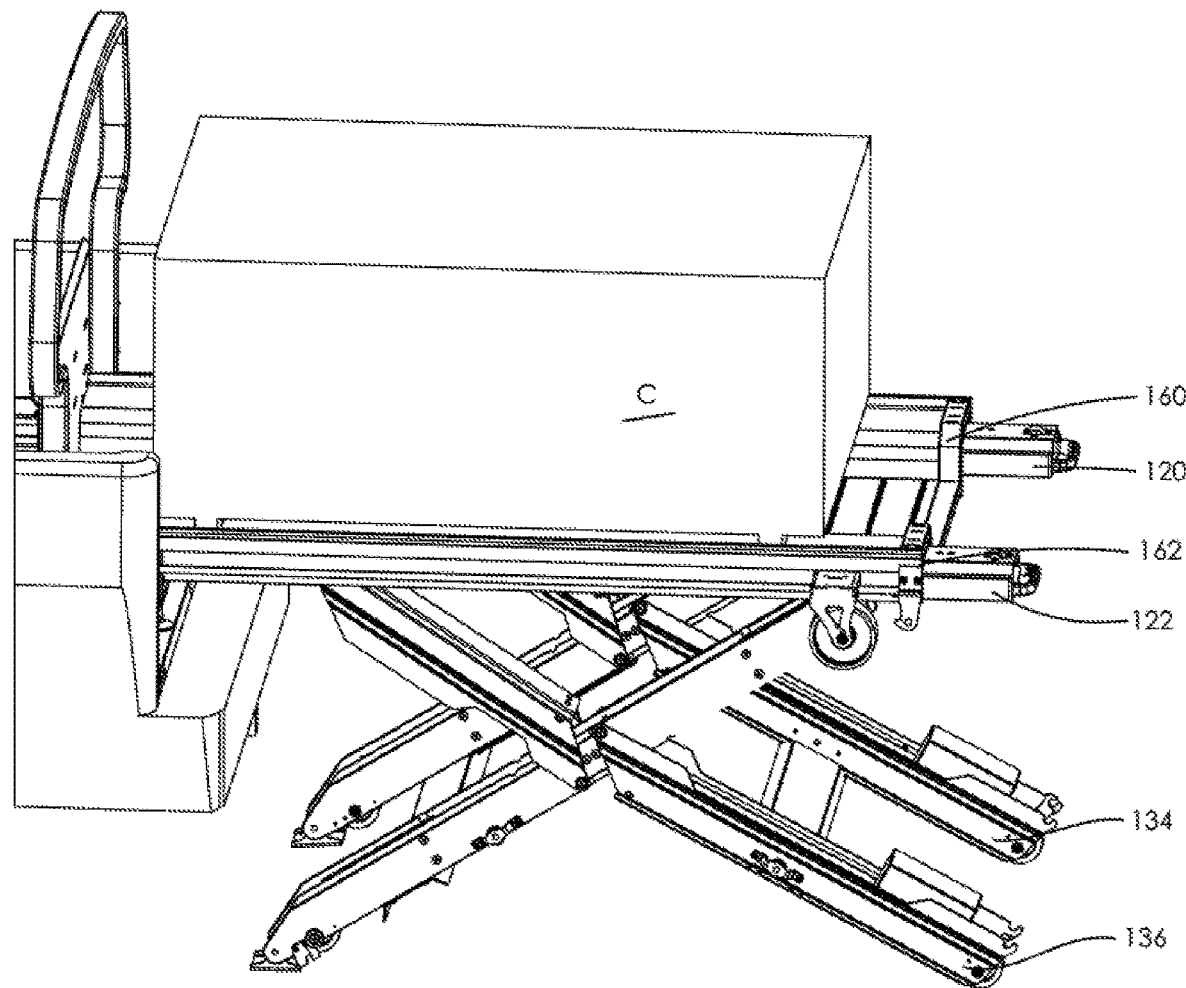
Figure 22:
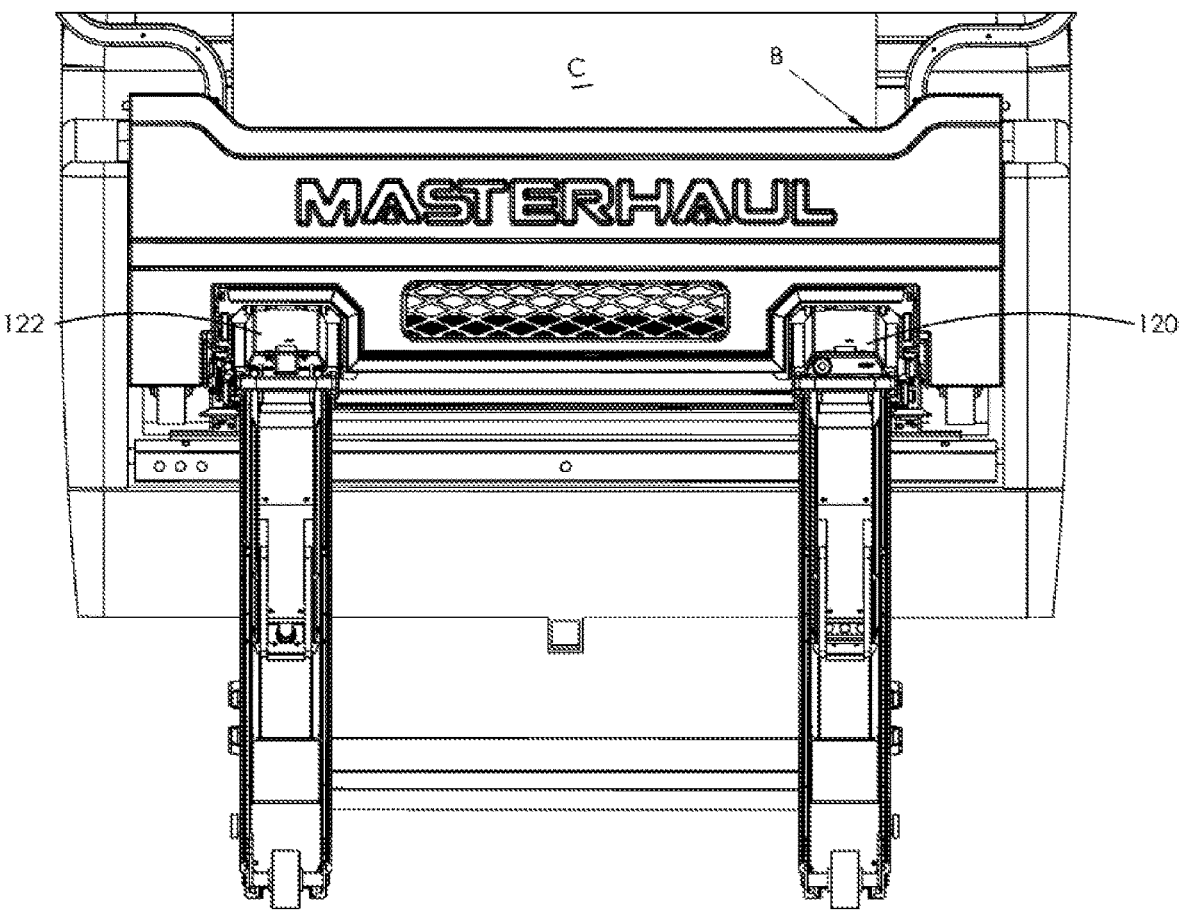
Figure 23:
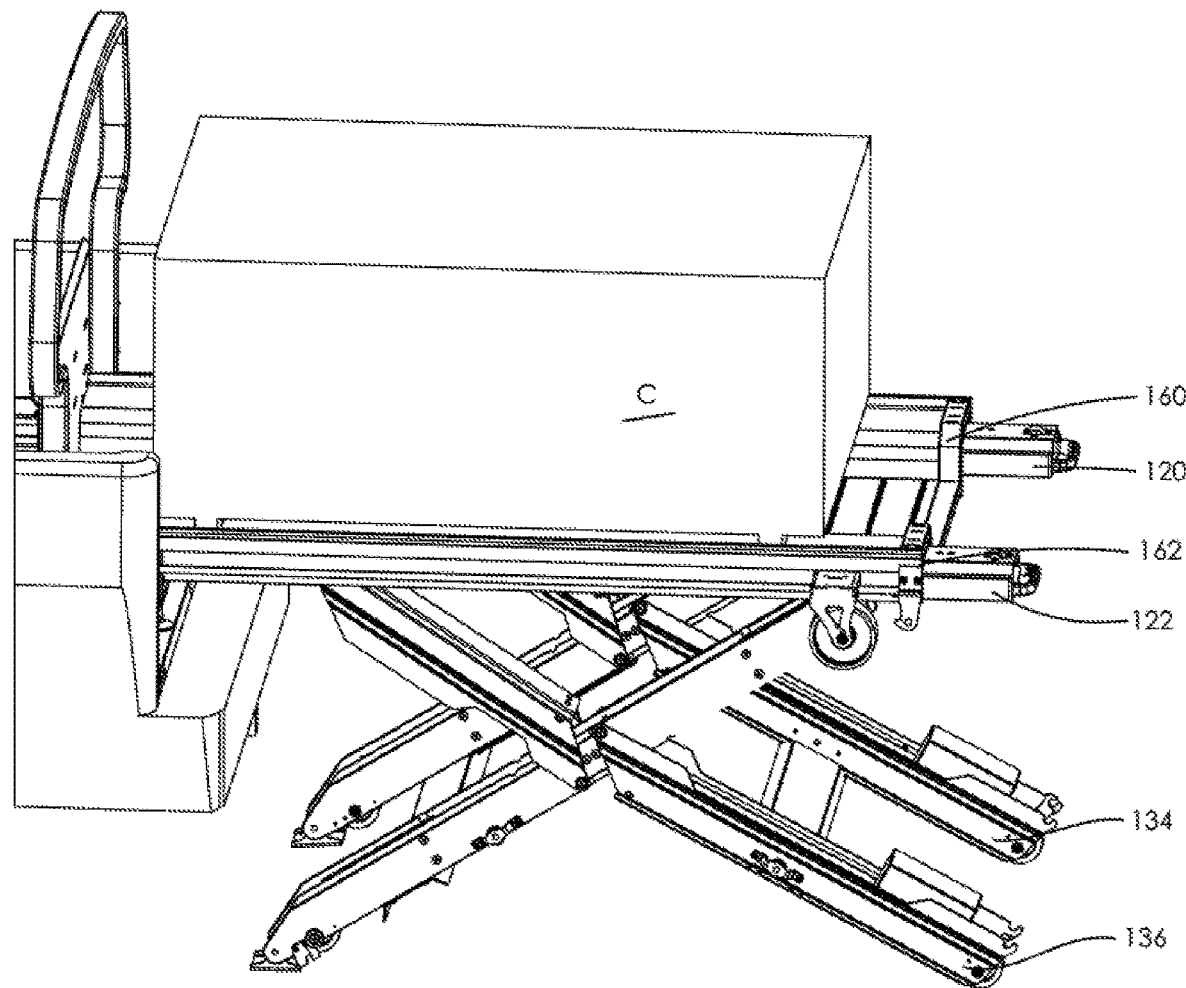
Figure 24:
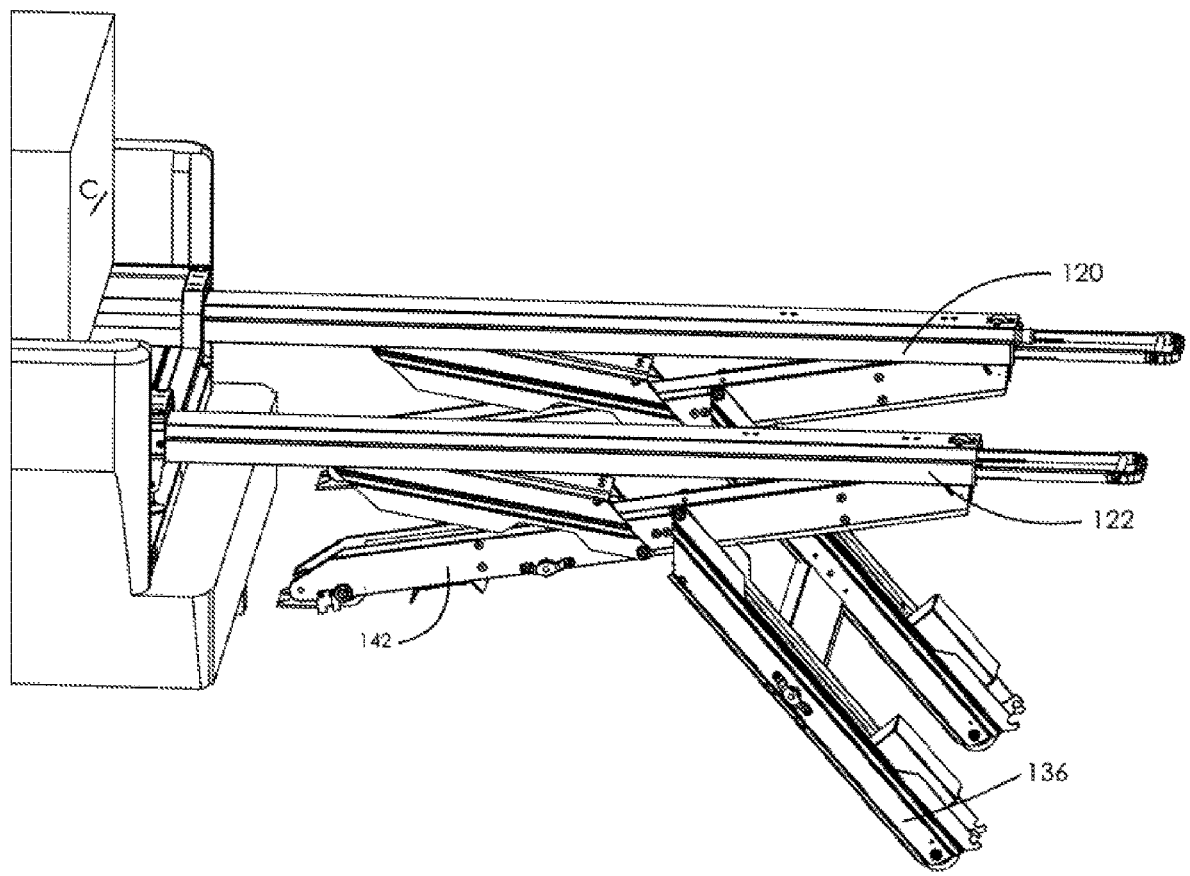
Figure 25:
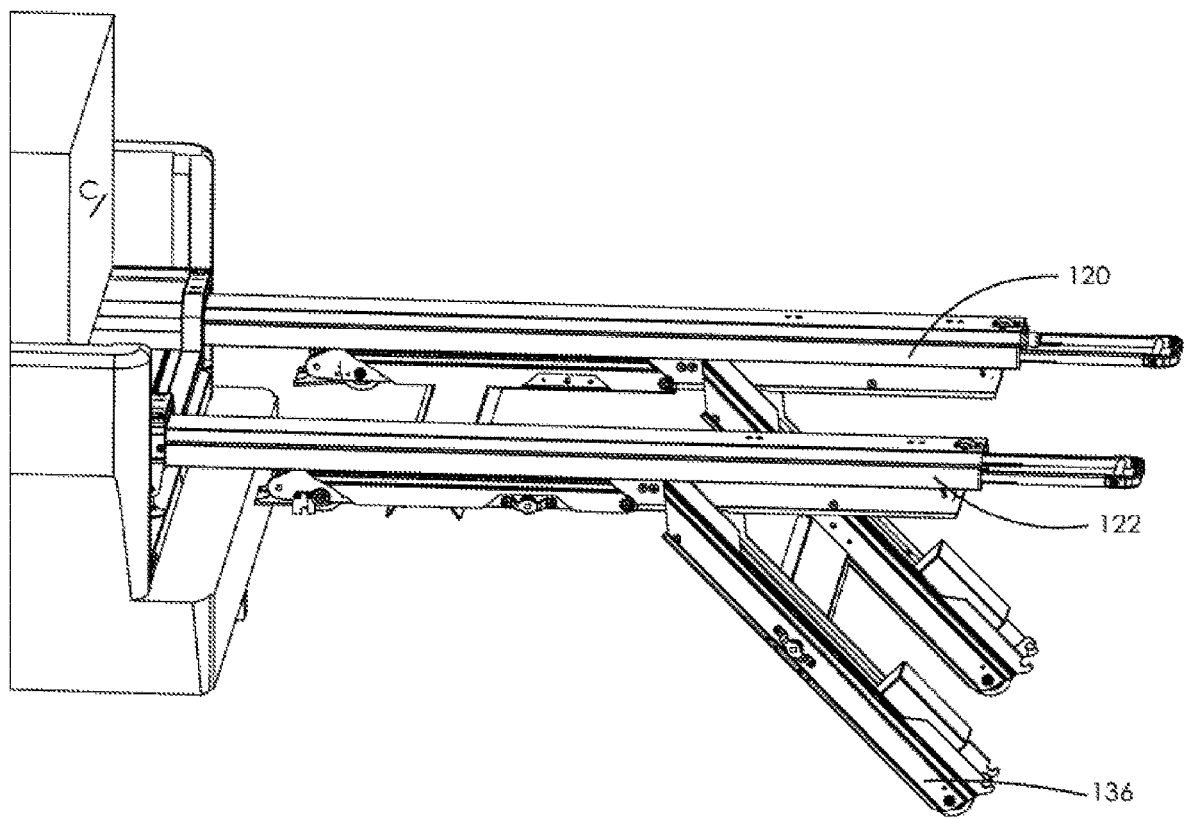
Figure 26:
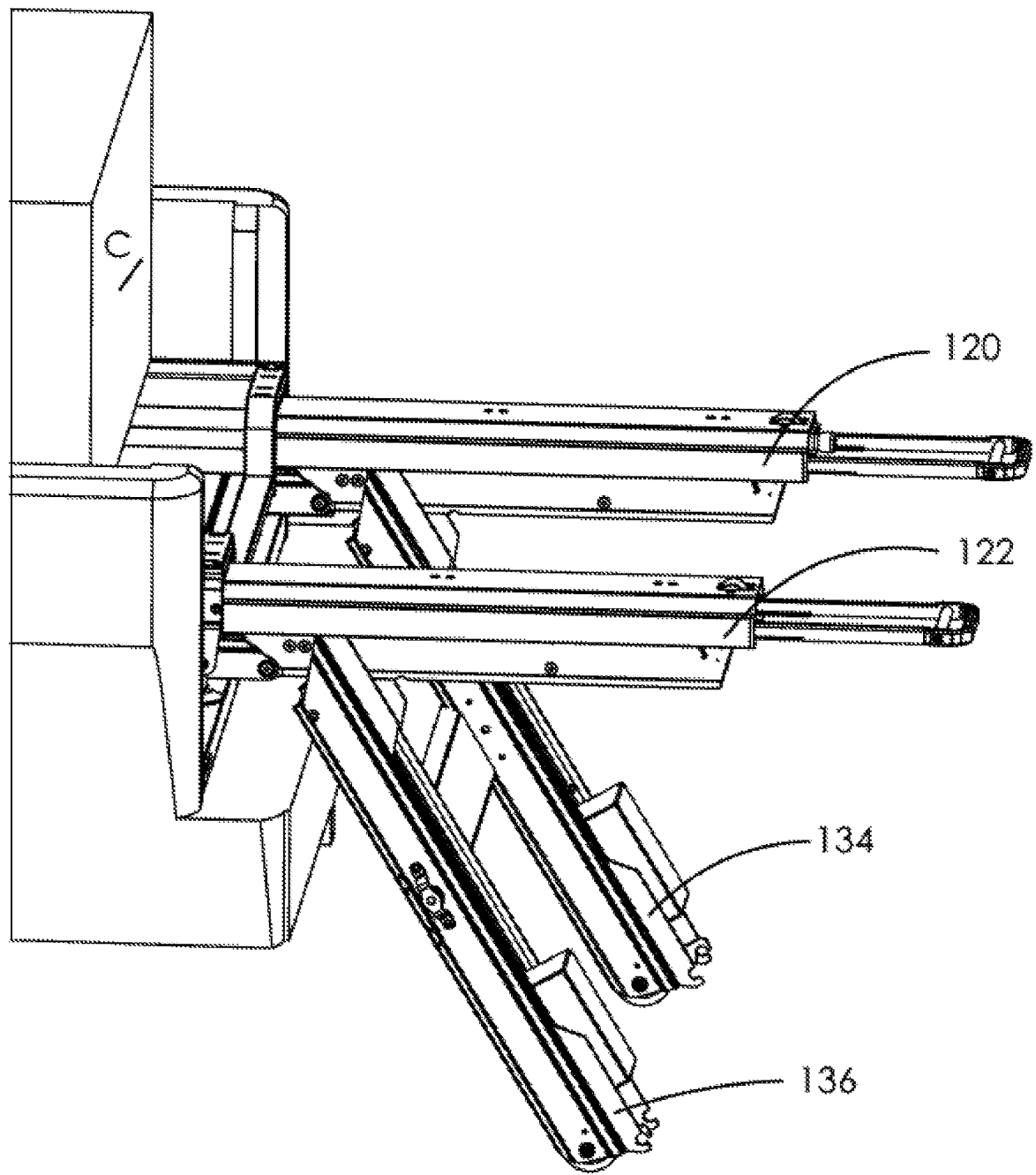
Figure 27:
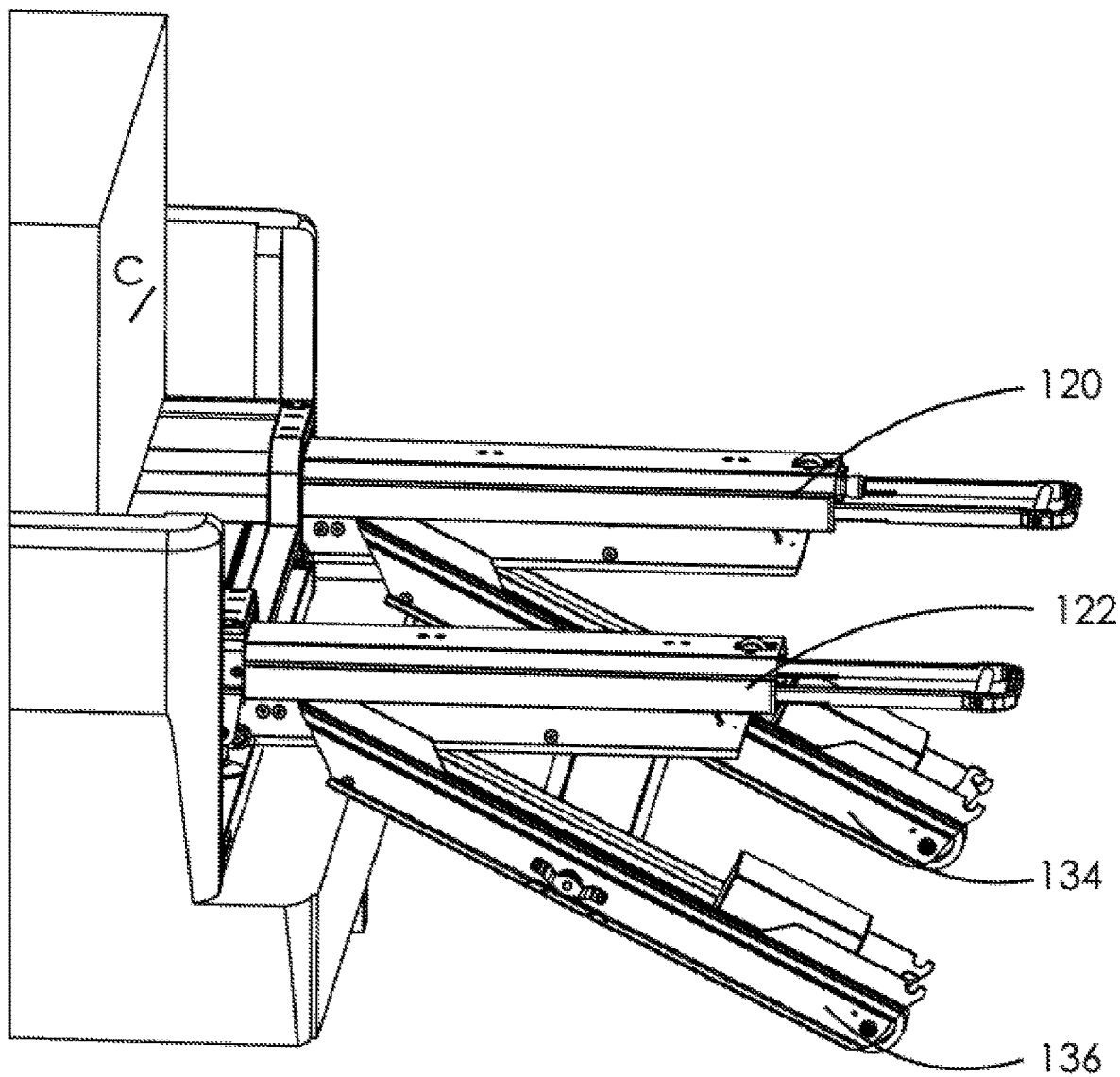
Figure 28:
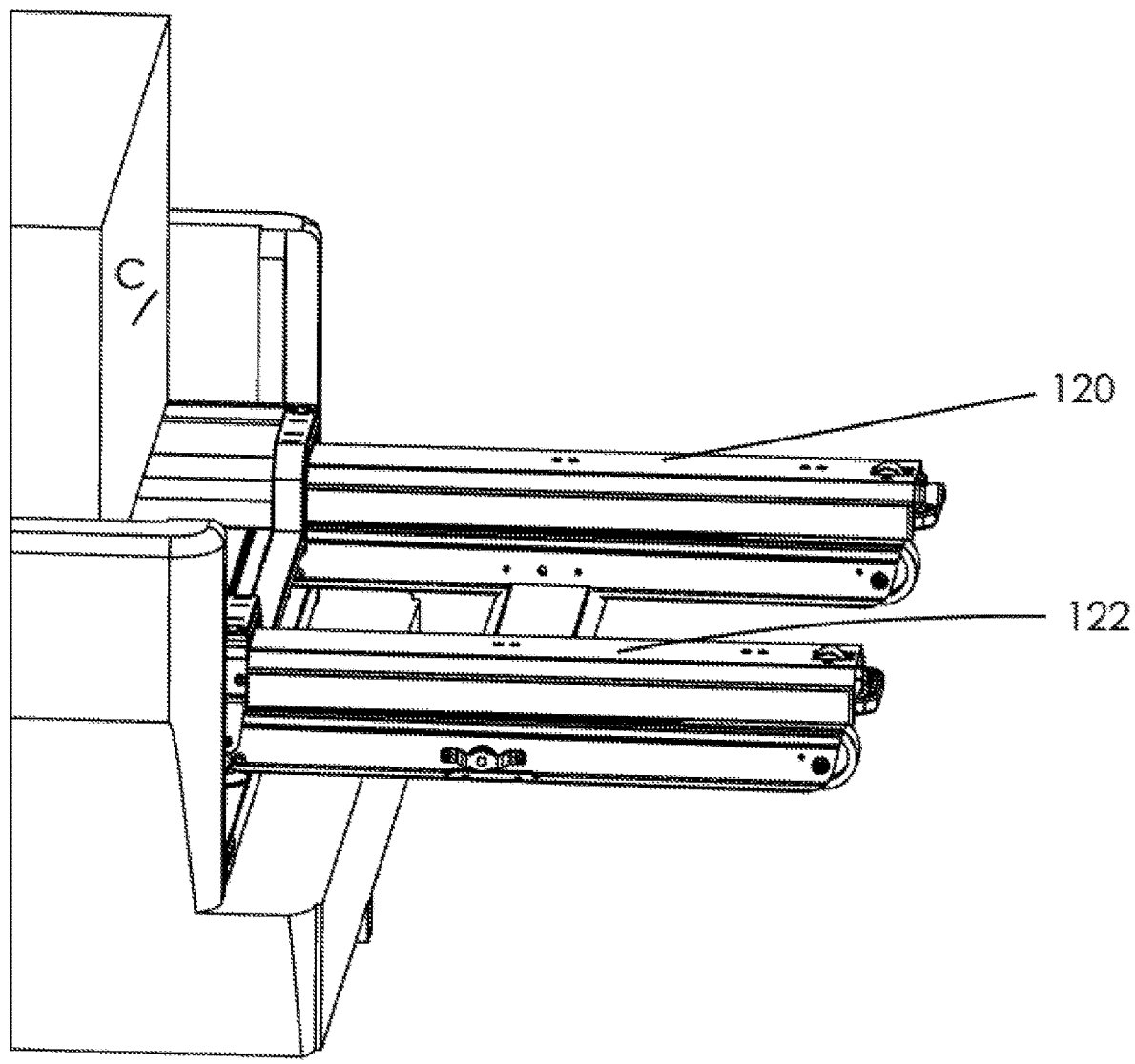
Figure 29:
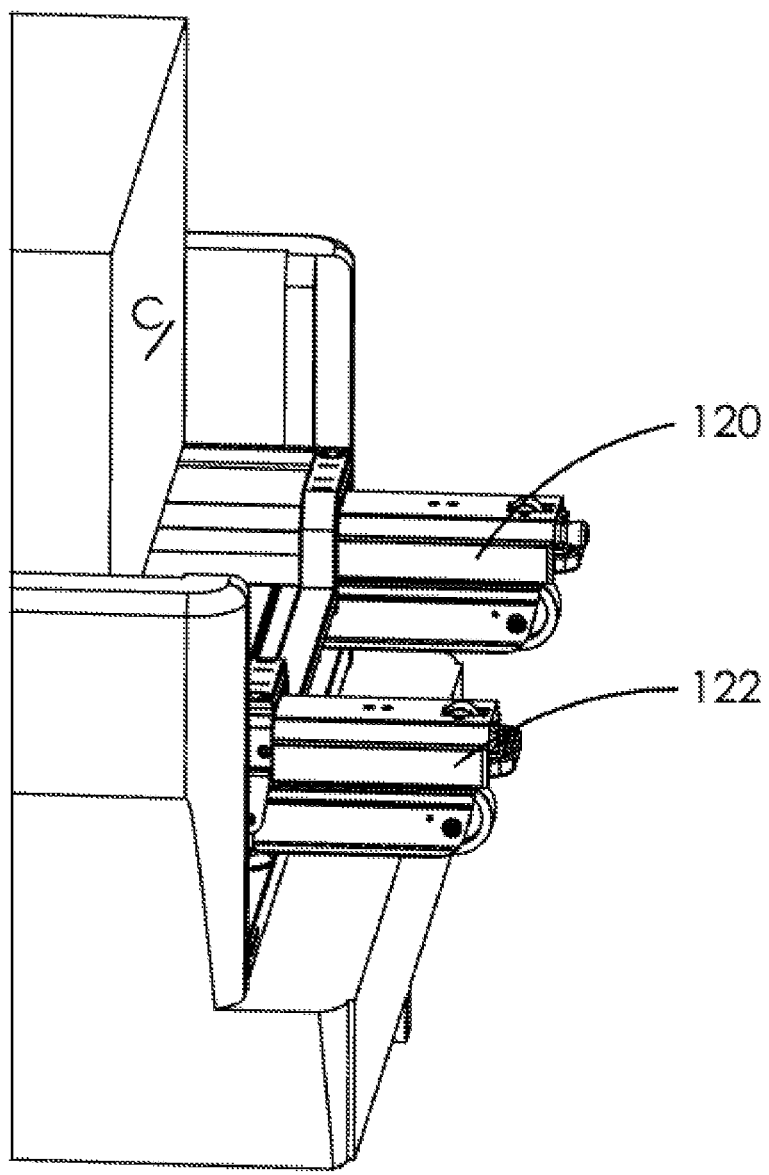
Figure 30:
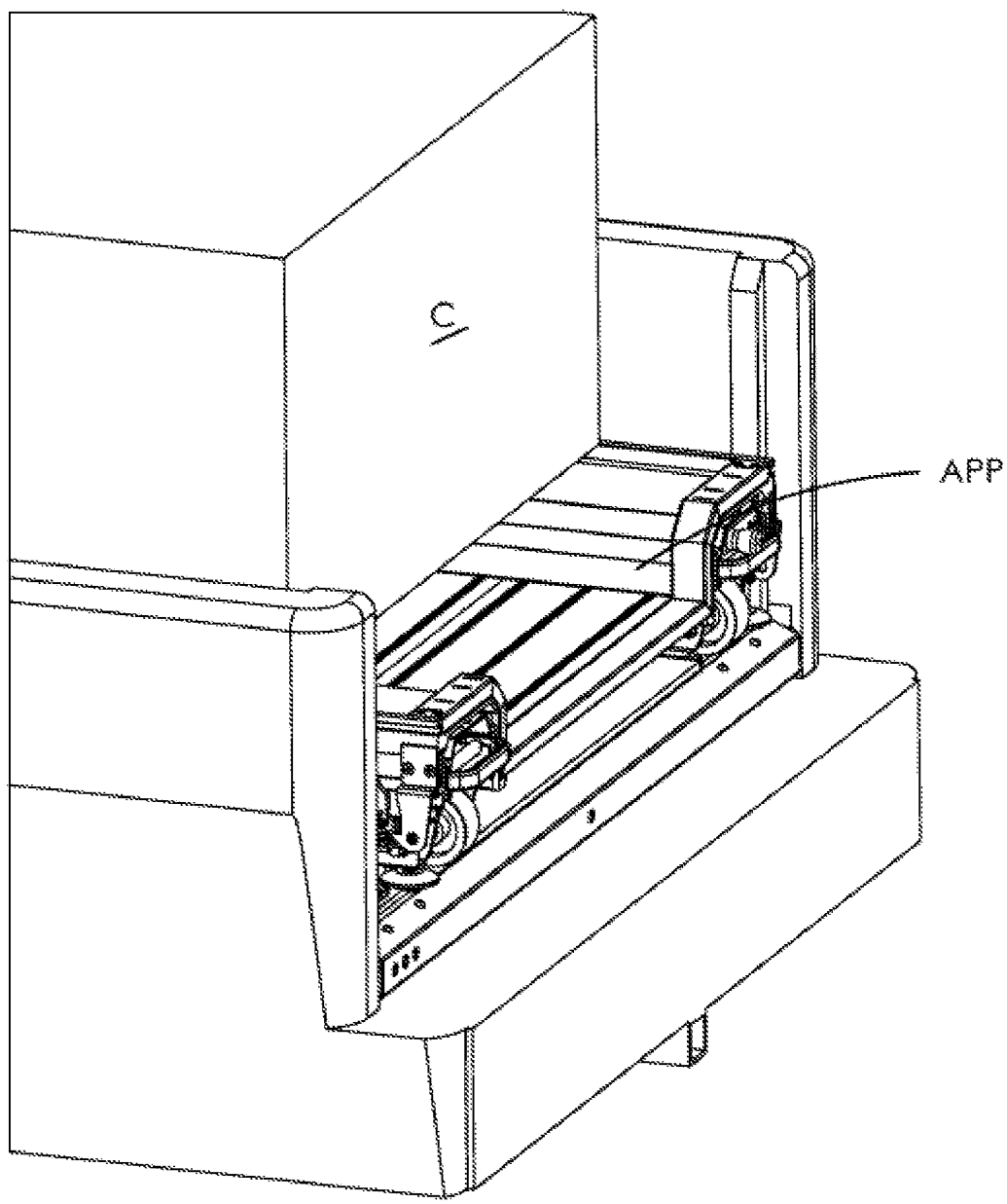

FIG. 17 illustrates cargo C received on the application deck/bin APP/B, and rolling of the application deck/bin on to the power loader assembly PLA. Once latched into place on the power loader assembly PLA as a result of the latches 170 associated with each of the casters 168 latching in place (FIG. 18), the leg assemblies 130, 132 raise the floor panel and cargo C (FIG. 19) and the application deck/bin with cargo is loaded into the truck bed (FIGS. 20-21) until the application deck/bin is fully received in the truck bed (FIGS. 22-23). FIG. 23 is an elevational view of the rear surface 172 of a bin B (rather than the application deck illustrated in the other figures). Subsequently, the power loader assembly PLA is then loaded into the truck bed 102 in a manner that is illustrated in FIGS. 24-30) and that is the reverse process of FIGS. 1-8.

Figure 31:
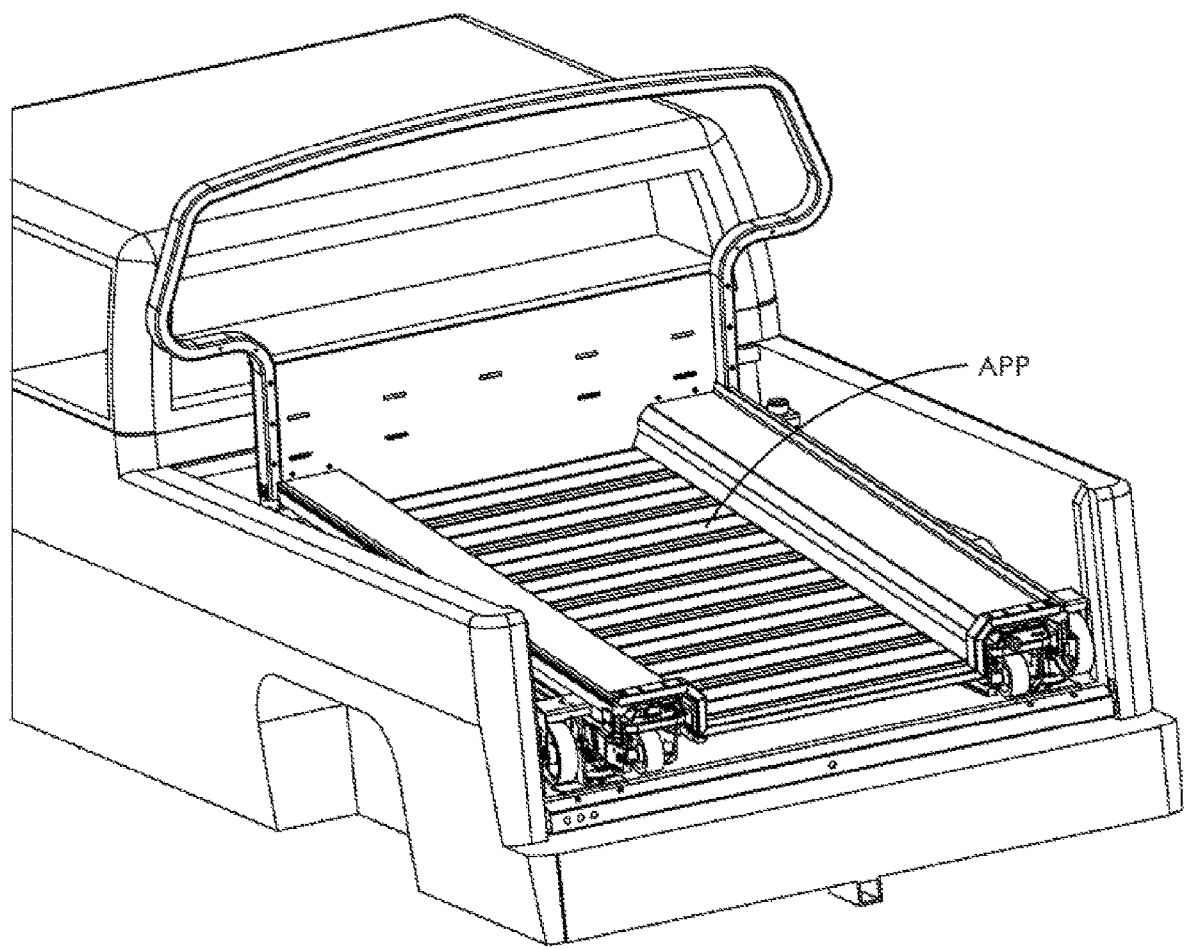
FIGS. 31-32 illustrate how the carrier/bin can be selectively tilted relative to the truck bed.
Figure 32:
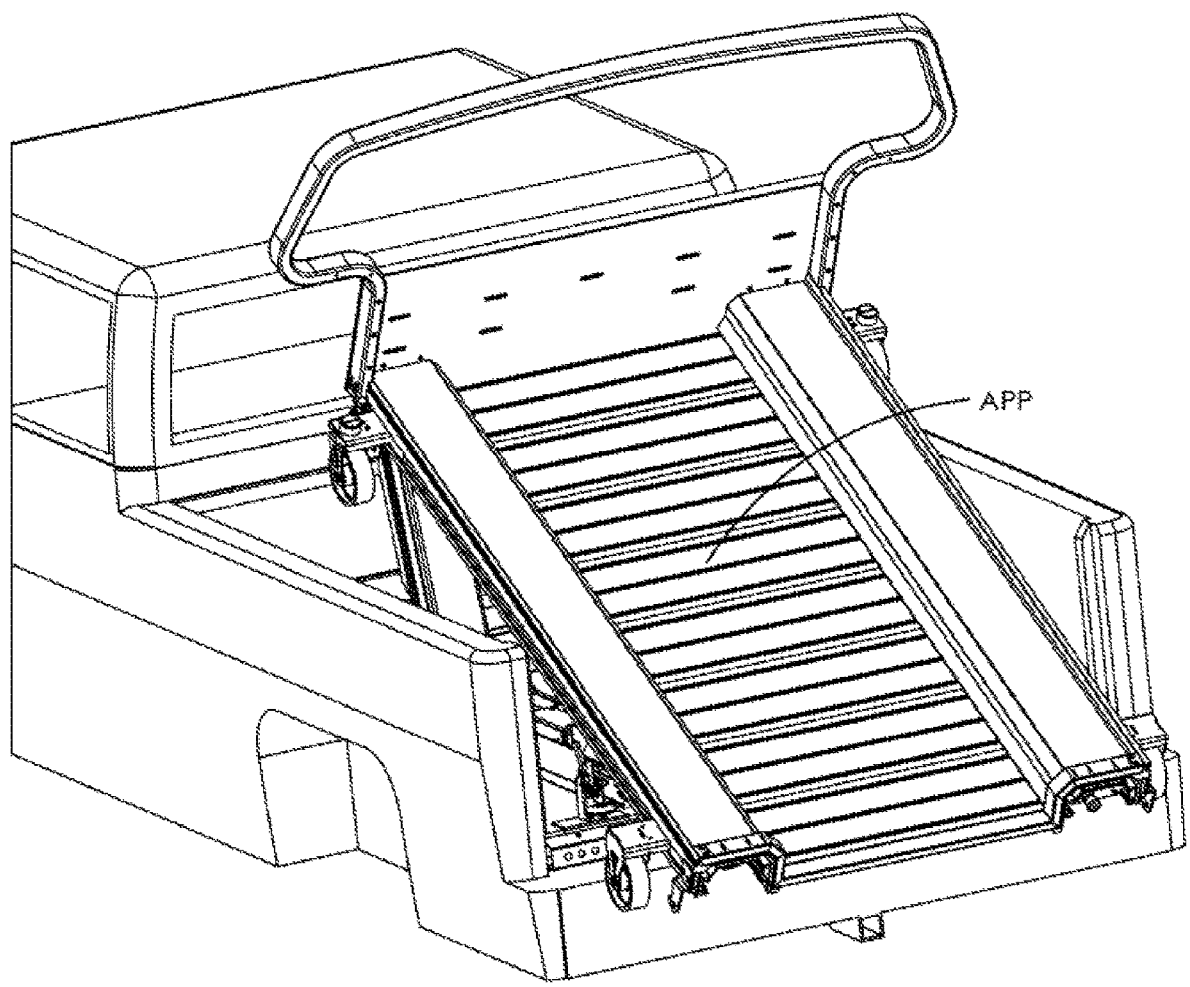
Figure 33:
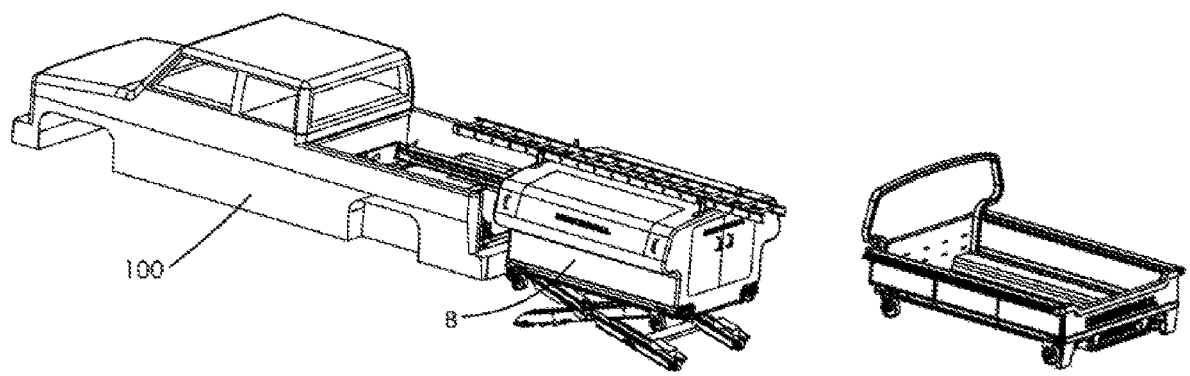
FIGS. 33-38 illustrate how cargo or materials can be unloaded, loaded, or swapped at a worksite.
Figure 34:
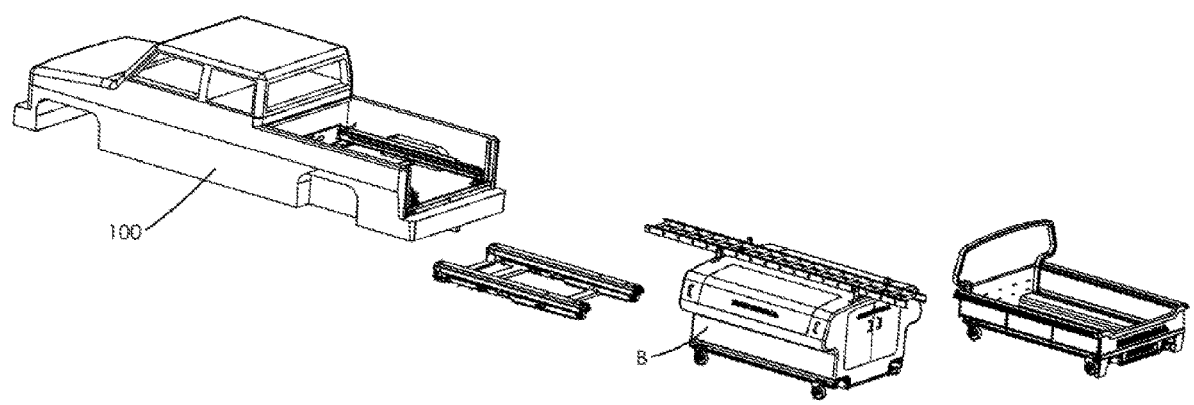
Figure 35:
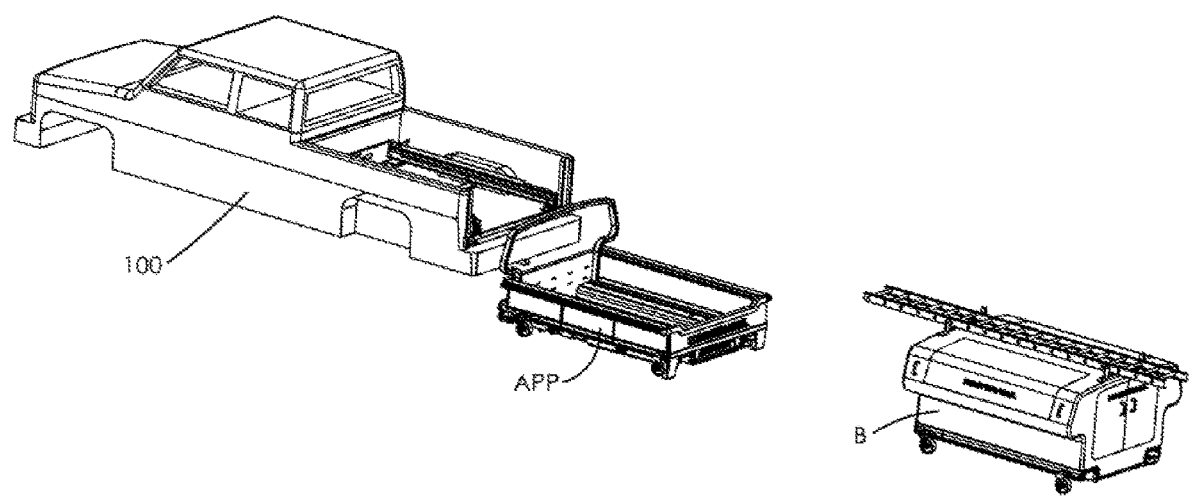
Figure 36:
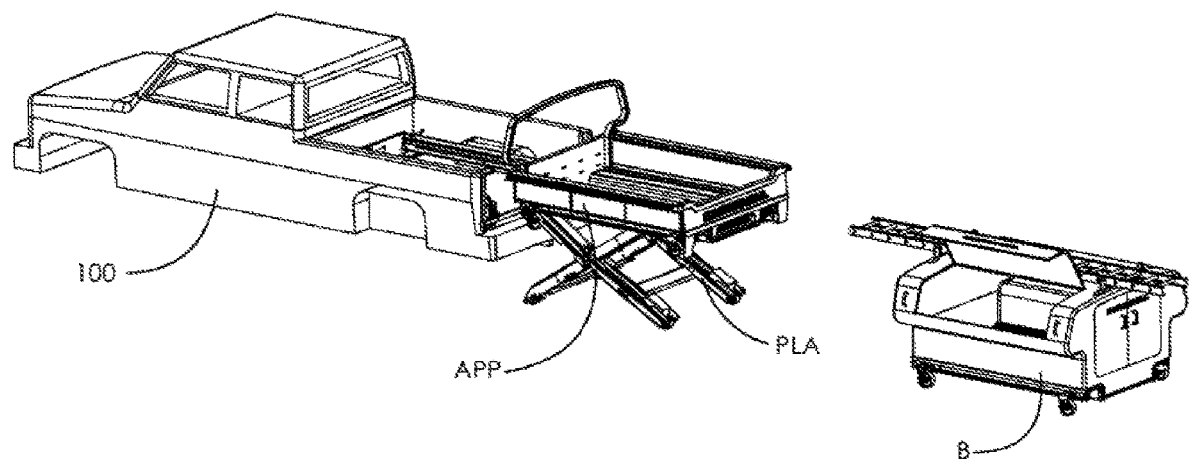
Figure 37:
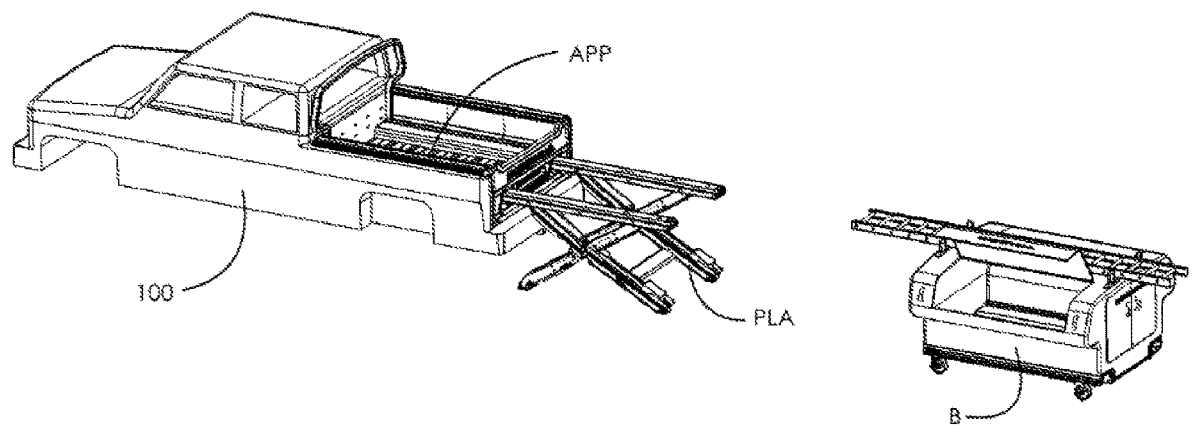

FIGS. 31-32 illustrates the pivoting or dump mode operation of the power loader assembly PLA relative to the truck bed. It will be appreciated that even though the tailgate of the truck 100 has been removed, during the dump mode, the application deck/bin APP/B must be moved a limited distance rearwardly so that the rear, terminal edge of the application deck/bin clears the rear bumper of the truck.

Figure 38:
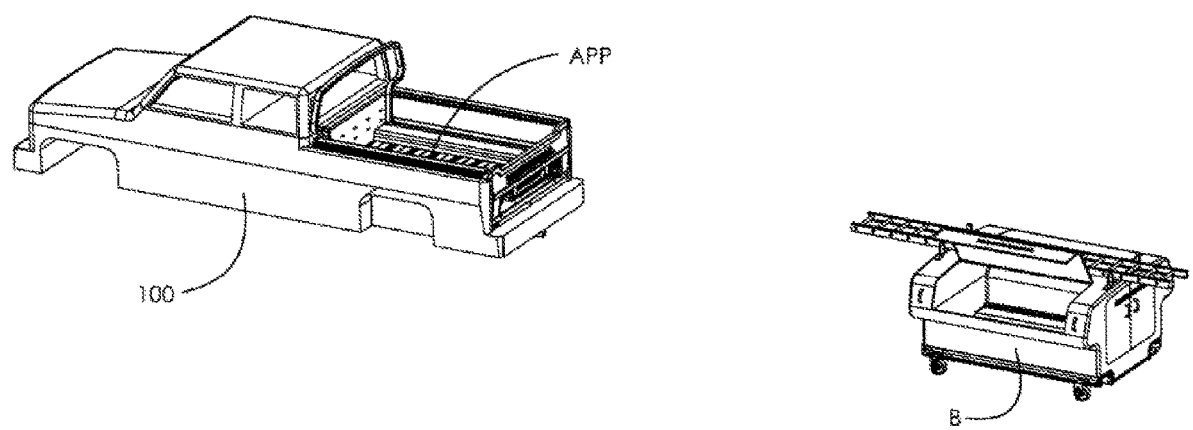
Figure 39:
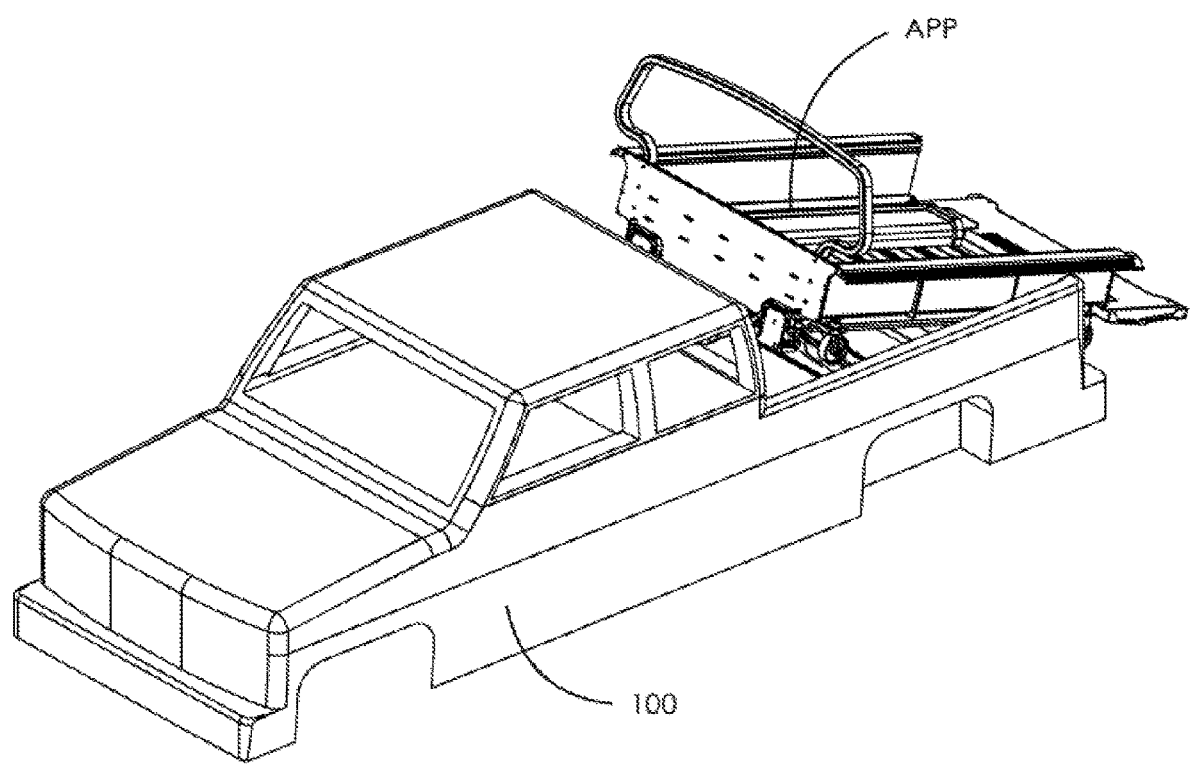
FIG. 39 shows the carrier/bin in a dump mode to empty the deck/bin at a worksite.

FIGS. 33-39 illustrate the unloading of a bin B from the truck bed 102 at a worksite and receipt of a different bin APP filled with cargo C that is loaded into the truck bed. Specifically, separation of the first bin B from the power loader assembly PLA is completed (FIG. 34), the second application deck or bin APP moved on to the power loader assembly (FIG. 35), the power loader assembly lifting the second application deck or bin to the height of the truck bed 102 (FIG. 36), the second bin advanced into the truck bed (FIG. 37), and the power loader assembly loaded into the truck bed so that the truck 100 can be driven from the worksite (FIG. 38). In FIG. 39, the cargo C in the second application deck or bin APP is then dumped from the truck bed 102 at a second worksite.

Figure 40:
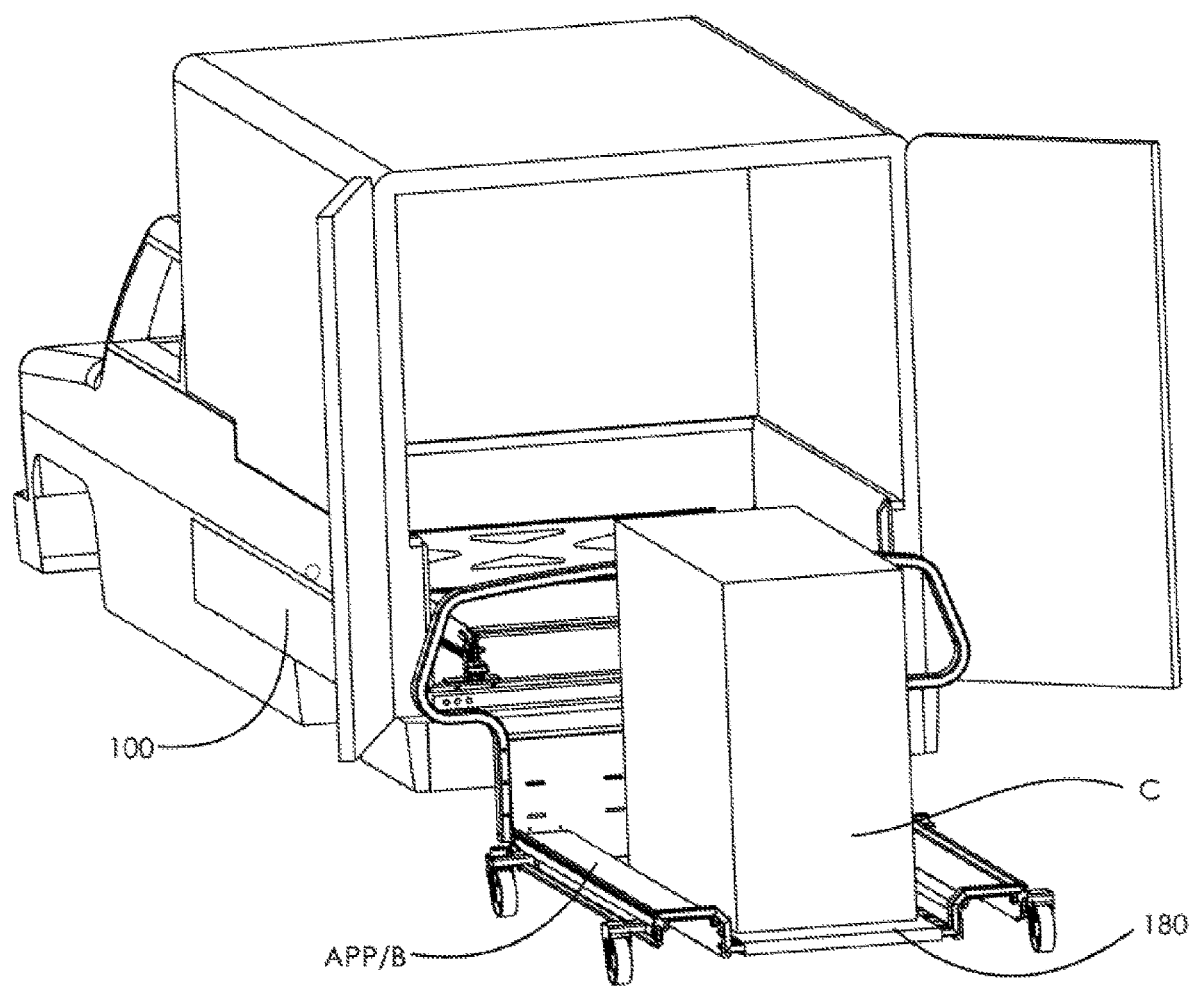
FIGS. 40-41 illustrate how cargo can be automatically delivered without human intervention.
Figure 41:
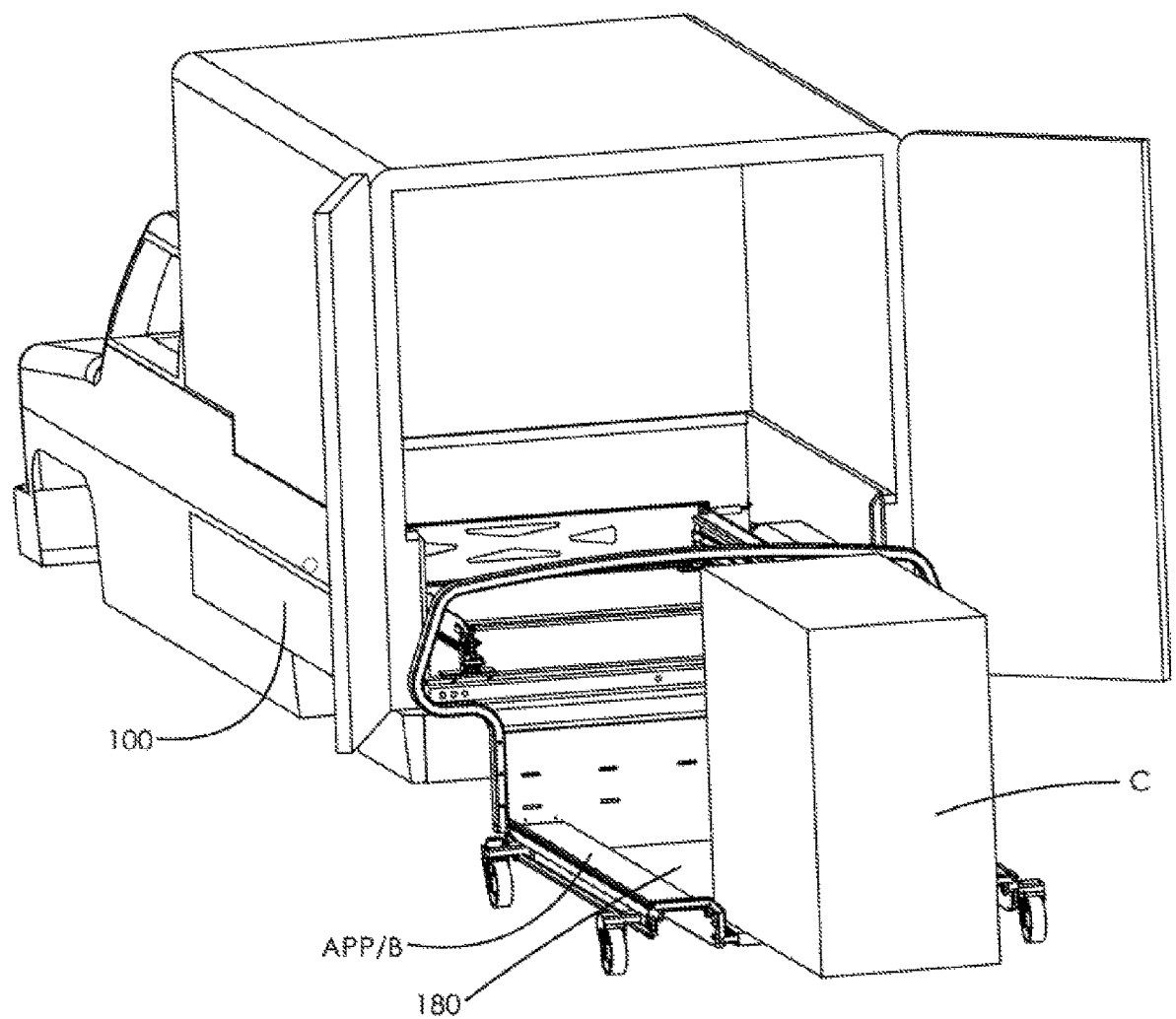
Figure 42:
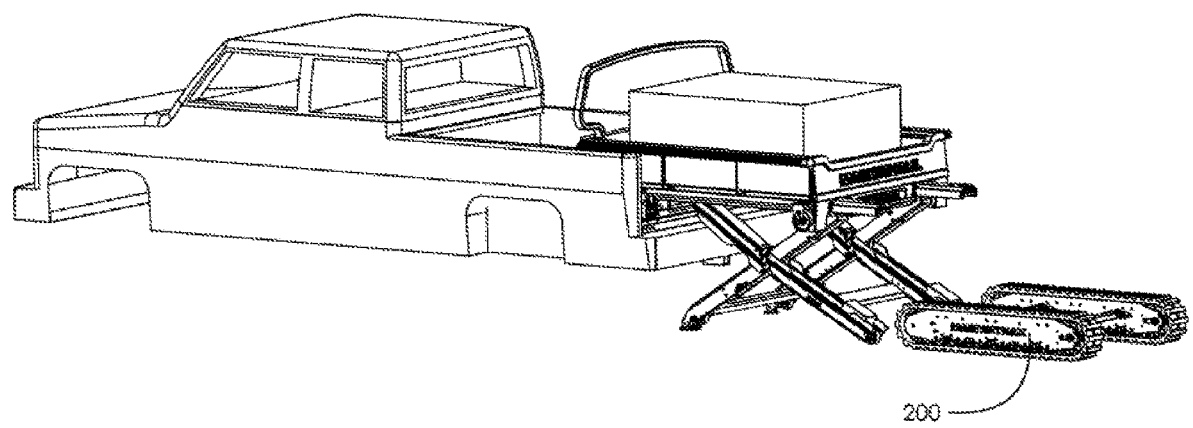
FIGS. 42-45 illustrate unloading cargo from a truck bed.
Figure 43:
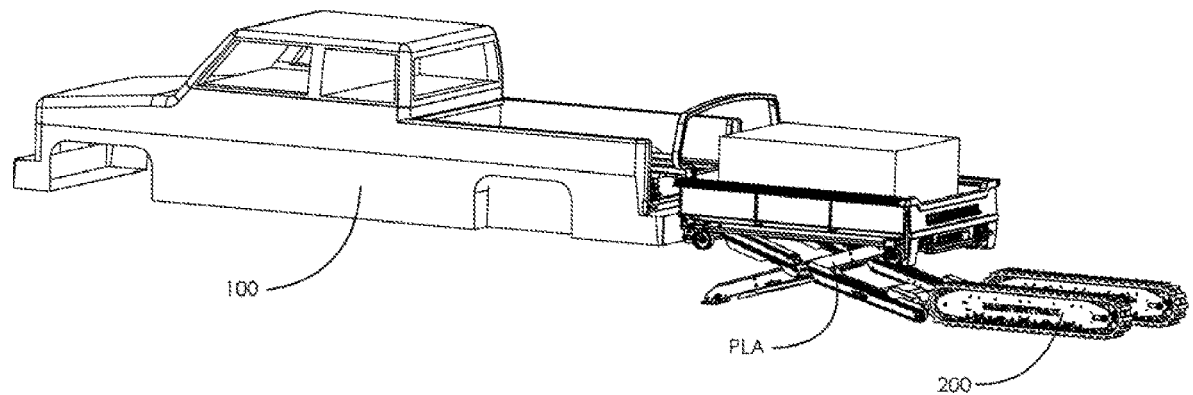
Figure 44:
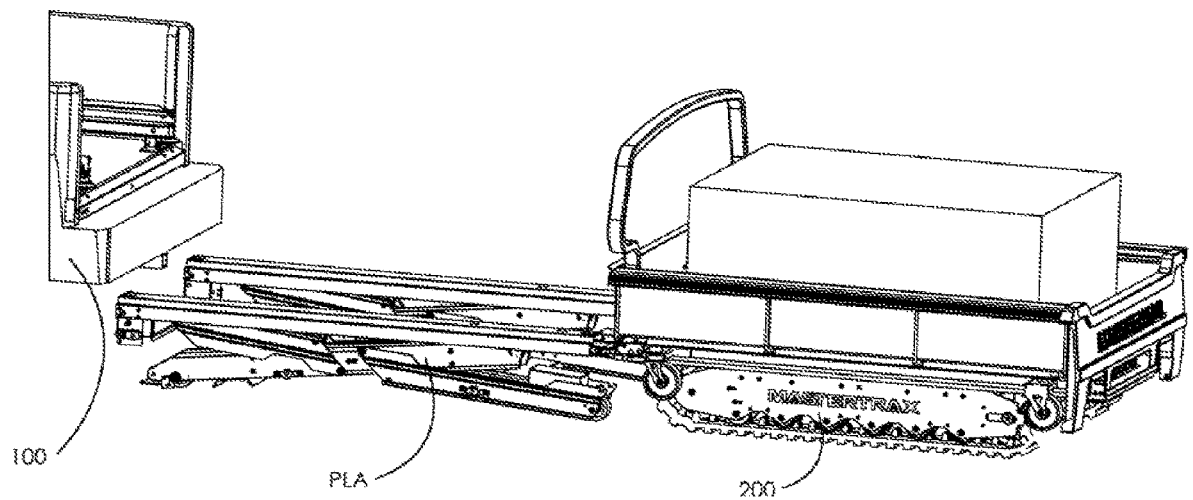
Figure 45:
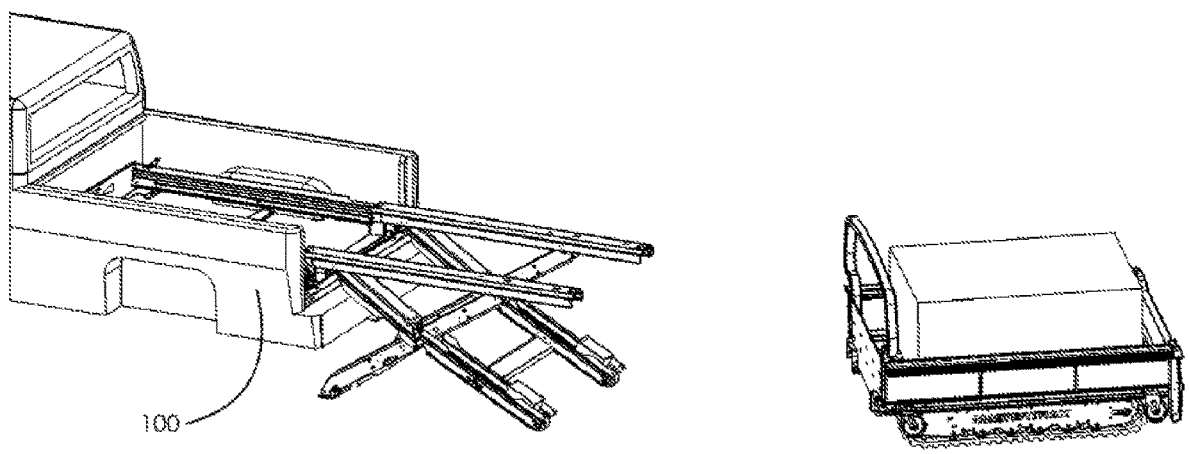

FIGS. 40 and 41 illustrate a potential application of features of the present invention in connection with a delivery vehicle or cargo van or even a trailer of a tractor/trailer vehicle 100, particularly such a vehicle 100 that is autonomous or self-driving, Here, the application deck/bin APP/B is modified so that the floor panels described in the previous figures are received beneath a powered conveyor belt 180. Thus, cargo C is previously loaded onto the application deck/bin APP/B of the loading/unloading system 110 such as at a warehouse (not shown), and the vehicle 100 completes a delivery to a worksite, commercial establishment, resident, etc. The doors 104 of the vehicle 100 can be made to automatically open as a part of the autonomous vehicle, and thereafter, the power loader assembly PLA can remove the application deck/bin APP/B from the vehicle cavity 102, position the application deck/bin at the desired location of the worksite, and the conveyor belt 180 that includes one or more pusher members or blocks 182 integrated onto the belt, or push members or push bars 184 that may, for example, extend from one or both sides of channels in the application deck/bin rails 160, 162 to selectively engage the cargo C and the push bars move along with the cargo relative to the application deck/bin, and push the cargo from the application deck/bin to the desired location of the worksite. Once the cargo C has been removed from the application deck/bin APP/B, the application deck/bin APP/B is then loaded into the vehicle cavity 102 for return to the warehouse for the next delivery.

FIGS. 42-45 illustrate transfer of an application deck/cargo bin APP/B from the power loader assembly PLA onto a motorized tracking device 200. For example, the track device 200 includes first and second continuous tracks or belts 202, 204 mounted on a frame 206. The frame 206 receives the application deck/bin APP/B and if the application deck/bin includes casters, the frame is designed to support the casters above the ground surface. The frame 206 may include roller bearings or the like facing upwardly to facilitate transfer of the application deck/bin APP/B from the power loader assembly PLA onto the track device 200. The tracks or belts 202, 204 facilitate movement of the track device 200 on the worksite, particularly one that has uneven ground surface and is typically too rough of a terrain for wheels to easily roll. The track device 200 can have other uses by modifying the frame to accommodate different end uses, e.g., in agriculture where the frame 206 spaces apart the belts 202, 204 to track along the aisles on either side of the plant rows.

Additional, specific structural details are enumerated and described below.

Legs and rails are aluminum extrusions. Channels are extruded into the parts for many different purposes. In the leg assembly, the channel shape receives batteries therein to power motors to drive the power loader assembly. The batteries are preferably linked together to power the motors. One skilled in the art will also appreciate that the batteries are not required to be mounted in the legs/rails of the assembly but could also be separately mounted at different locations on the vehicle or power loader assembly, or plug-in power may also be used as an alternative-either from the vehicle or another power source.

Figure 46:
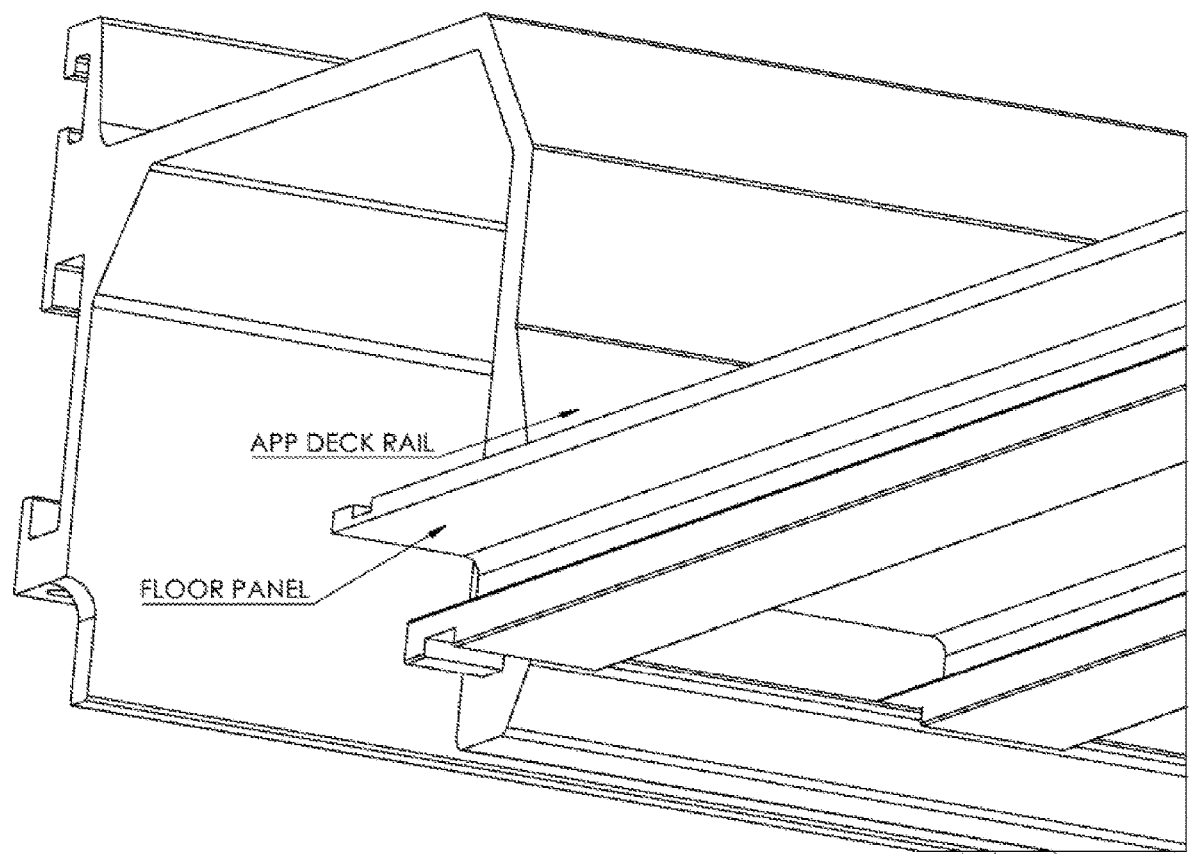
FIGS. 46-92 are detail views of different structural and functional features of the present disclosure.

The application deck/bin rail aluminum extrusions have channels for the floor panels to slide into, this creates a weld free, bolt free, all aluminum assembly (FIG. 46).

Figure 47:
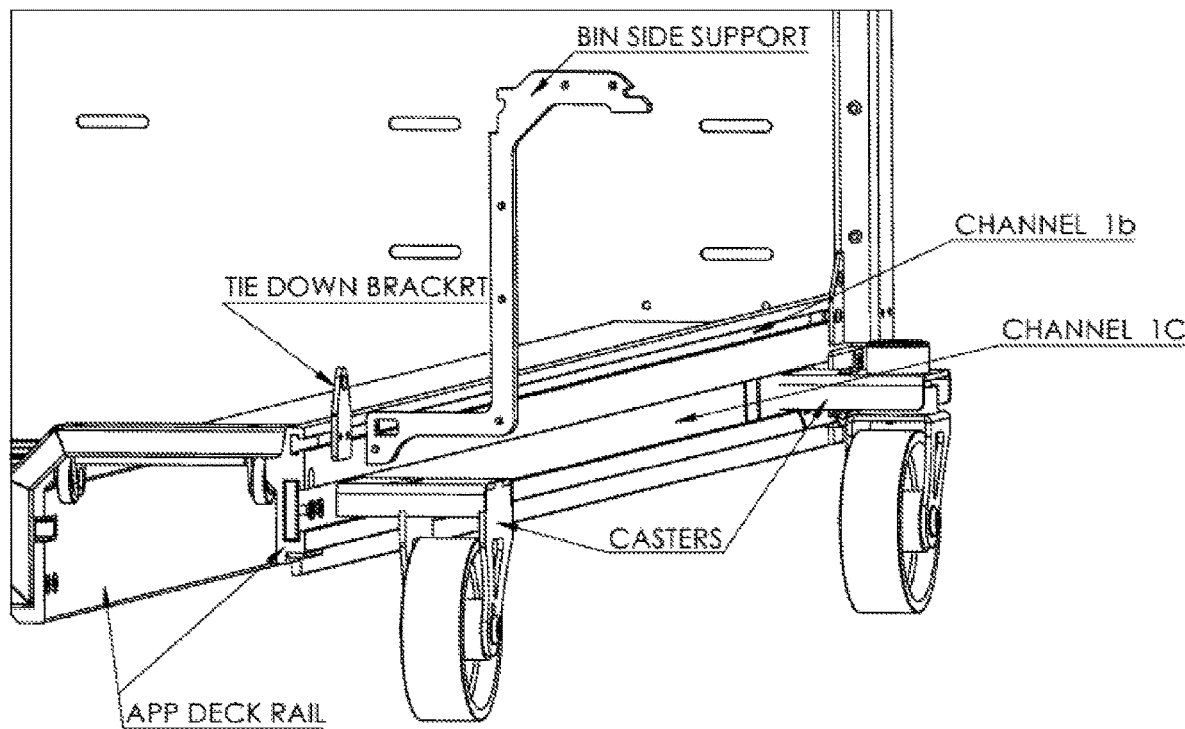

Channels are extruded into the app deck rails for mounting the bin side supports or for installing tie down brackets (FIG. 47).

The application deck/bin extruded rails have channels for the casters to slide into, allowing the front casters to slide back as the application deck/bin is rolled into the truck. Without this feature, the casters would run into the wheel wells of the truck preventing the application deck/bin from fitting into a standard pickup truck bed (FIGS. 47).

Figure 48:
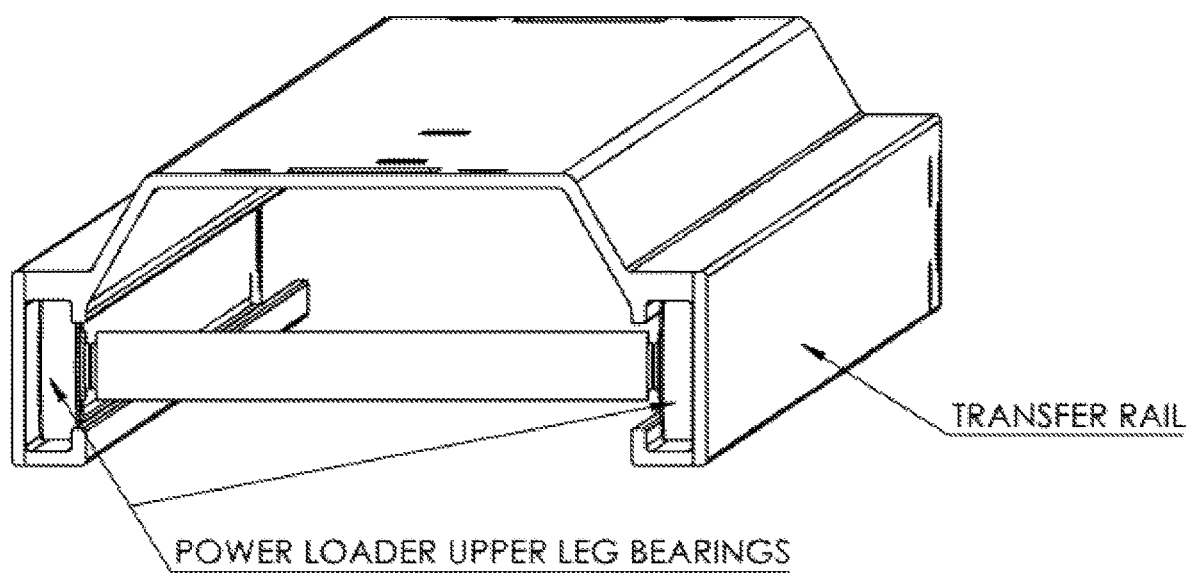

The transfer rail has channels in it for the power loader upper leg bearings to roll in (FIG. 48).

Figure 49:
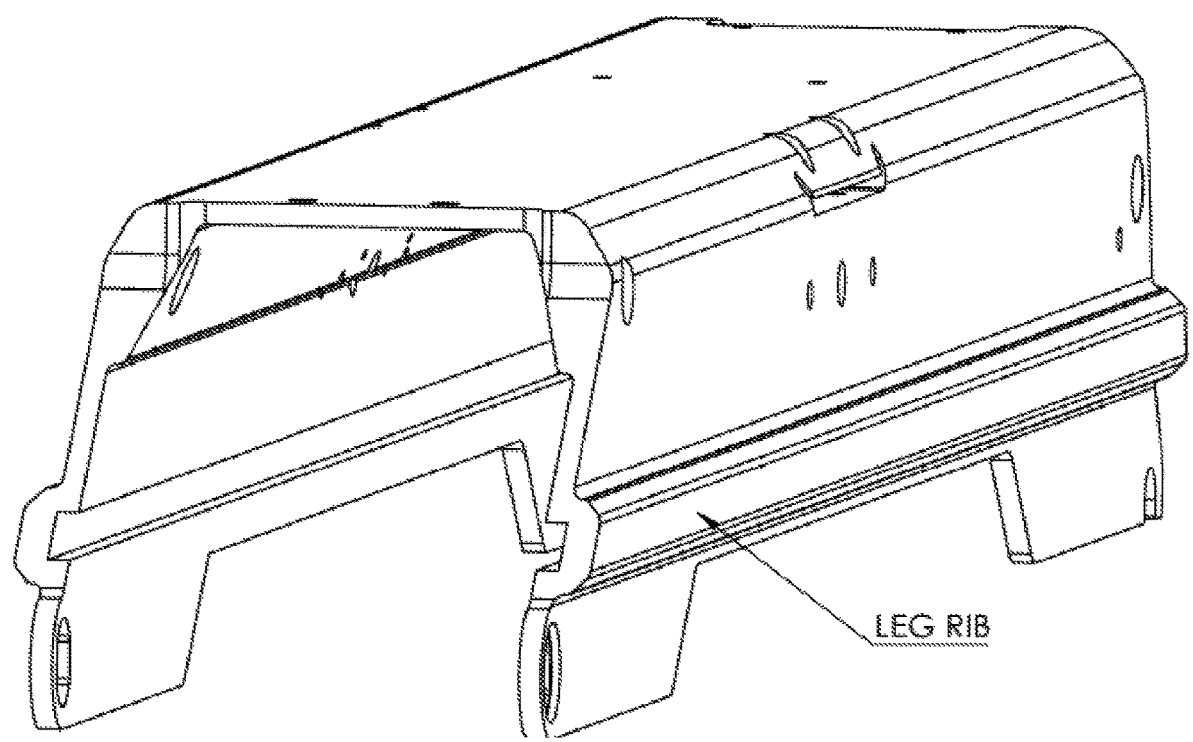

The outer legs have ribs running the length of them to add strength. A channel is formed on the inside of these ribs for latch 14's slide bar to ride in (FIG. 49).

Figure 50:
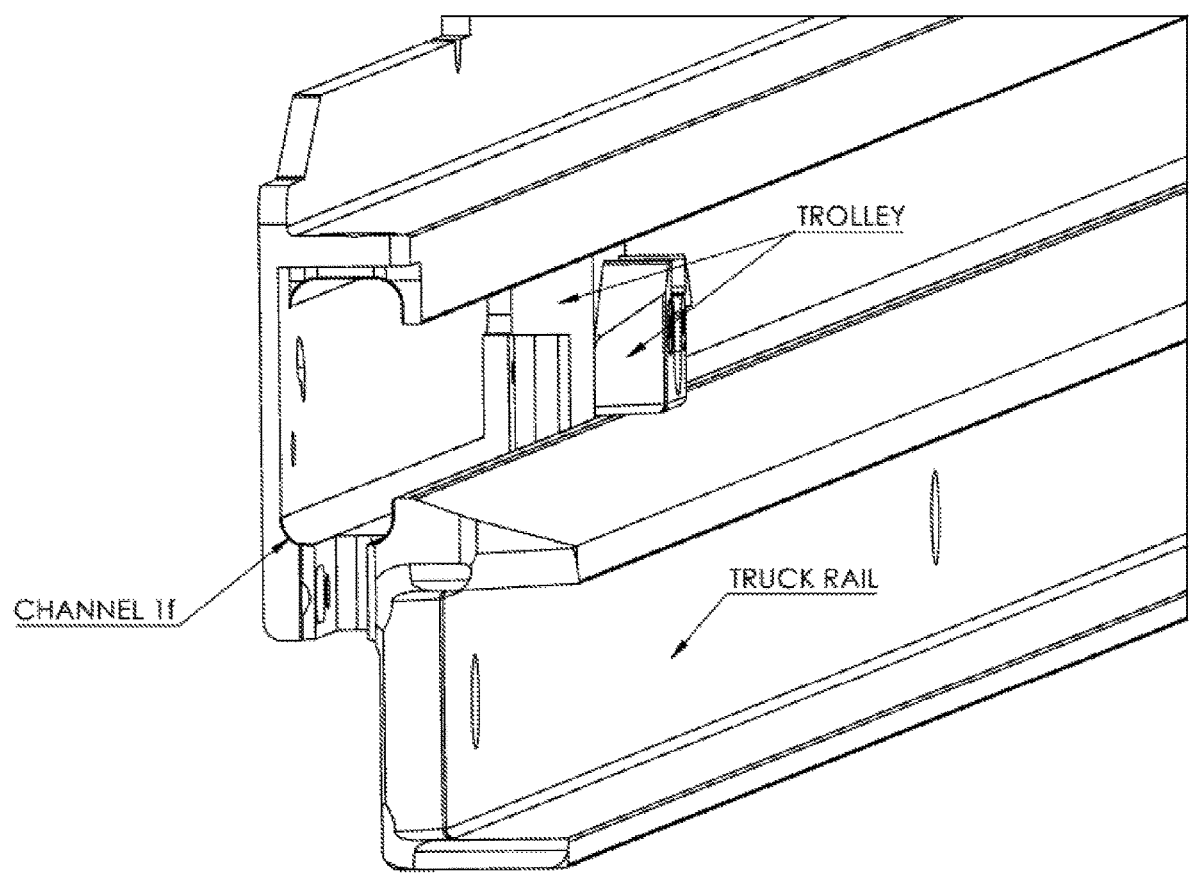

The truck rails have a channel for a trolley to travel in. This trolley is used to pull or push the app deck and the power loader into and out of the truck bed (FIG. 50).

Figure 51:
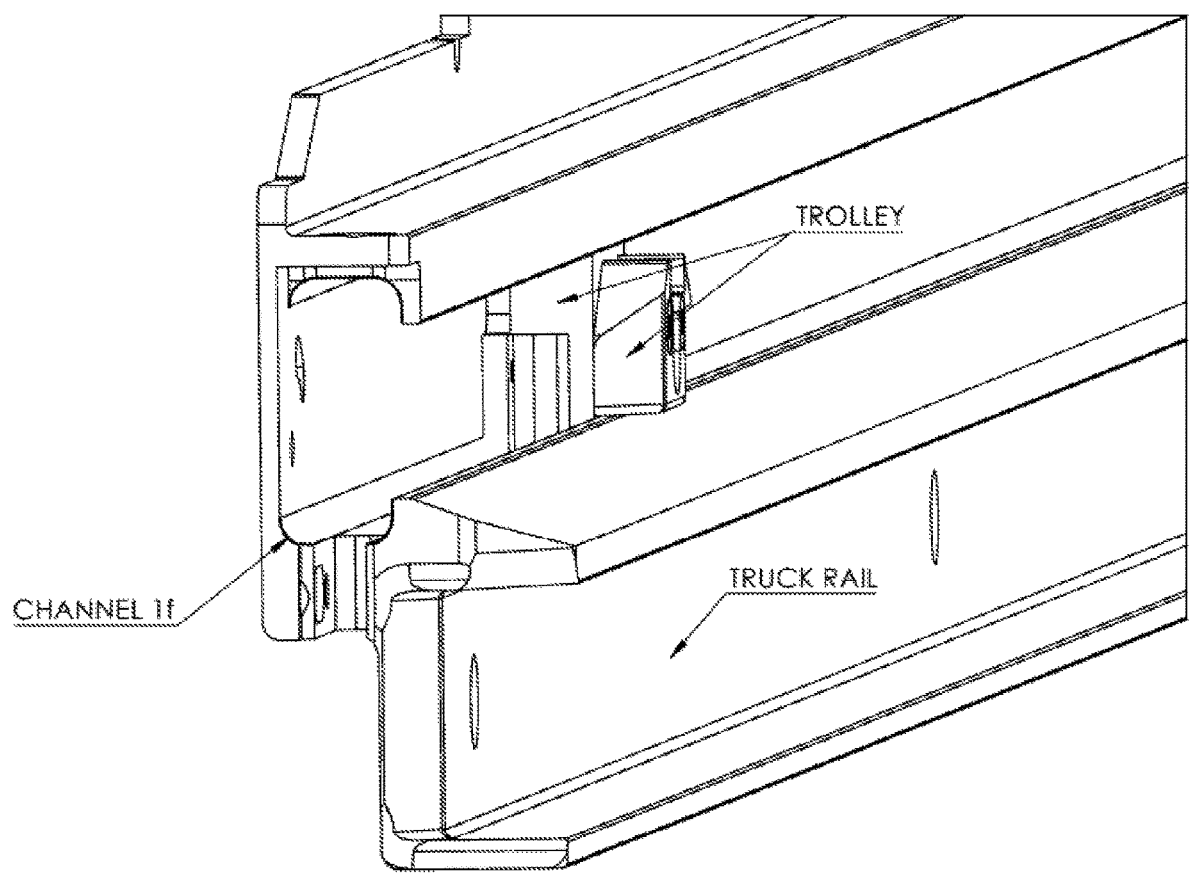

Truck rails are installed in the truck bed for both the power loader and the application deck/bin to roll into (FIGS. 2 and 51). When the rear legs lift to the nest position they now cantilever, supported by the truck rails.

Figure 52:
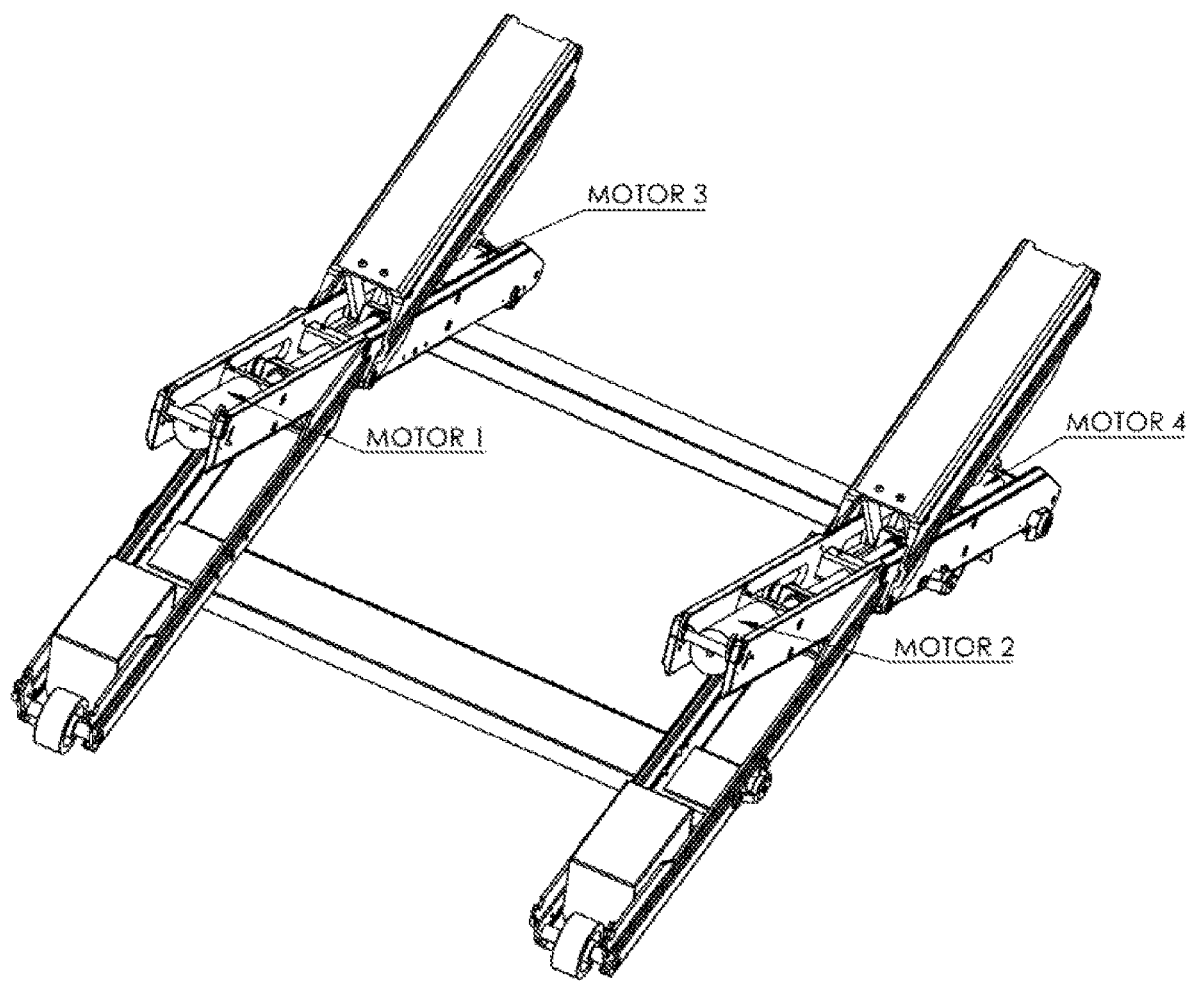
Figure 53:
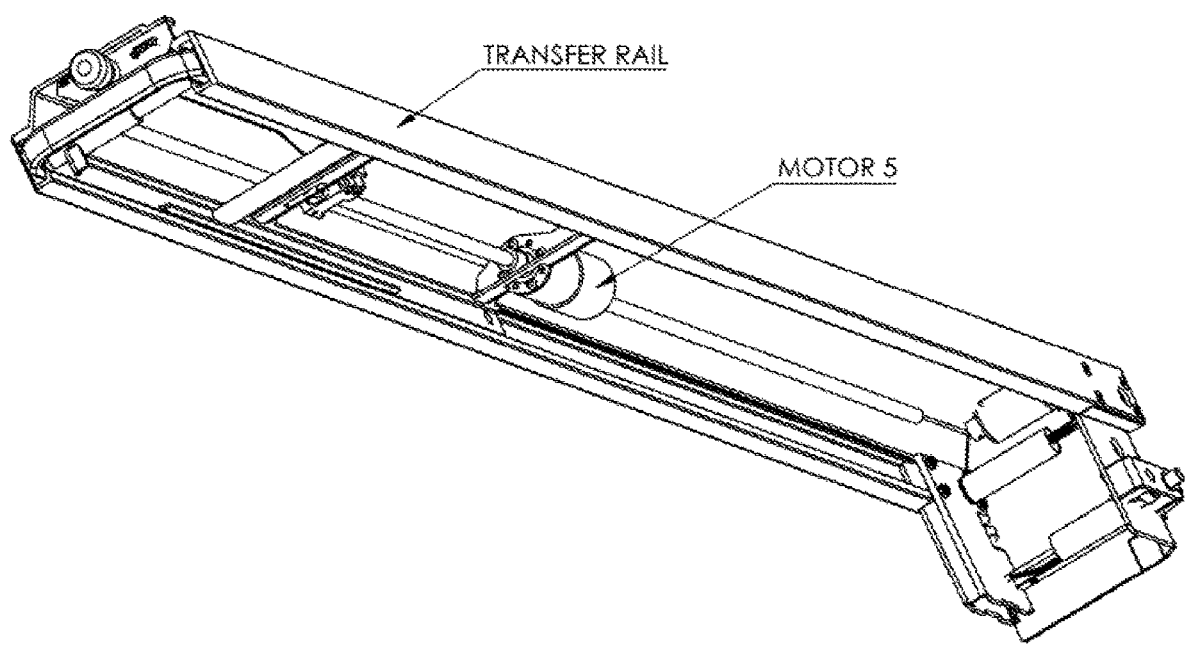

There are preferably four motors in the power loader legs allowing for independent control of each leg. This allows tilt, both fore and aft, and from side to side, to be controlled to compensate for different ground levels (FIG. 52). The motors are preferably located in the middle leg which consists of two flat bars bolted together using the motor mounts and the end support block for the drive screws. Each motor turns a drive screw which drives a push block that rides in a channel machined into the inner leg sides. The drive blocks have links that connect the drive blocks to the outer legs (FIG. 53). This is similar to FIG. 12 in U.S. Pat. No. 9,545,869 where that design used one motor, the drive screw had a different pitch on each end and drove both outer legs up simultaneously. In the present invention, two motors are provided in each leg with separate drive screws so each leg is controlled independently. The split nut arrangement shown in FIG. 25 of U.S. Pat. No. 9,545,869 is not used in the present arrangement.

A fifth motor is preferably installed in the transfer rail to drive the legs back so the front leg can be raised without hitting the bumper (FIG. 53).

Figure 54:
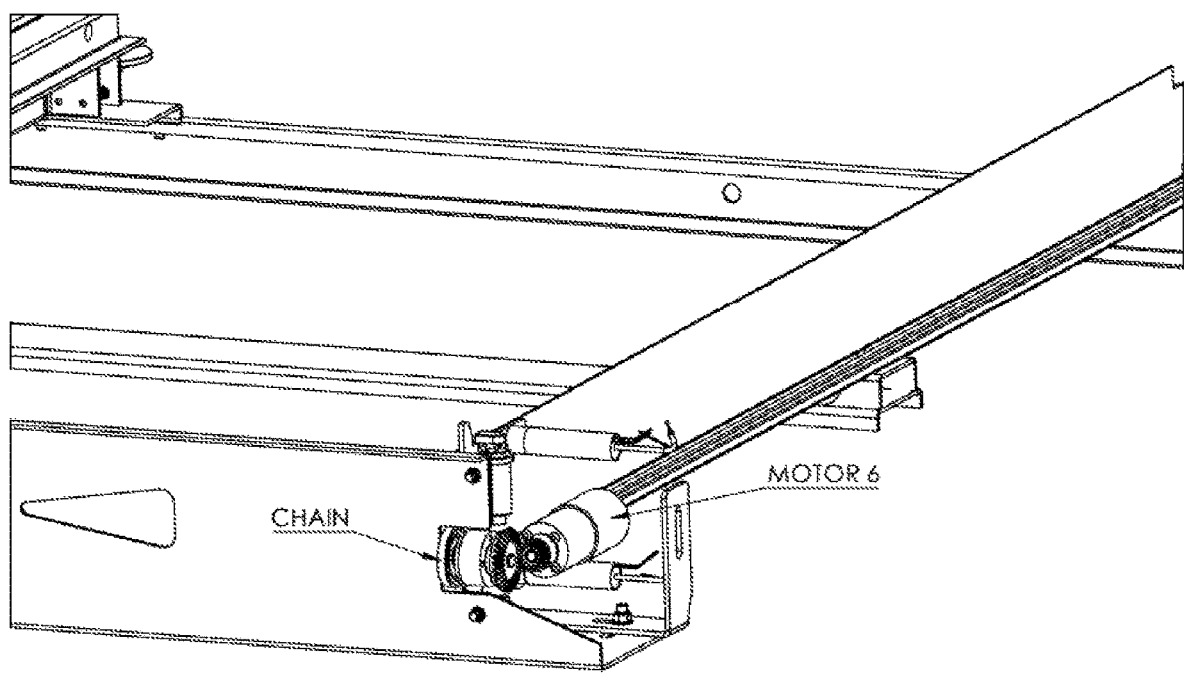

A sixth motor is installed on the truck rails and drives a chain that in turn drives a trolley for moving the power loader assembly PLA and the app deck APP/B into and out of the truck 100. A drive screw could be used instead of a chain (FIG. 54).

Figure 55:
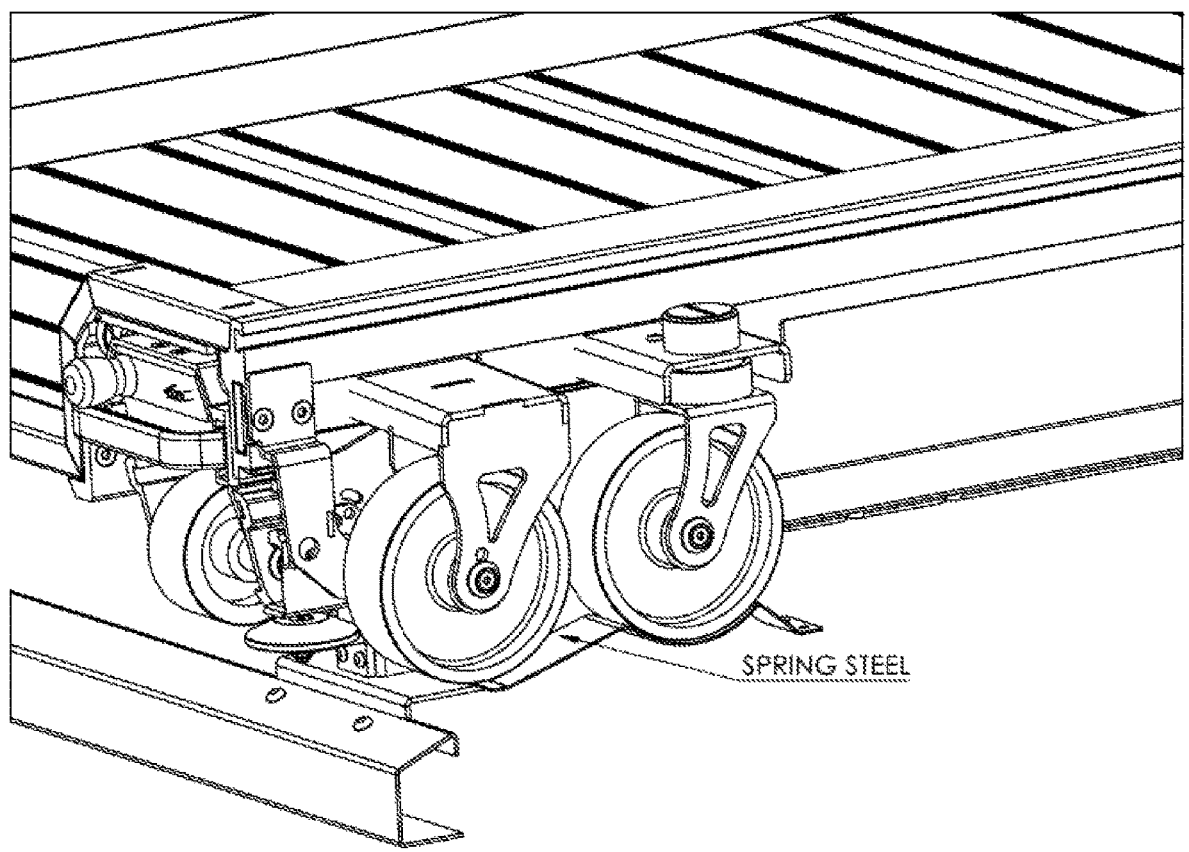

When the application deck APP/B rolls into the truck rails the casters 168 roll onto leaf springs 250 next to the truck rails, the leaf springs hold the caster up a little to reduce the friction between the caster slide and the channel that they slide in. This support provided by the leaf spring also has a detent to hold the caster wheel into the truck bed as the app deck is rolled out so that the caster returns to the front of the app deck (FIG. 55).

Figure 56A:
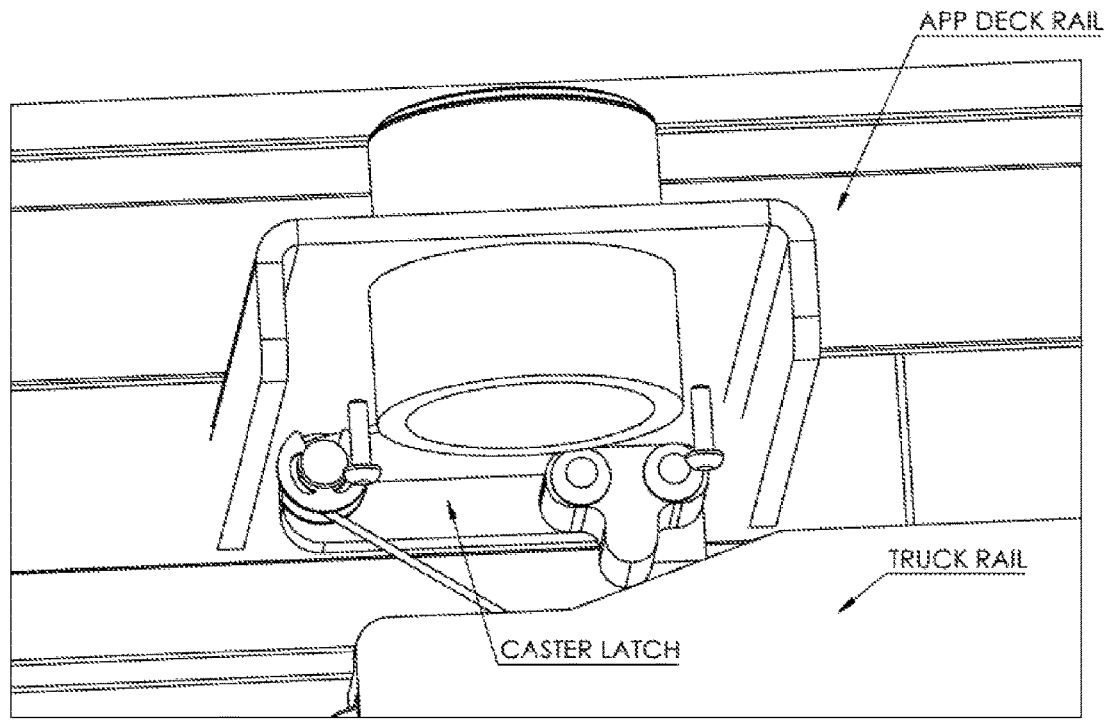
Figure 56B:
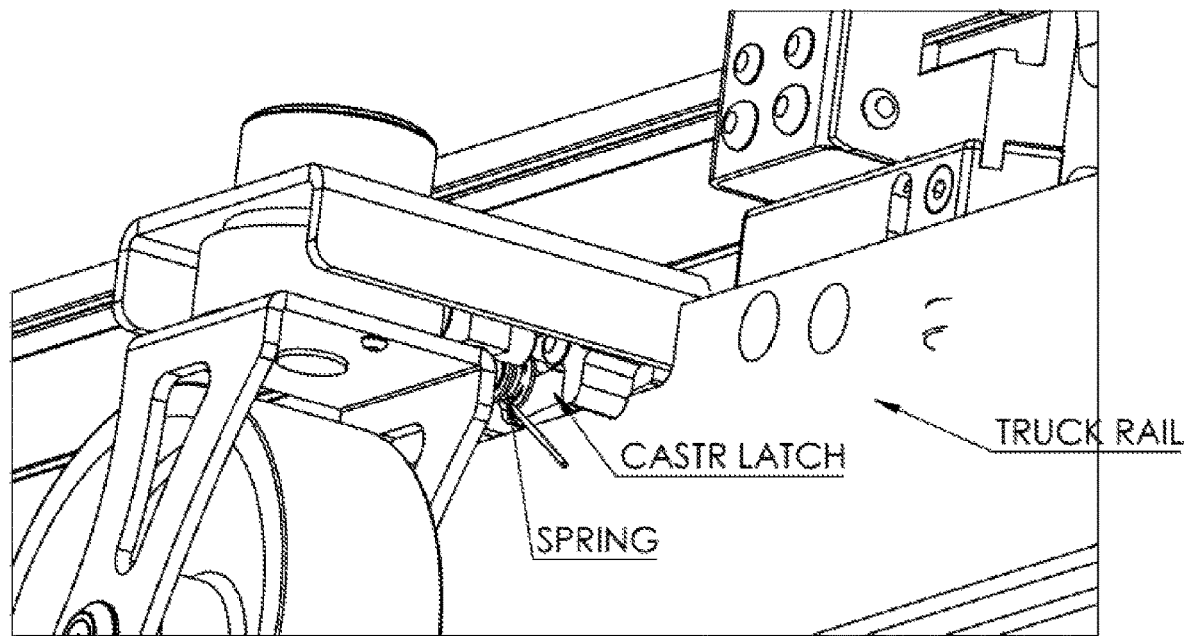

There is a latch on the casters that hold them from sliding in the channel when the app deck is pushed around on the ground. When the application deck APP/B is rolled into the truck rails this latch is lifted up at one end by the truck rails disengaging them from the app deck and allowing the casters to slide back in the app deck channel 1C (FIG. 56A-56B).

Figure 57:
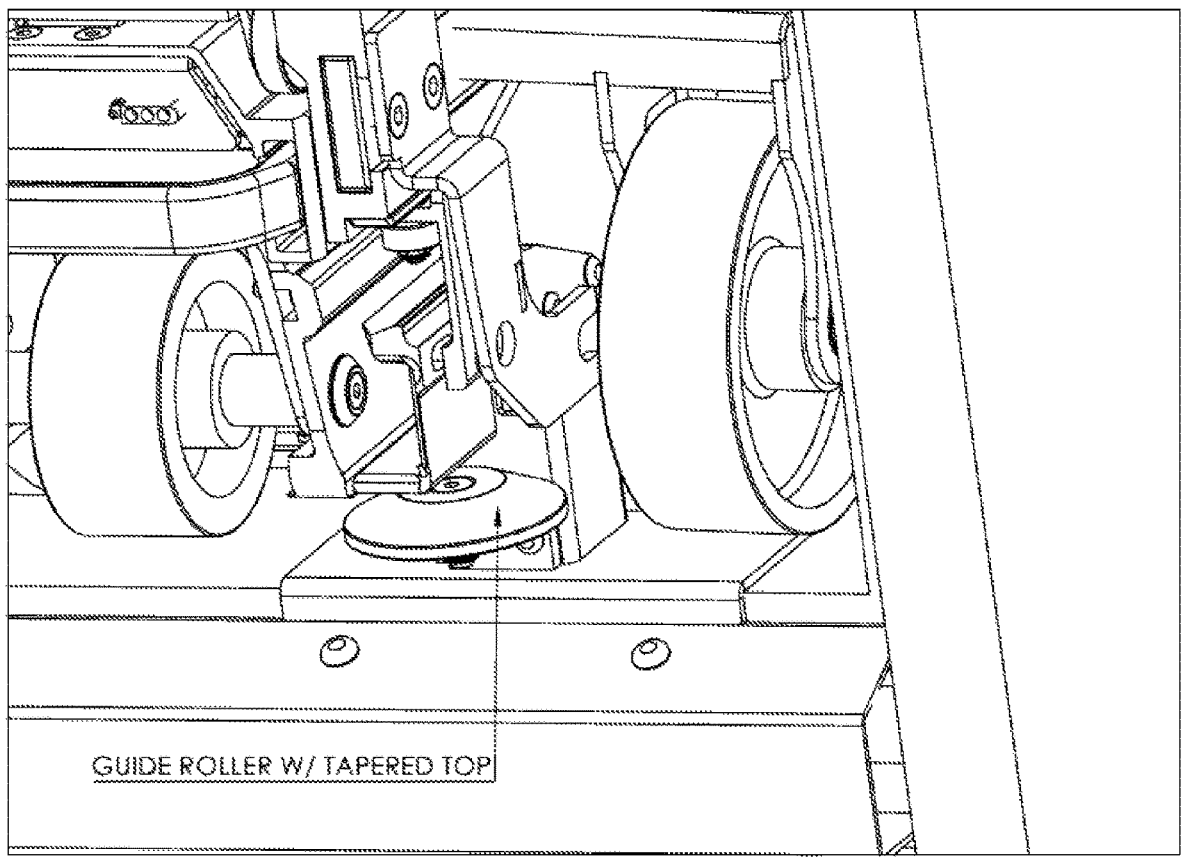

There are rollers installed at the entrance to the truck rails to guide the transfer rail and the application deck/bin into the rails. These rollers have a tapered top face so if the transfer rail or app deck are slightly too low, as they are guided in they will be lifted up in line with the truck rails (FIG. 57).

Figure 58:
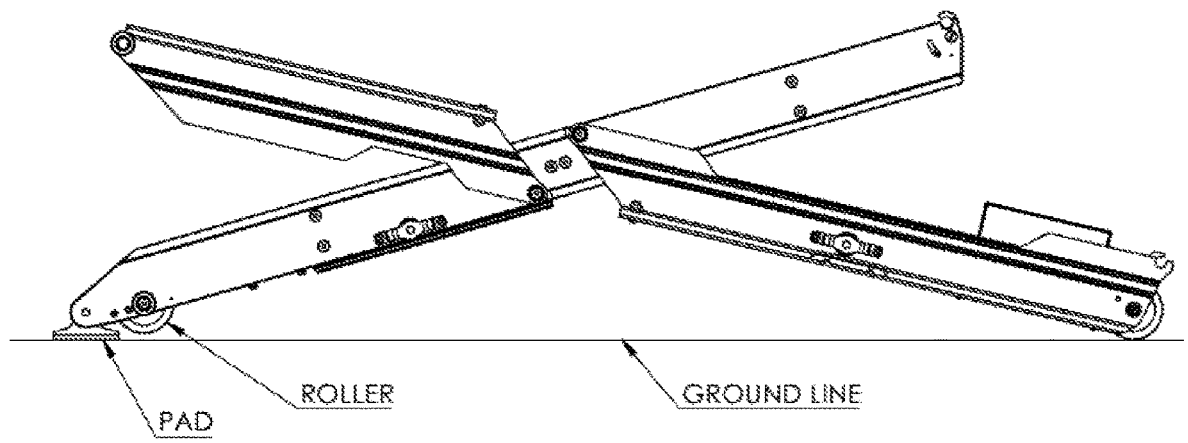
Figure 59:
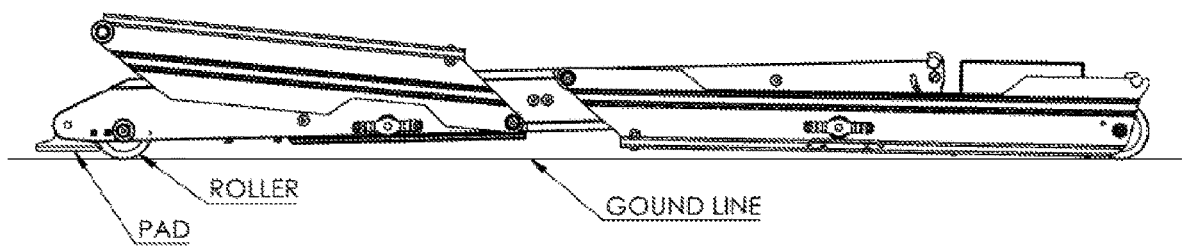

The front legs on the power loader have pads instead of wheels that sit on the ground when the loader is lifted. This prevents the power loader from rolling while the app deck is loaded and unloaded (FIG. 58). When the power loader is lifted a small distance off the ground, wheels mounted behind the pads contact the ground allowing the power loader with or without the app deck on it, to be rolled back and forth (FIG. 59).

Figure 60:
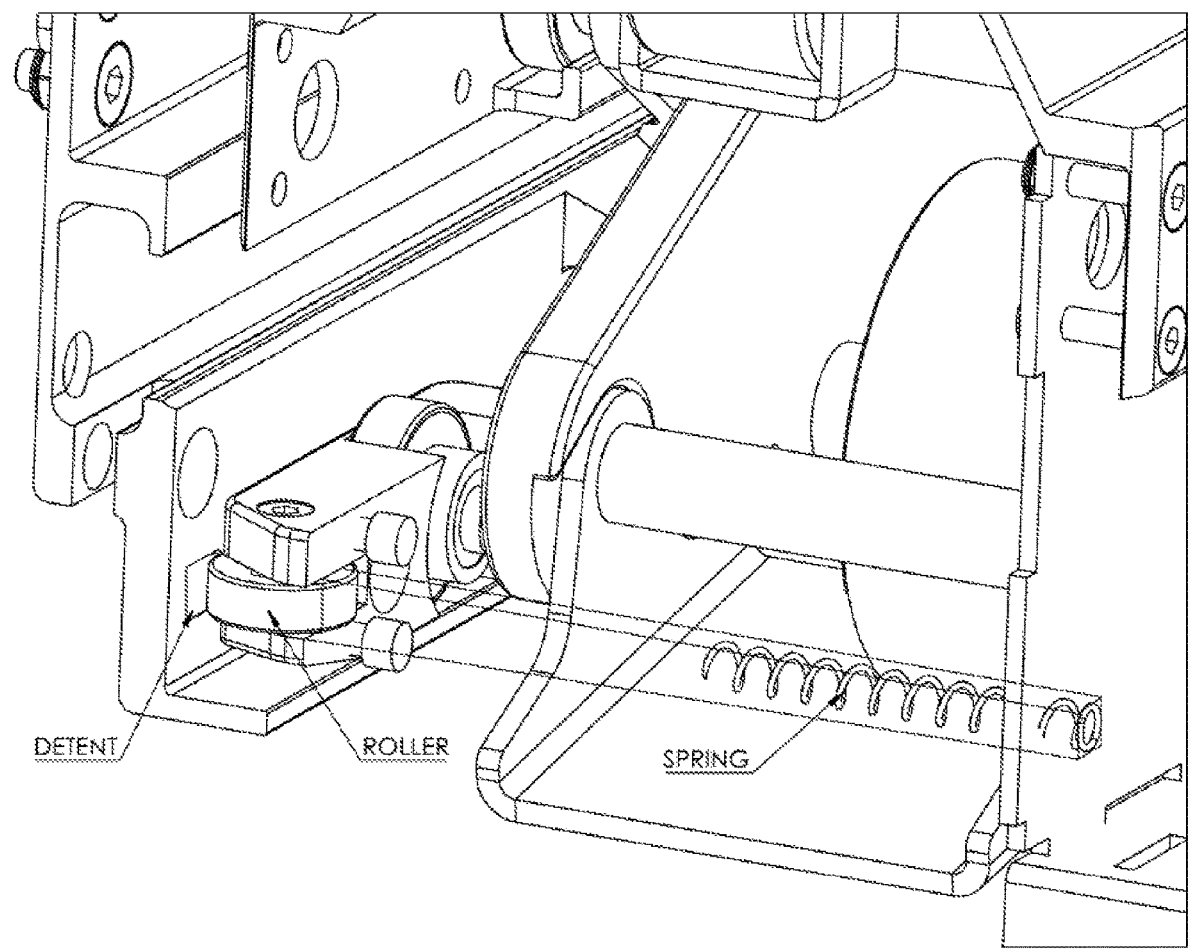

There are rollers installed in the front and on the side of the transfer rail that guide it in and keep it centered in the truck rails. These rollers are spring loaded to the outward position. There are detents in the truck rails for these rollers to engage. When the rollers are engaged in these detents it assures that the solenoid pins are in alignment with their locking holes (FIG. 60).

Figure 61:
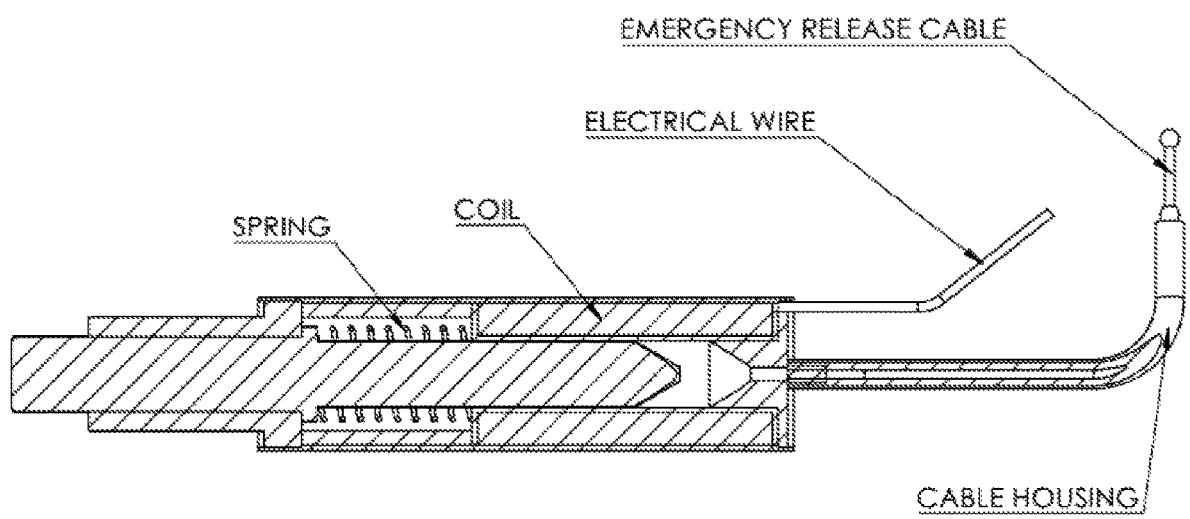
Figure 62:
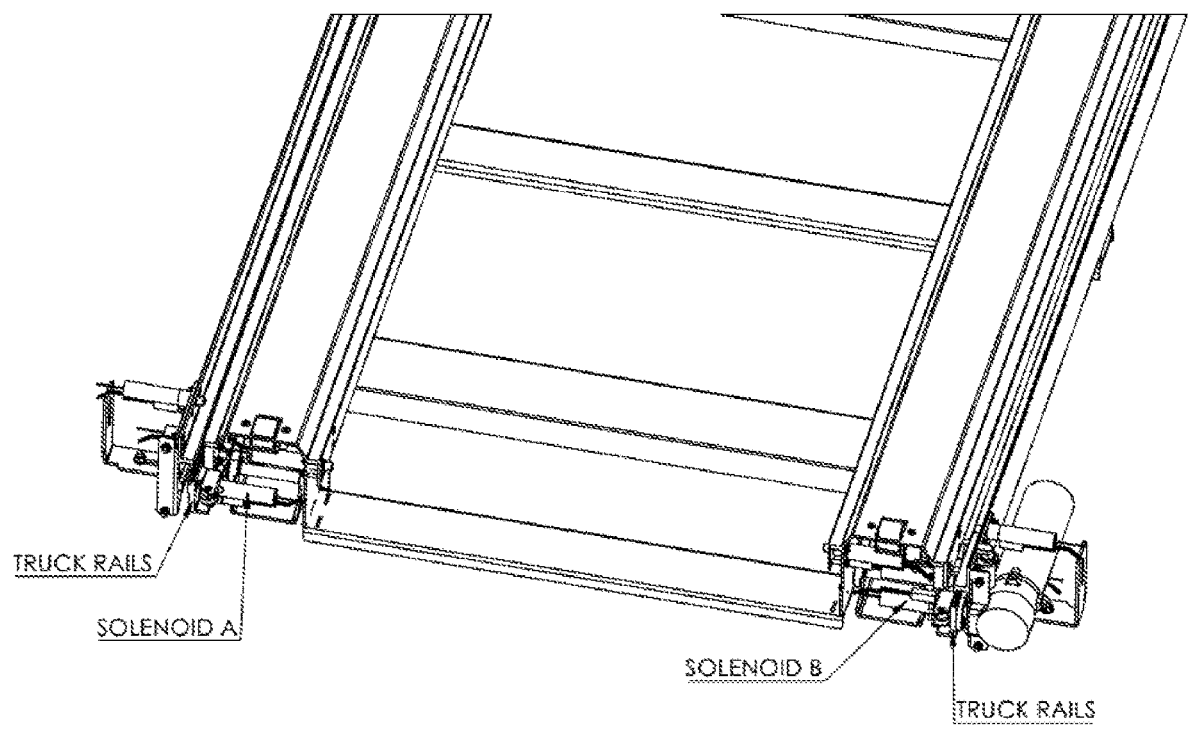
Figure 63:
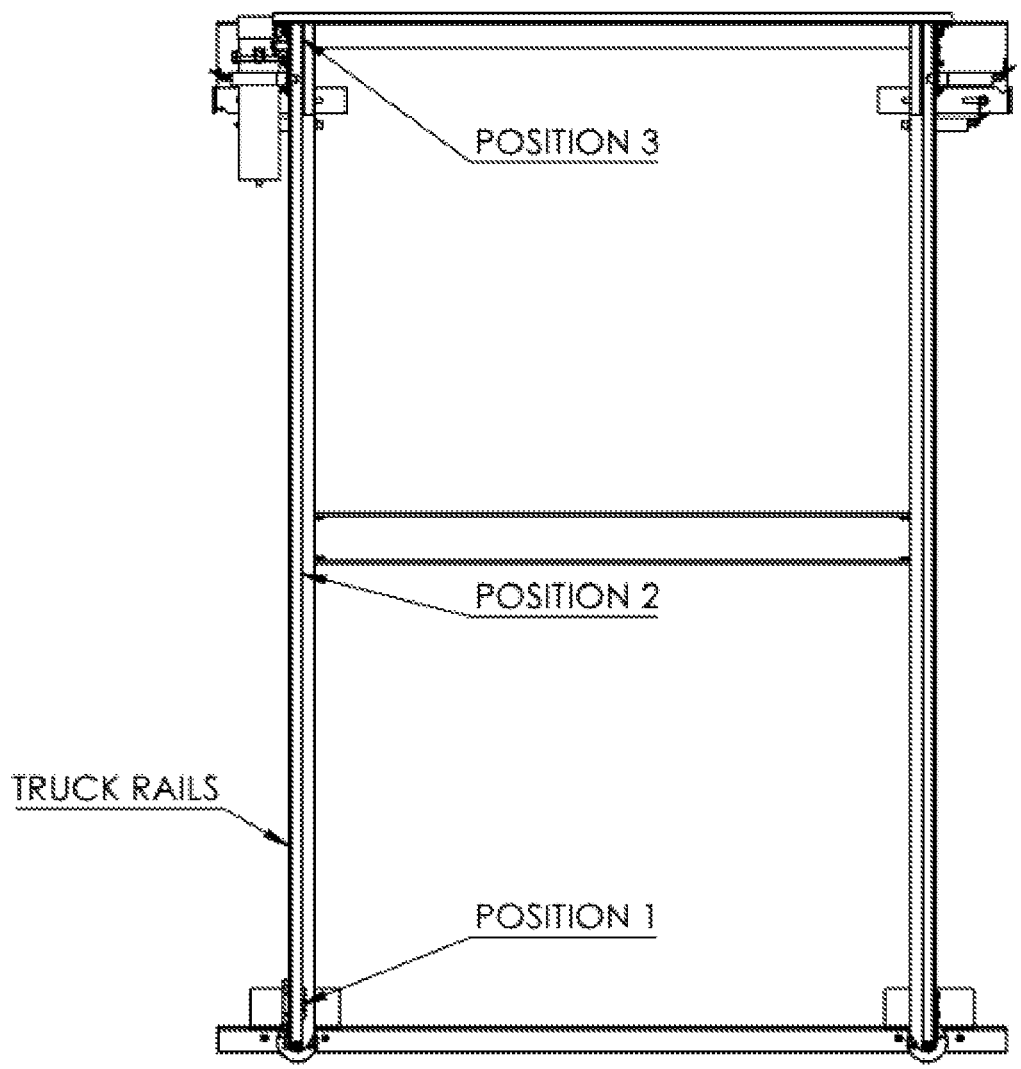

Solenoids are used throughout the power loader to latch parts into or onto rails. Two of these solenoids (D&G) are standard push type. Nine of these solenoids are a special designed pull type with their plunger acting as a pin engaging a hole to lock parts in place. These are unique in that they are made as a single part with the spring-loaded plunger and the coil in one housing. Another unique feature is that a small cable is attached to the plunger so in the event electrical activation is not possible the cable can be manually pulled to unlatch the solenoid (see FIG. 61). These solenoids perform the following functions. First, solenoids A & B control pins that are located in the front of the transfer rail (FIG. 62) and latch it to the truck rails in three locations: (a) at the back of the truck rails to hold the transfer rails to the truck rails while the application deck/bin is rolled in and out; (b) at a point in the middle of the truck rails to hold the transfer rail and power loader in place when the rear legs are lifted to the cantilever and nested position; and (c) at the front on the truck rails to hold the transfer rail and power loader into the truck while driving (FIG. 63). In each of these positions the pins engage holes or recesses in the truck rails.

Figure 64:
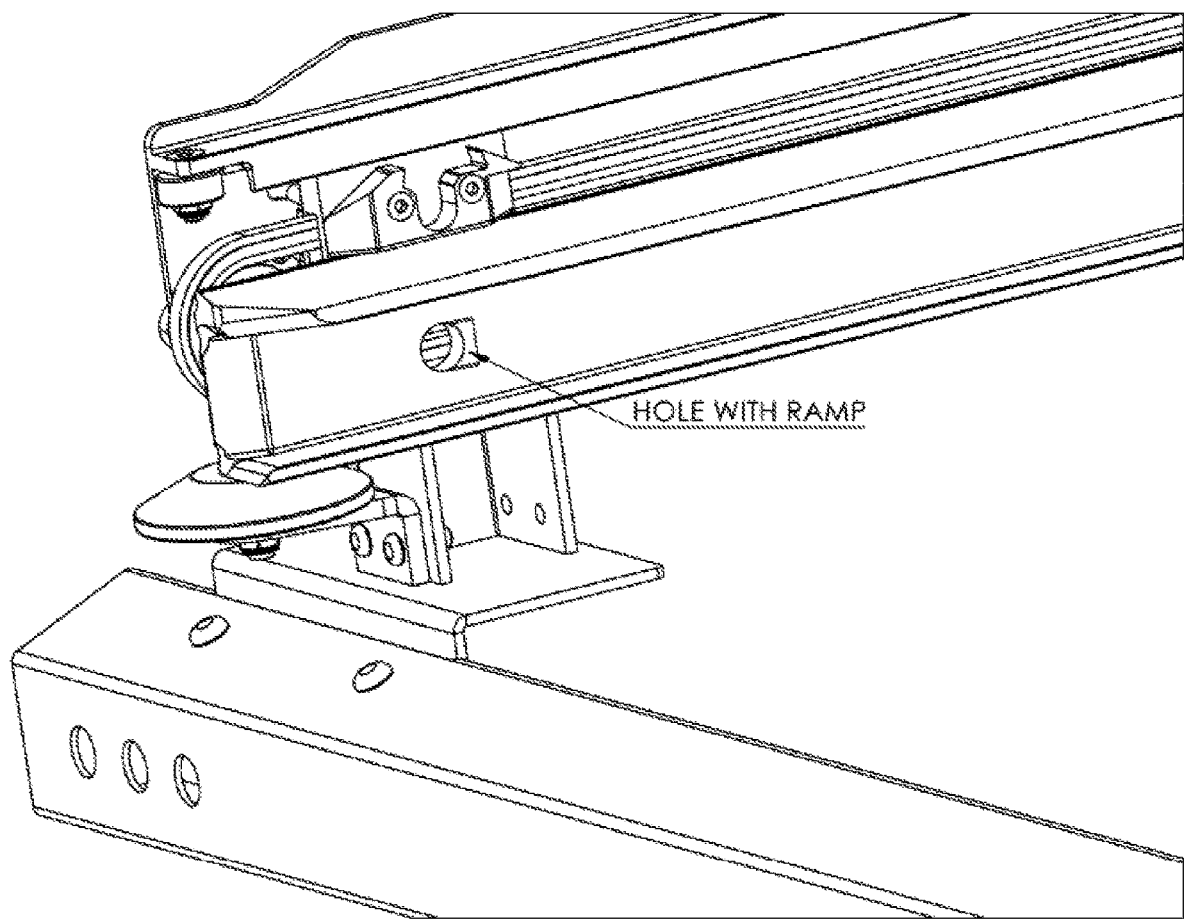
Figure 65:
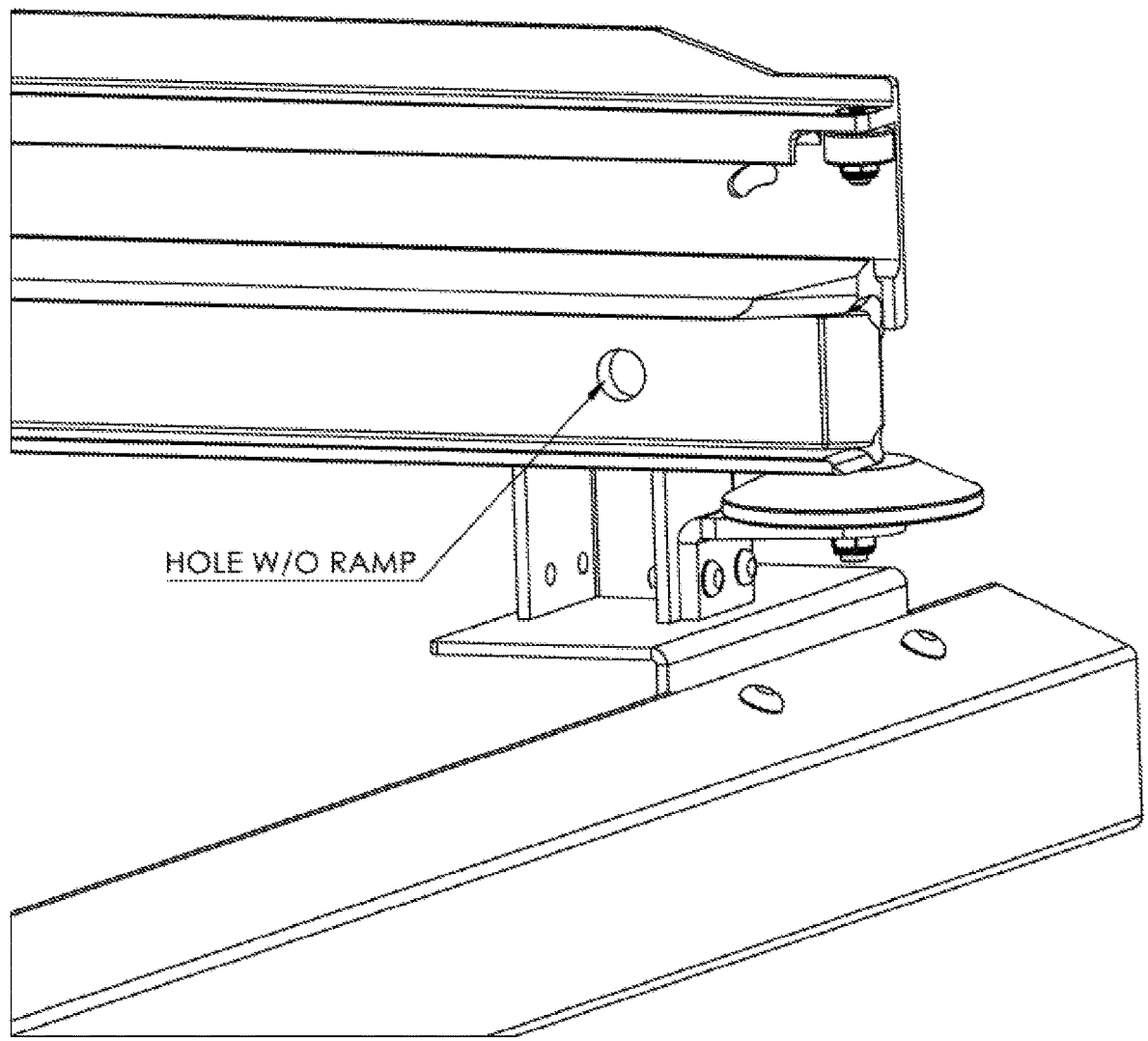

However, the holes at position 1 and 2 on left side have ramps on their front edge (FIG. 64) while the holes on the right side do not (FIG. 65). This allows the transfer rail to be moved from position 1 to position 2 and from position 2 to position 3 without activating solenoid A. This is necessary so if the truck is parked on a rearward incline is not necessary to release both A and B to move the transfer rail forward. Releasing both A and B at the same time in this situation could allow the transfer rail and power loader to undesirably roll backward and out of the truck.

Figure 66:
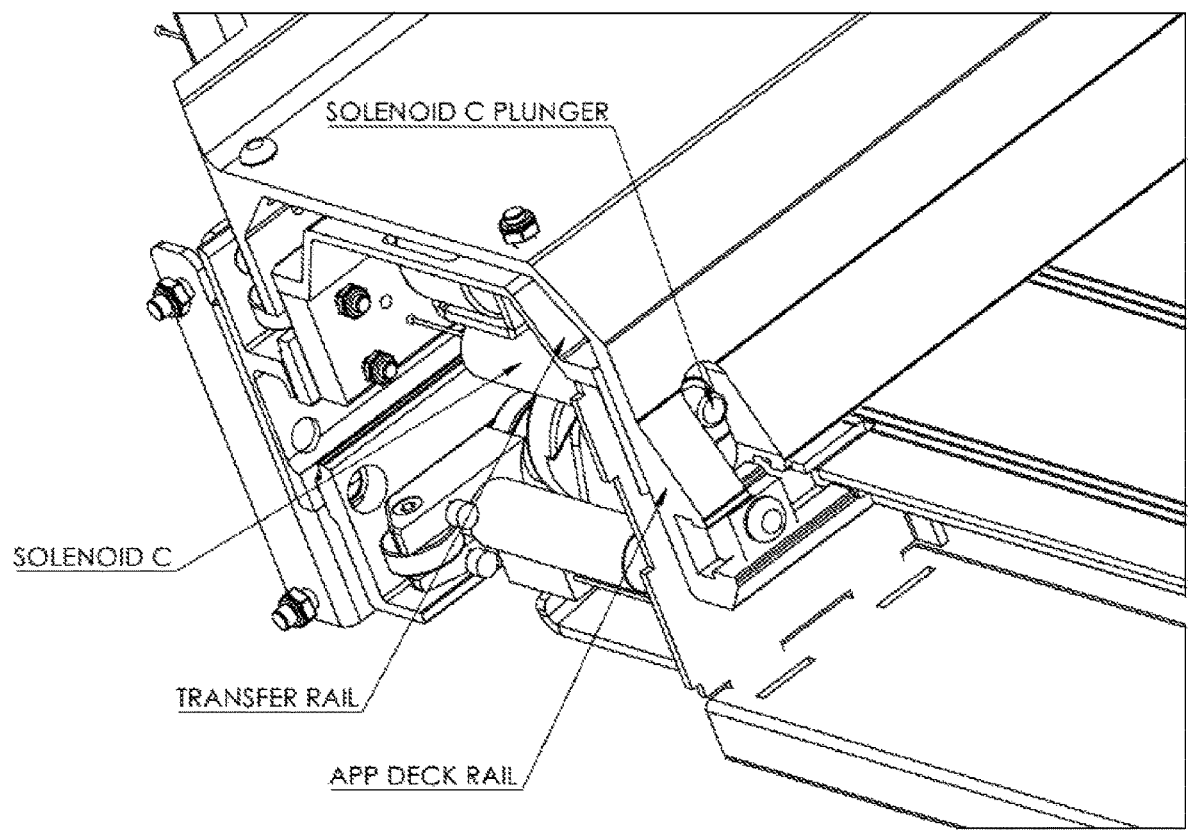
Figure 67:
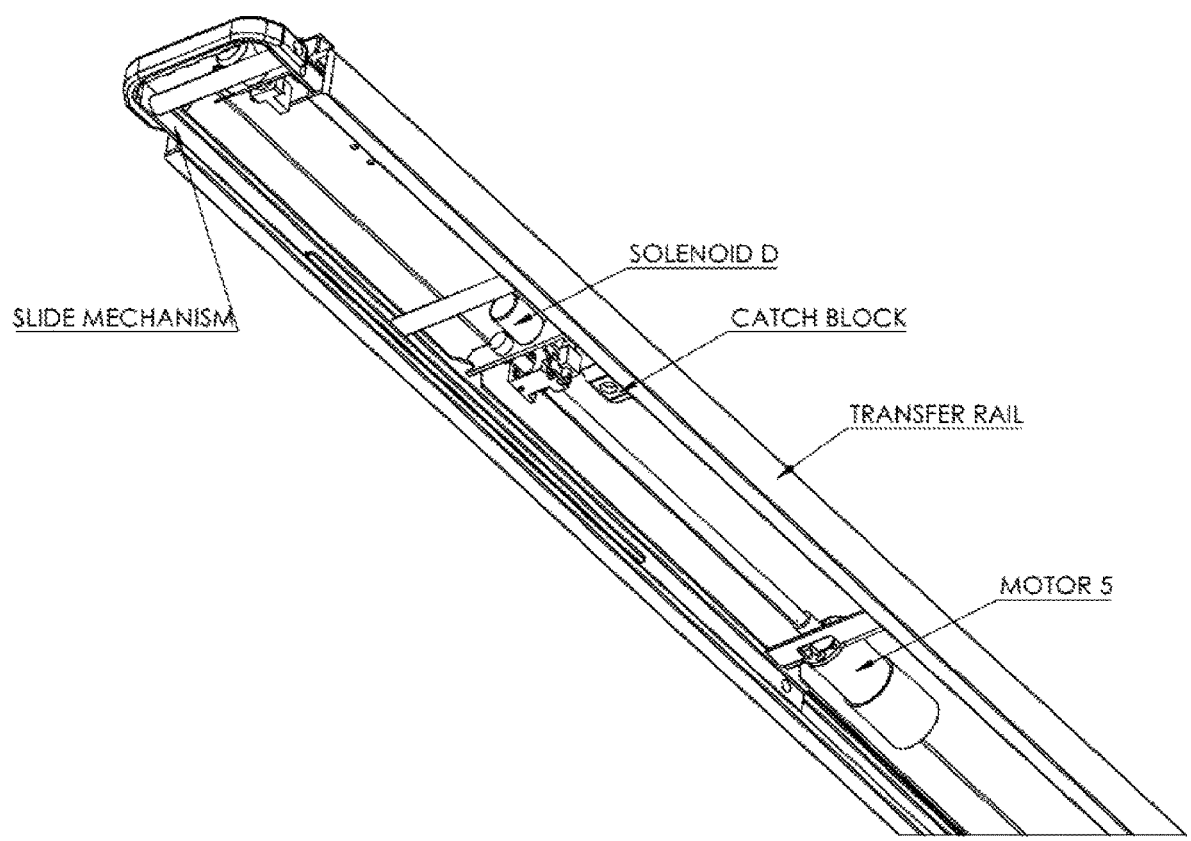

Second, solenoids C (two each) control pins in the transfer rails that latch the APP/B to the PLA while lifting and lowering and while in the dump mode (FIG. 66).

Figure 79:
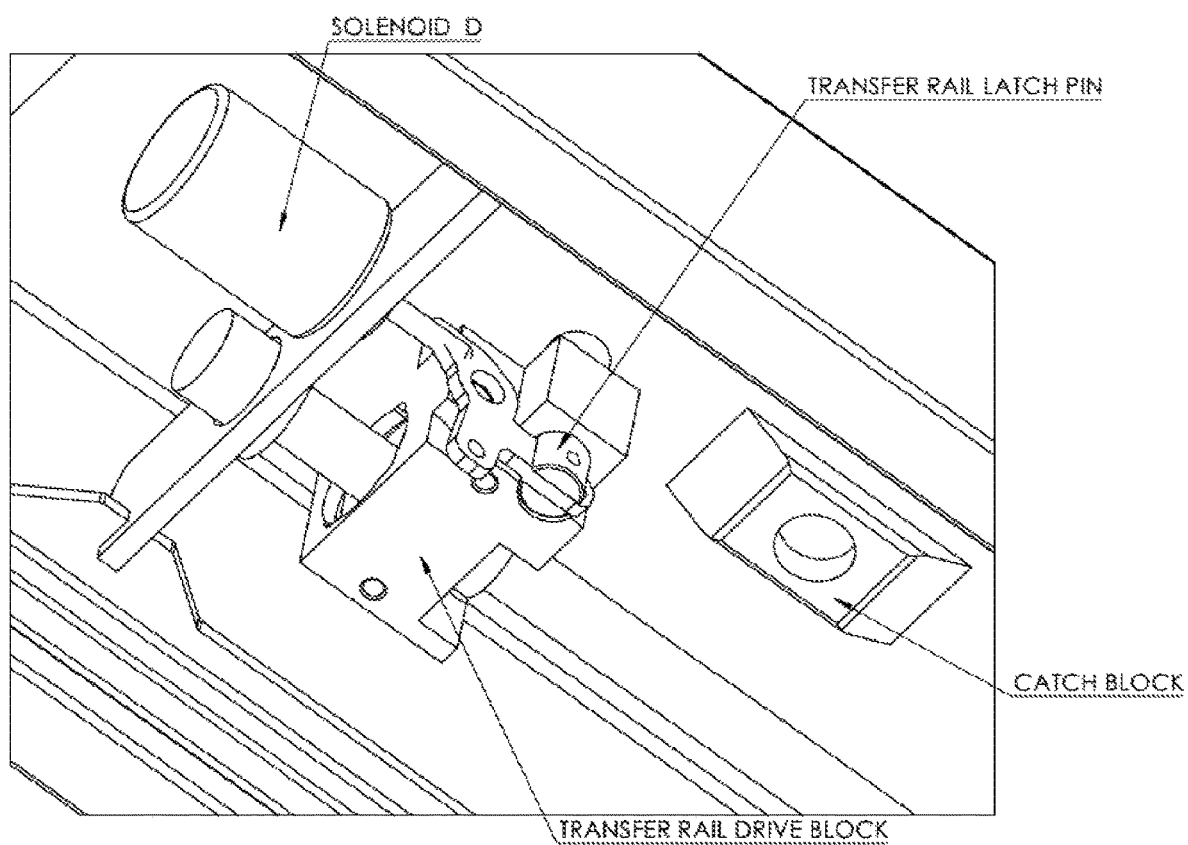

Third, solenoid D (push type) is used to release the motor 5 drive mechanism during the dump mode (FIG. 50, also see FIG. 79).

Figure 68:
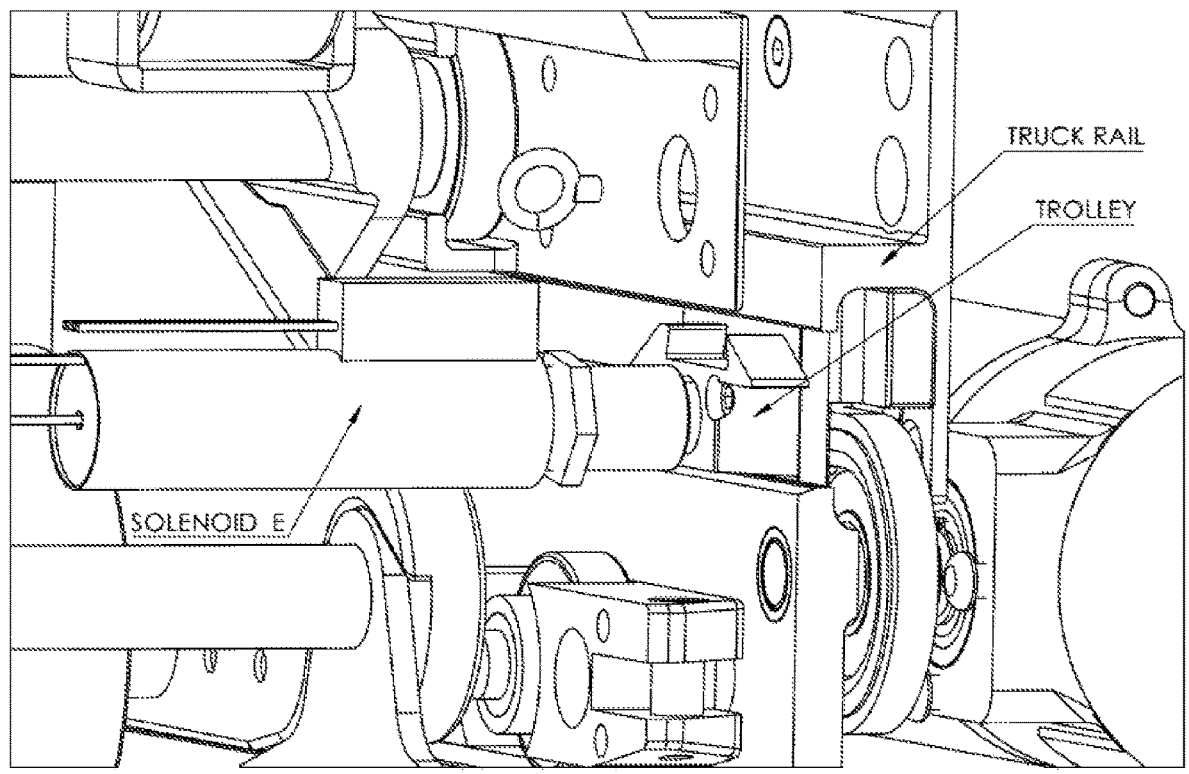

Fourth, solenoid E controls a pin that attaches the power loader to the trolley (FIG. 68).

Figure 69:
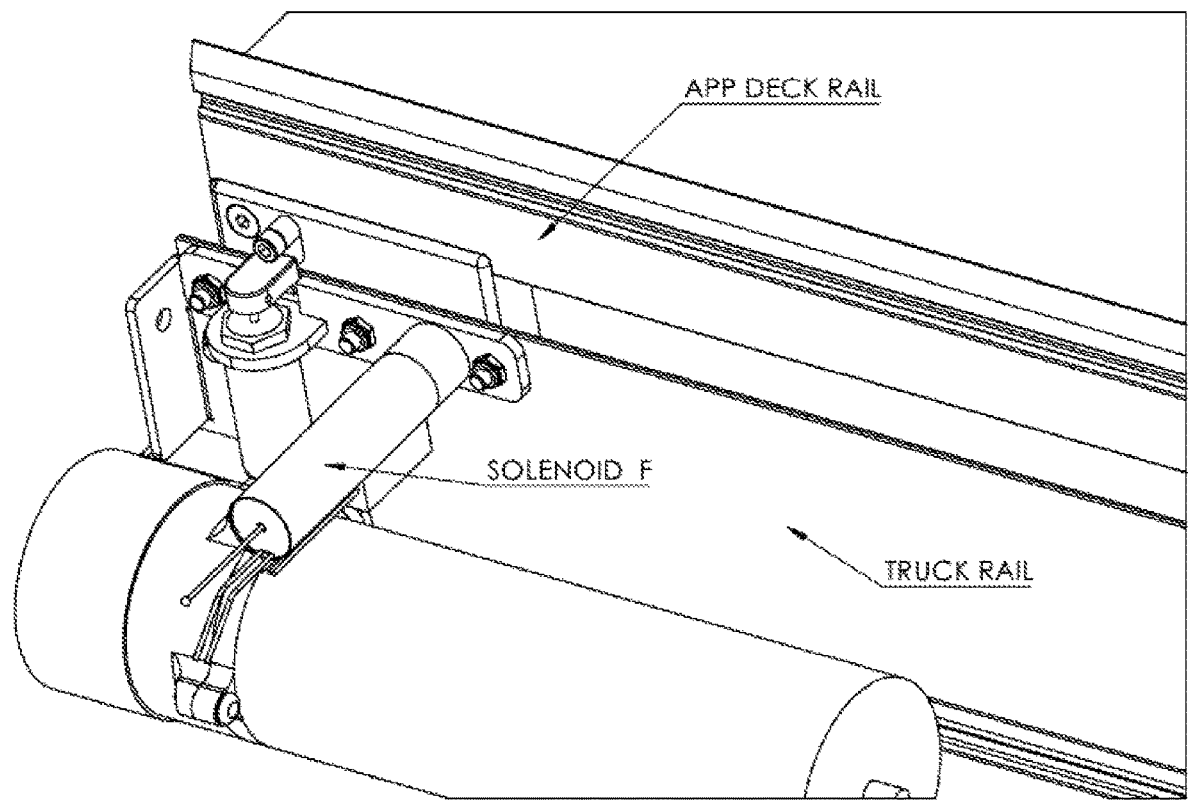

Fifth, solenoids F (two each) control pins that latch the application deck/bin to the truck rails while driving (FIG. 69).

Figure 70:
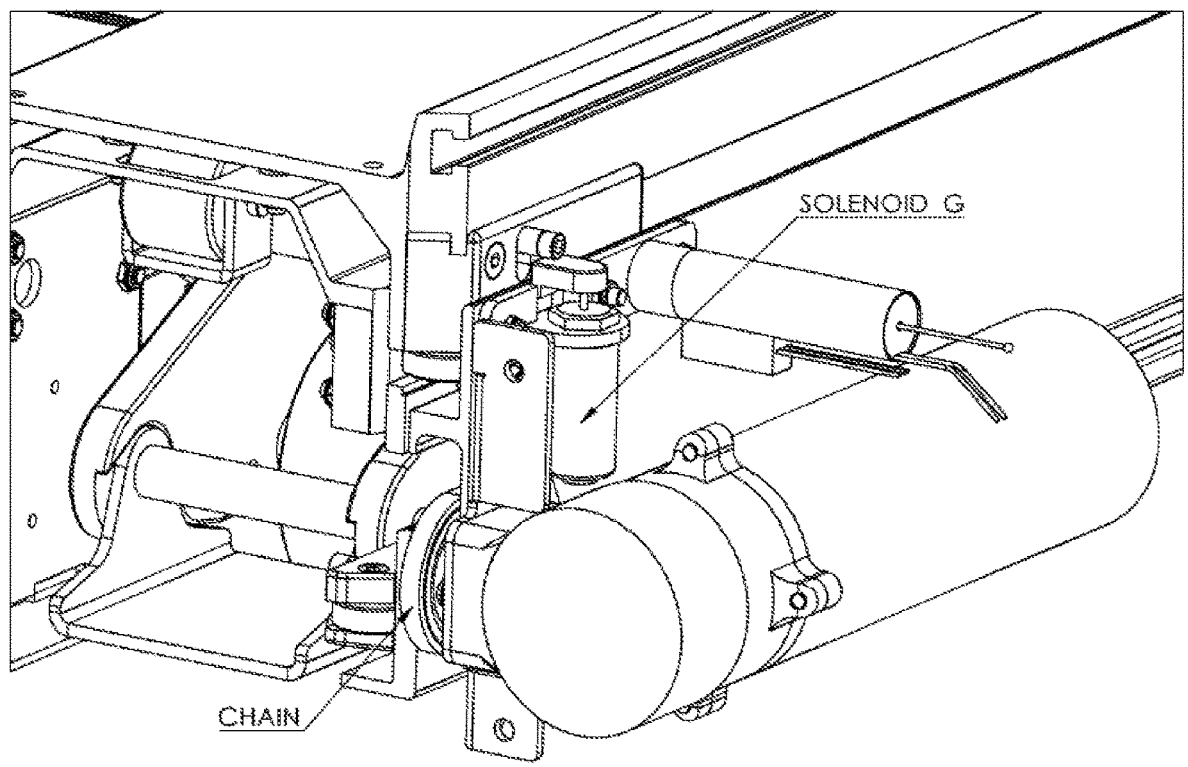

Sixth, solenoid G (push type) is used to disconnect the application deck/bin latch from the trolley when the application deck/bin is in the truck (FIG. 70). This allows the trolley to return to the back of the truck rails so that it can latch to the power loader and pull it into the truck rails.

Figure 71:
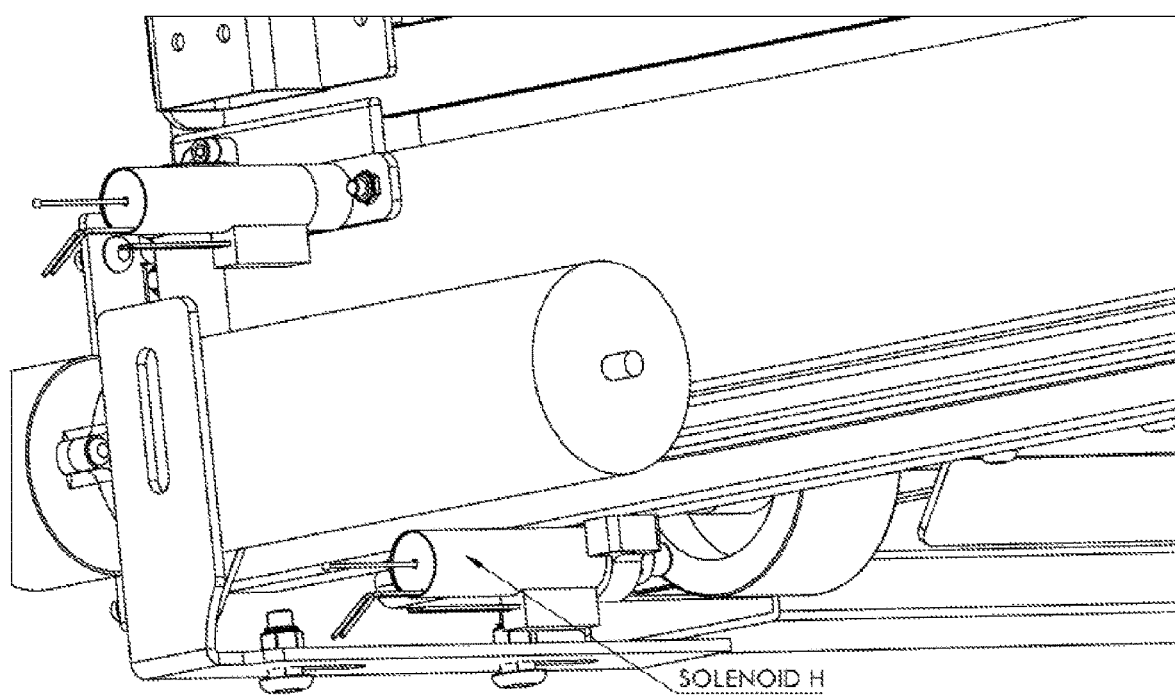

Seventh, when the power loader lifts the front of the application deck/bin for dumping it is first rolled back a short distance so that the wheels clear the bumper, solenoid H holds it in this position during the dump mode (FIG. 71).

Figure 72:
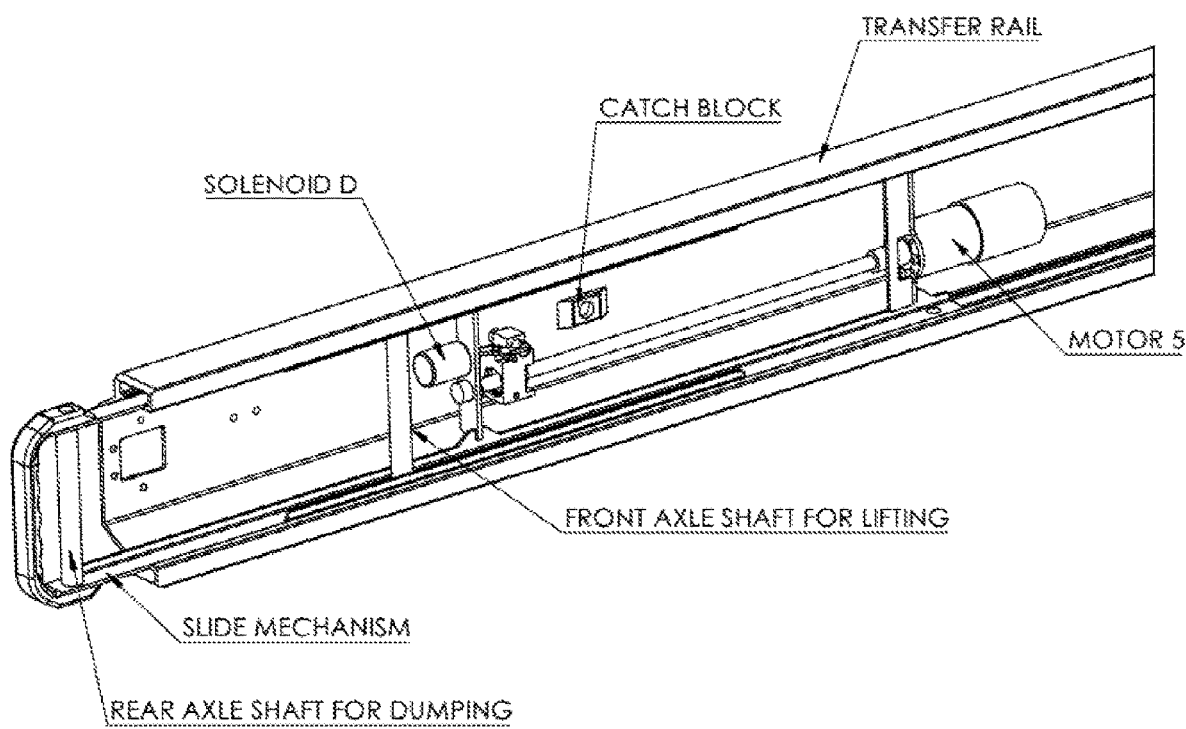
Figure 73:
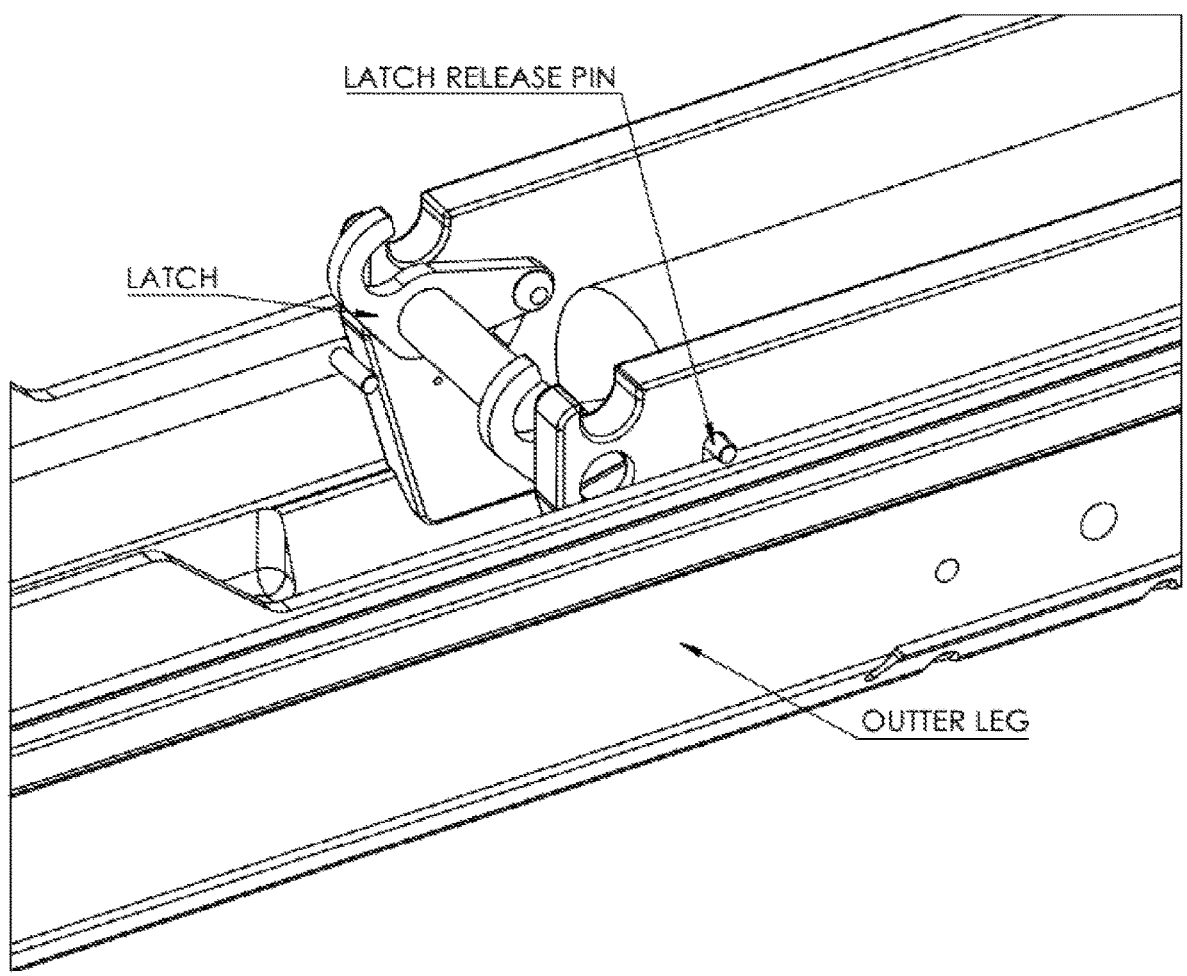

When the power loader lifts or lowers its front legs, the transfer rails remain latched to the truck rails creating a situation where the power loader must move back a short distance for the front legs to clear the truck's bumper. A slide mechanism is installed in the transfer rail and is linked to the rear leg, this allows the power loader to slide back to give the front legs clearance from the truck bumper. This slide can have a motor (motor 5) and drive screw installed in it for driving the legs back and forth automatically. This slide has two axles, the front one engages the upper inner rear leg latch (FIG. 72) during normal lifting, the rear one engages a latch at the end of the rear outer legs for dumping. These latches are described below in connection with FIGS. 73 and 74.

Figure 75:
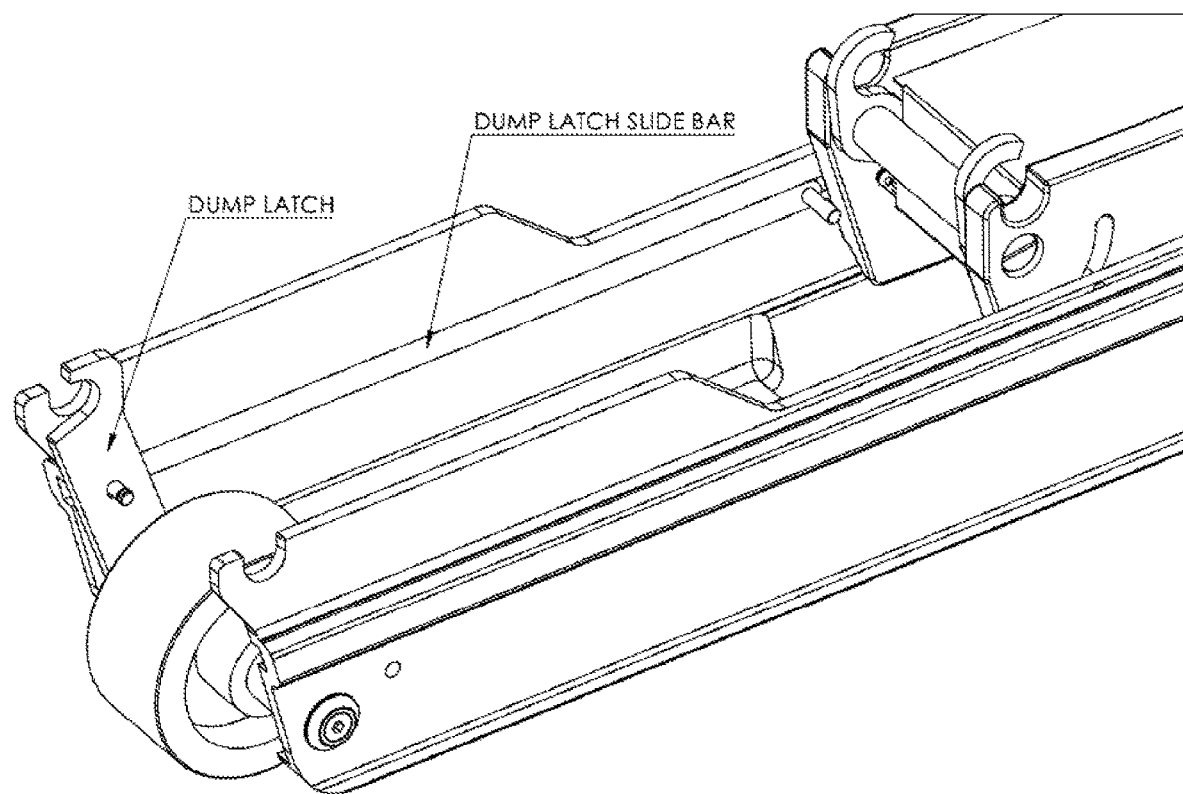

A latch is installed at the top of the rear inner leg to secure it to the forward axle in the slide mechanism during normal lifting. This latch automatically disengages when the legs nest allowing the transfer rails and application deck/bin to be lifted for loading and for dumping (FIG. 75).

Figure 74:
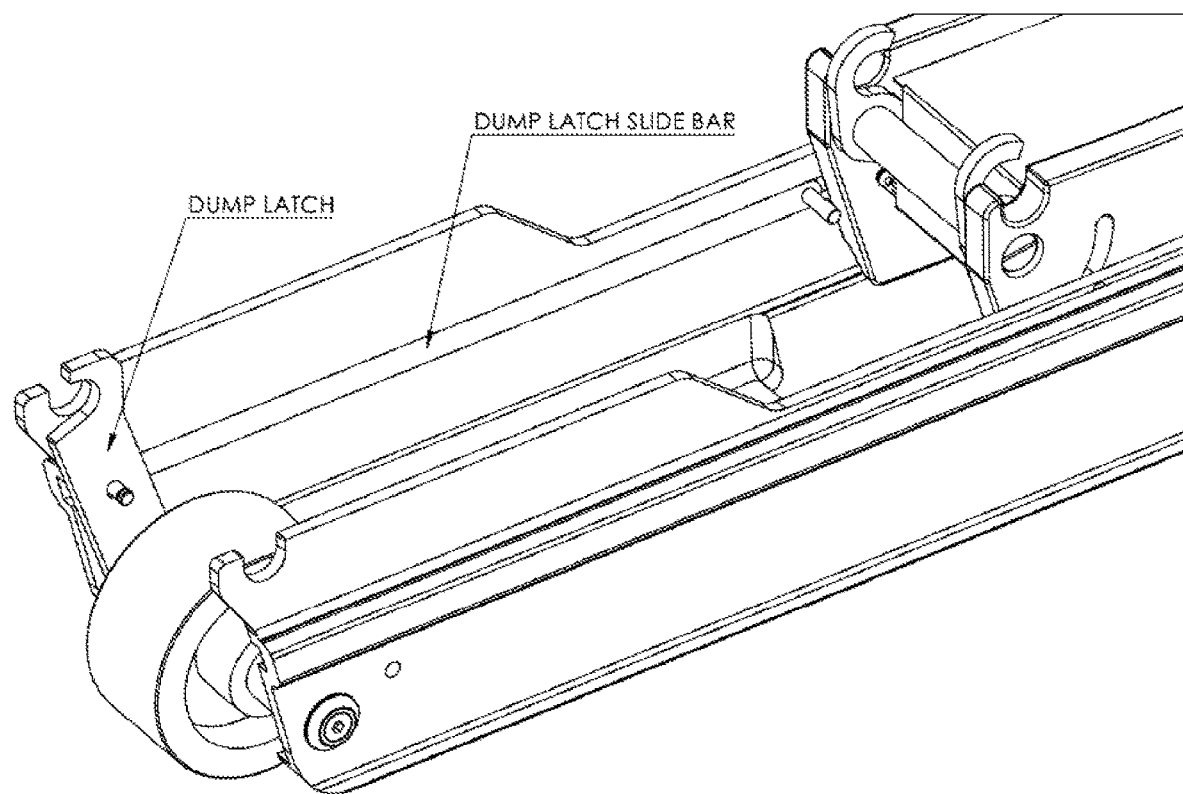

A dump slide latch is installed at the top of rear outer leg that engages the rear axle in the slide to hold the power loader from bouncing up when tilted up (in dump mode) and the truck is driven on a rough surface (FIG. 74).

A spring steel latch is installed in the transfer rail that latches the transfer rail to the upper axle of the front outer leg during dump mode. The spring tension is sufficient to hold the transfer rail against the upper leg bearing during dump but releases when the power load is lifted straight up and down (FIG. 75).

Figure 76:
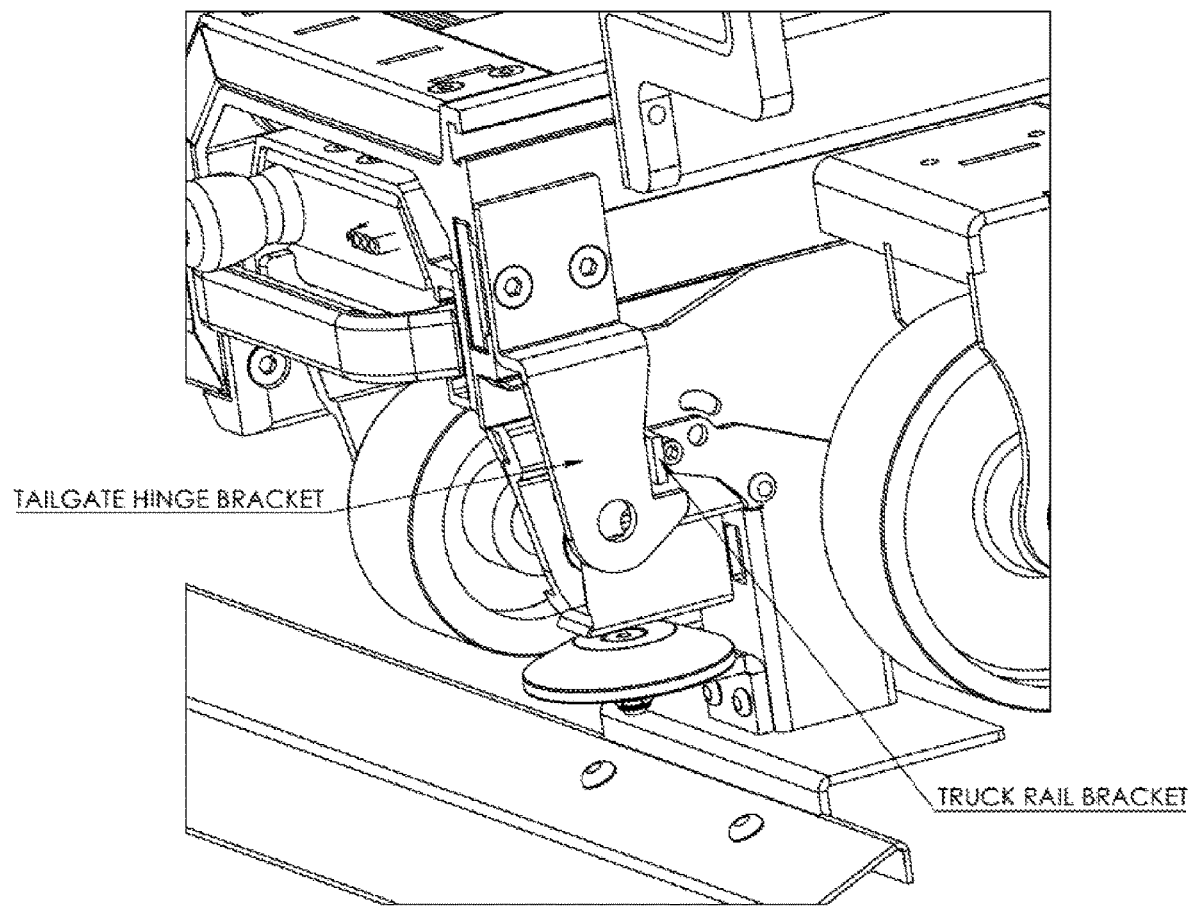

Slots in the tailgate hinge bracket engage pins in the truck rails to hold the application deck/bin down while the truck is in motion (FIG. 76).

Figure 77:
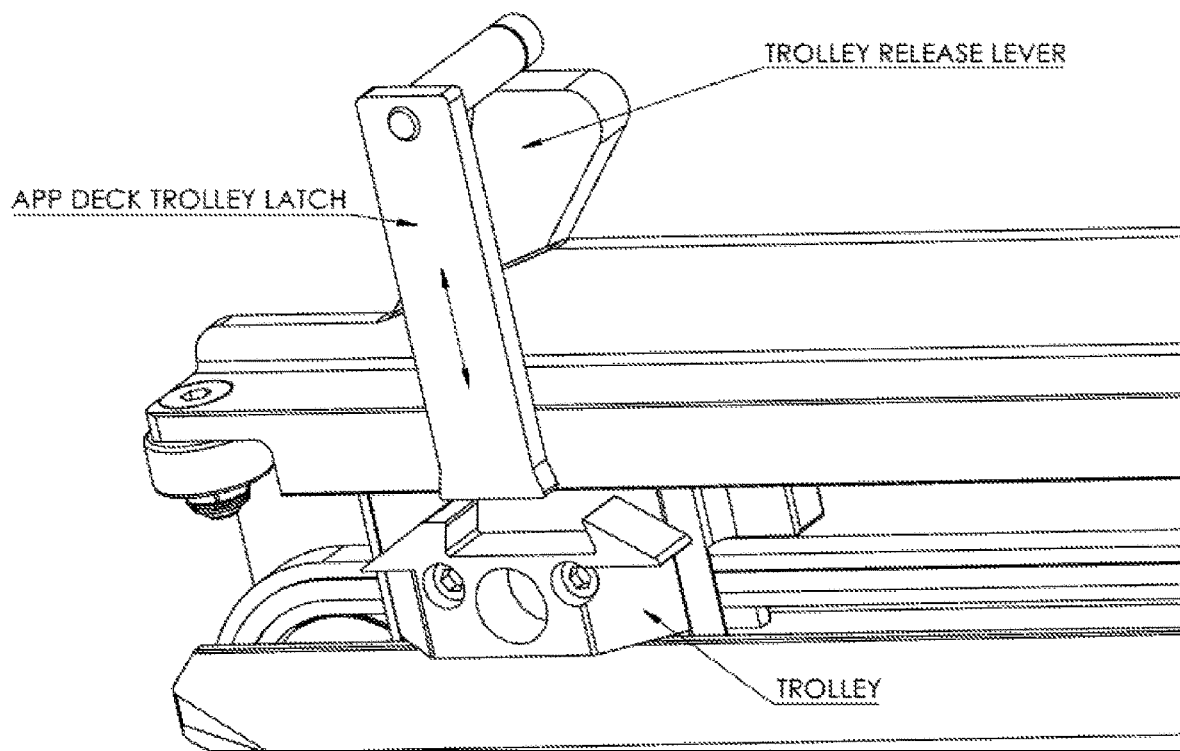
Figure 78:
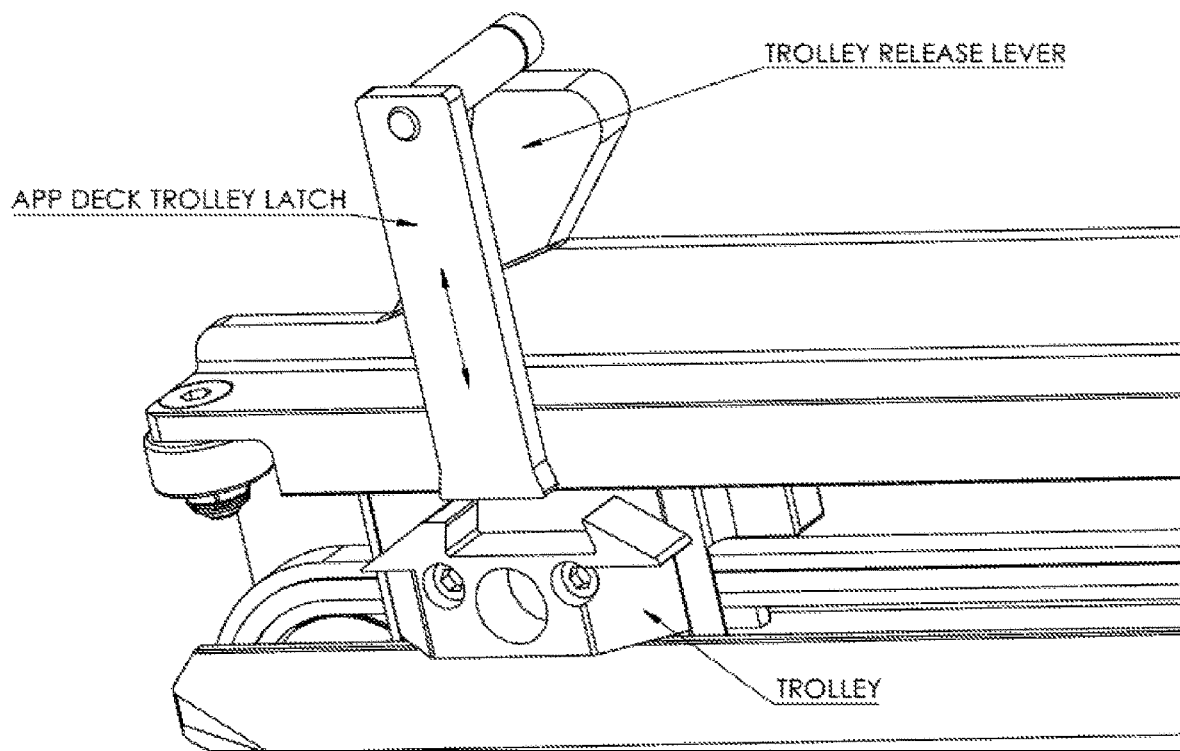

The truck rails have a trolley that is powered by a motor and chain to drive the power loader or the application deck/bin into the truck. A latch and release mechanism to the trolley are installed on both of these so they can be powered into the truck independently (FIGS. 68, 77, and 78).

The slide mechanism (with the fifth motor) that is installed in the transfer rail and connects to the power loader can selectively be attached and unattached to the transfer rail. A mechanism including solenoid D is used to do this (FIG. 79).

A pickup truck manufacturer could make a truck with channels built into the truck bed instead of in the app deck rails. This would allow an app deck to be flat without the side channels. The same power loader system and electronic controls could be used.

A pickup truck manufacturer could make a truck with channels built into the truck bed instead of in the application deck rails This would allow an application deck to be flat without the side channels. The same power loader system and electronic controls can be used.

Figure 80:
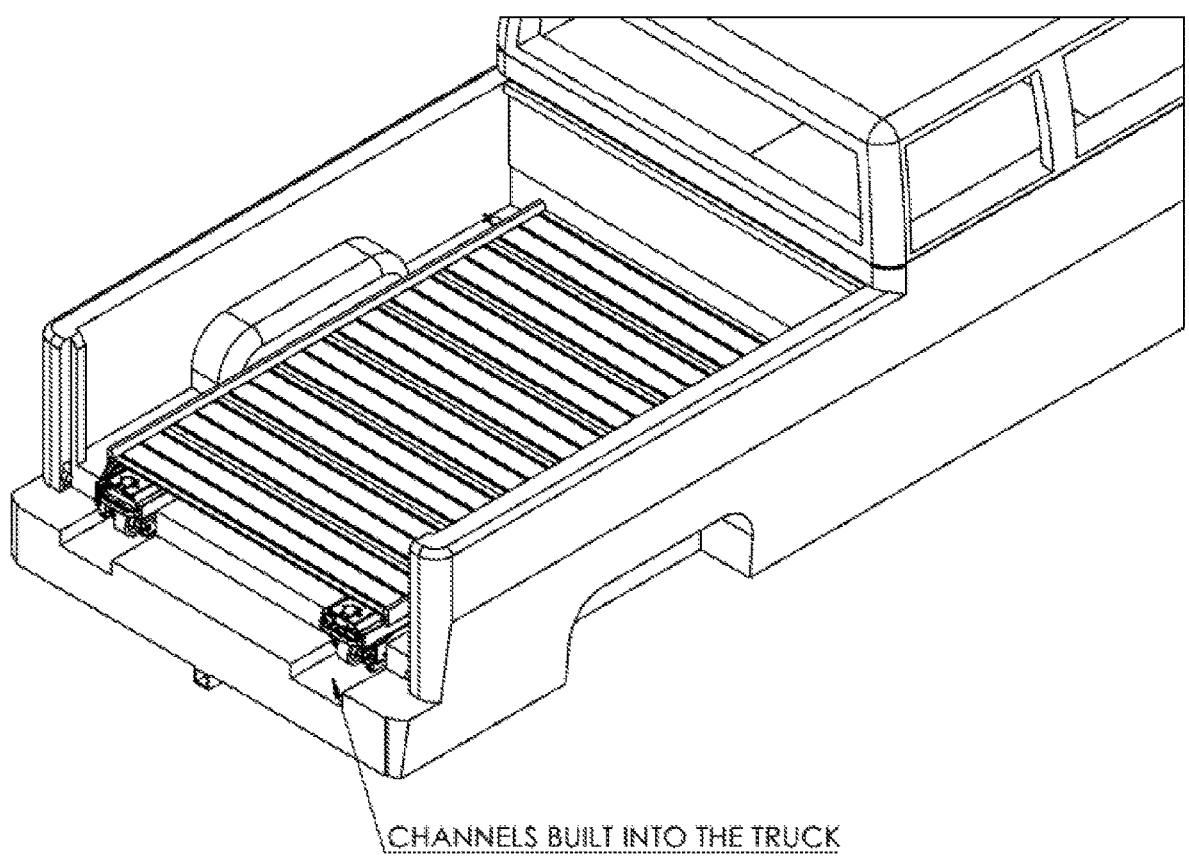
Figure 81:
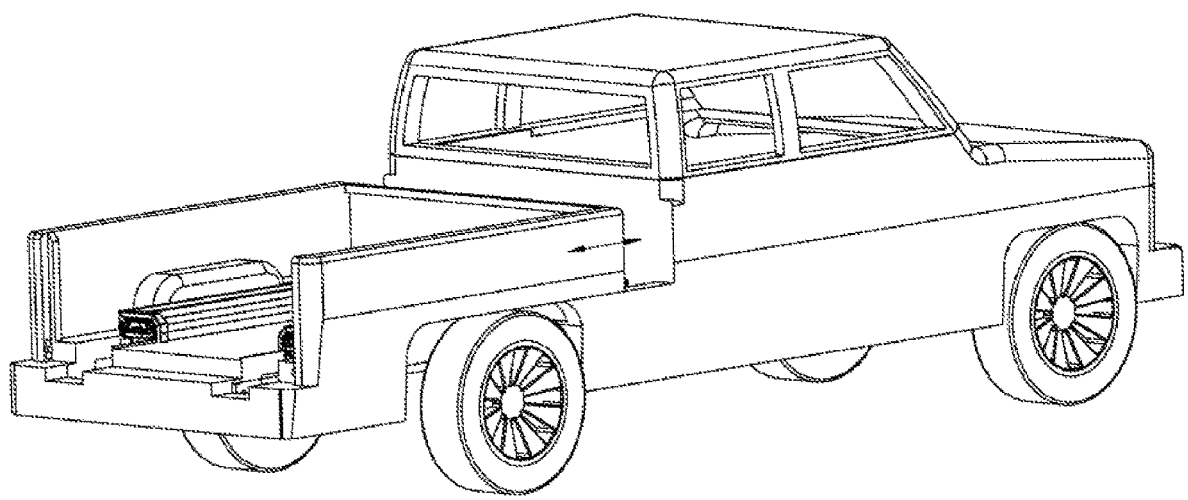

A pickup truck. Fracture could make a truck that is designed so that the entire truck bed rolls off the truck frame (FIGS. 80-81). The same power loader system and electronic controls can be used.

When using the power loader system of the present disclosure, the cargo is contained in the application deck/bin and therefore never touches the truck bed. Hence a pickup truck manufacturer could make trucks without a bed or a very simple bed made out of plastic just to stop water and dirt from coming up from the road below. This would save the manufacturer both money and weight.

Figure 82:
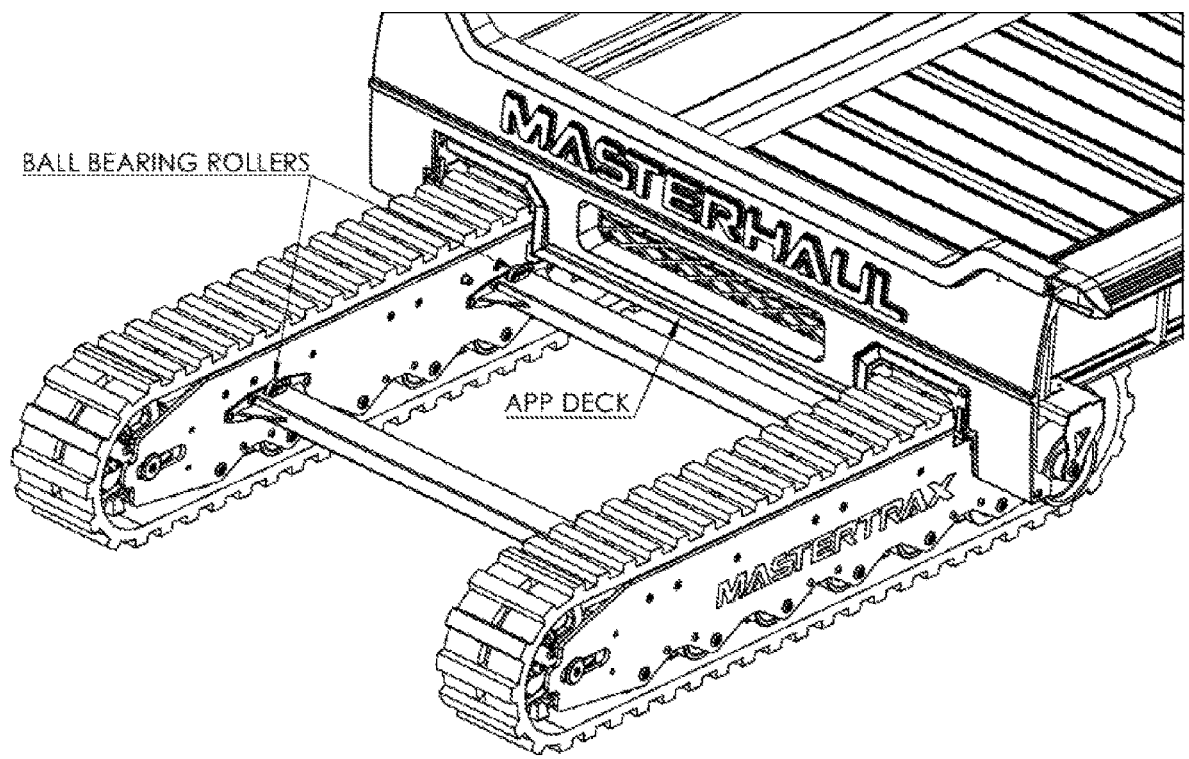

A separate rubber track device can be used to move the application deck/bin around a construction site where the surface is too rough for typical wheels to roll on. Such a device would have ball bearing rollers in the cross bars for the app deck to roll onto (FIG. 82).

Figure 83:
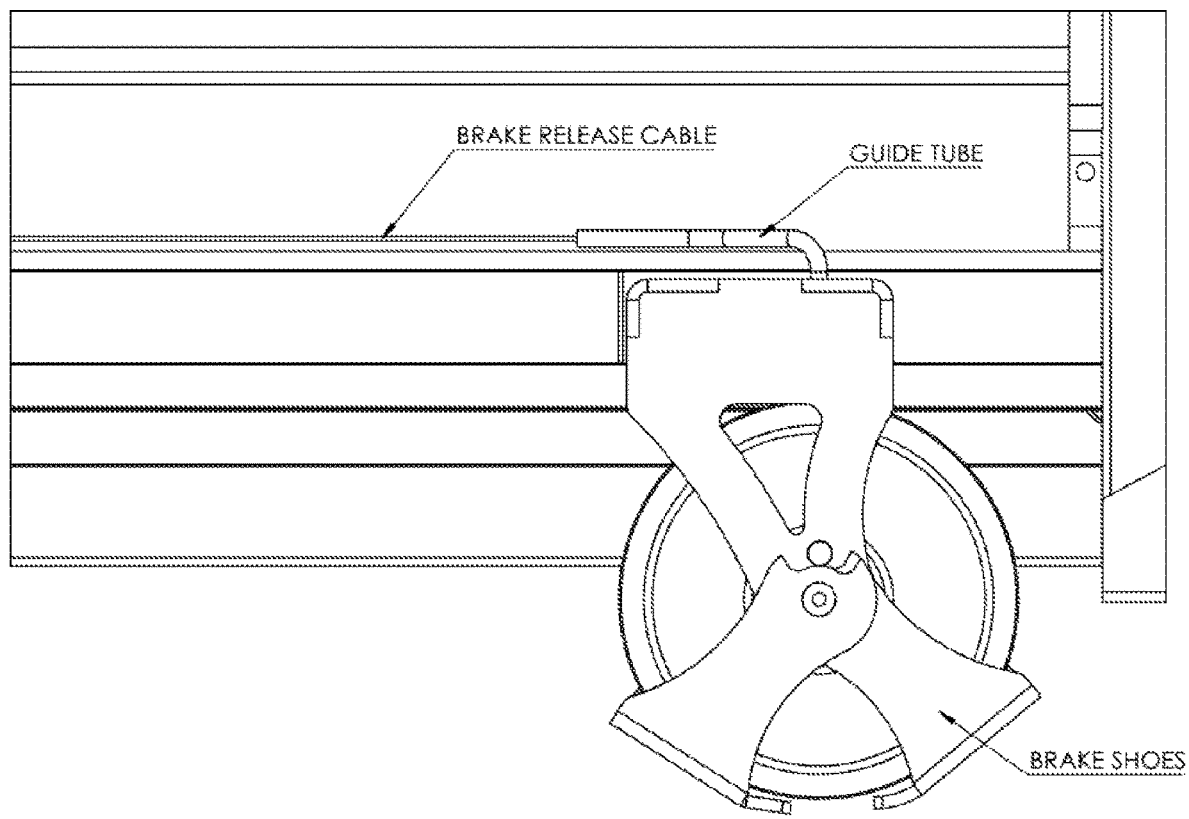
Figure 84:
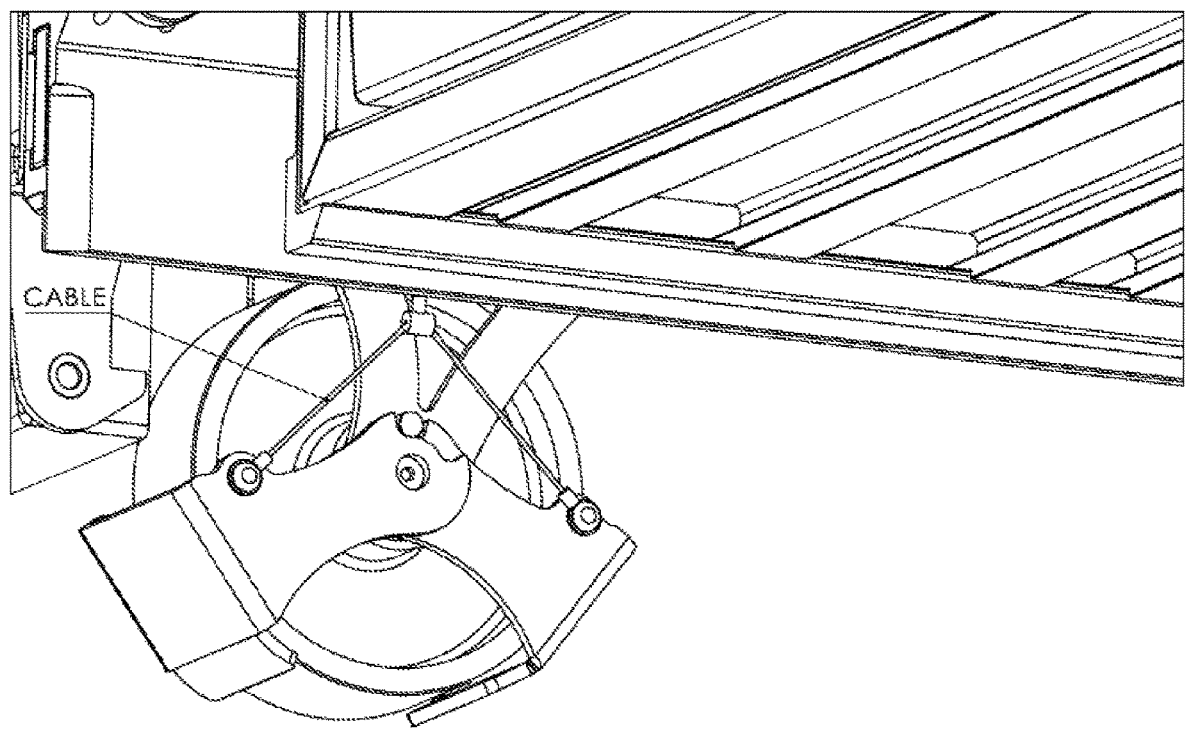
Figure 85:
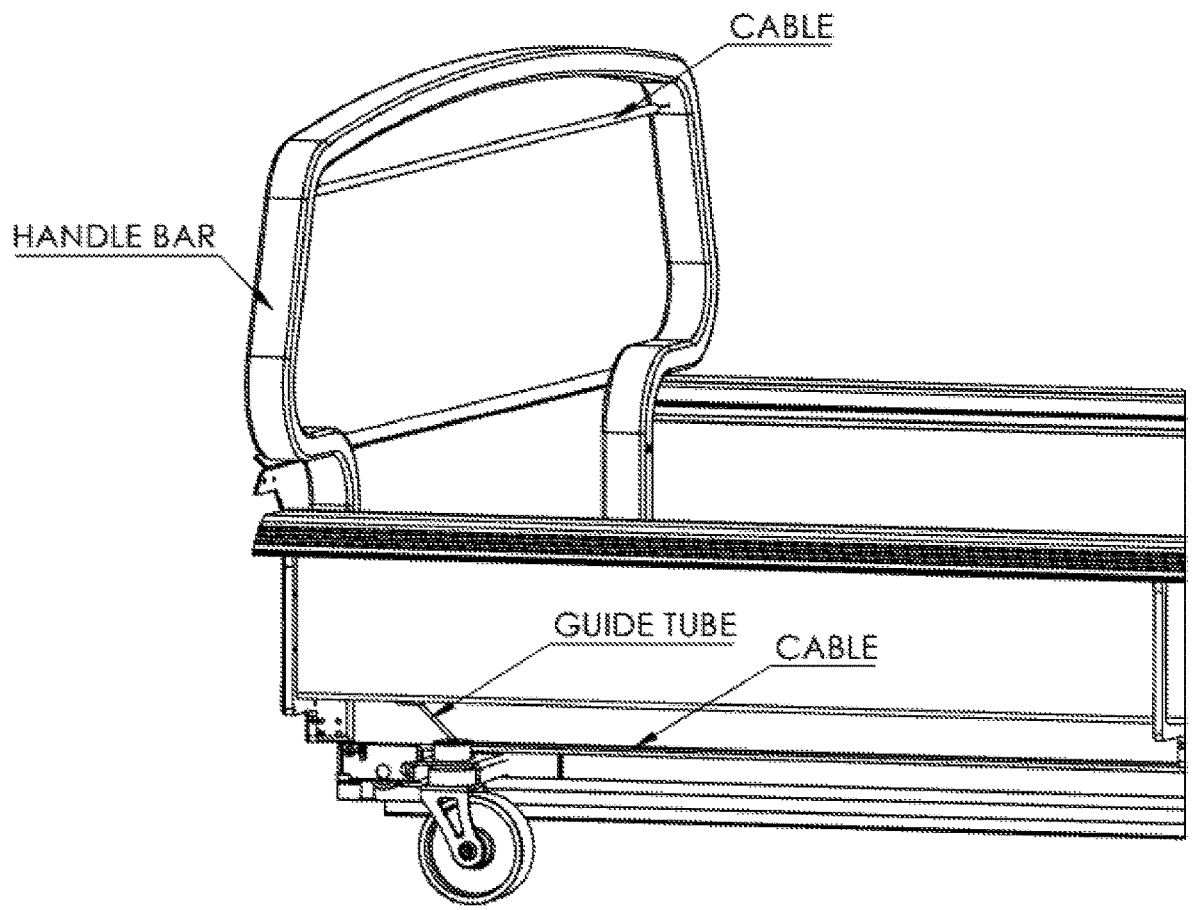
Figure 86:
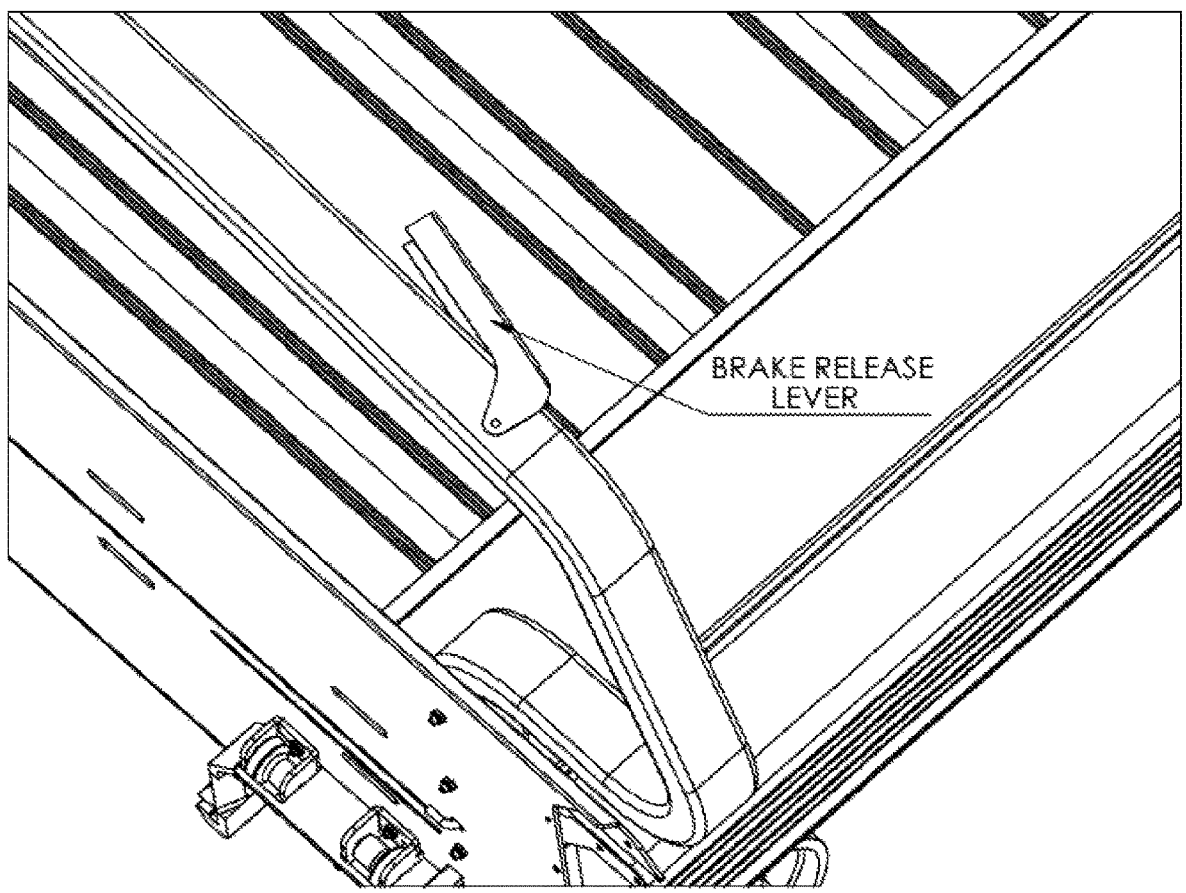
Figure 87:
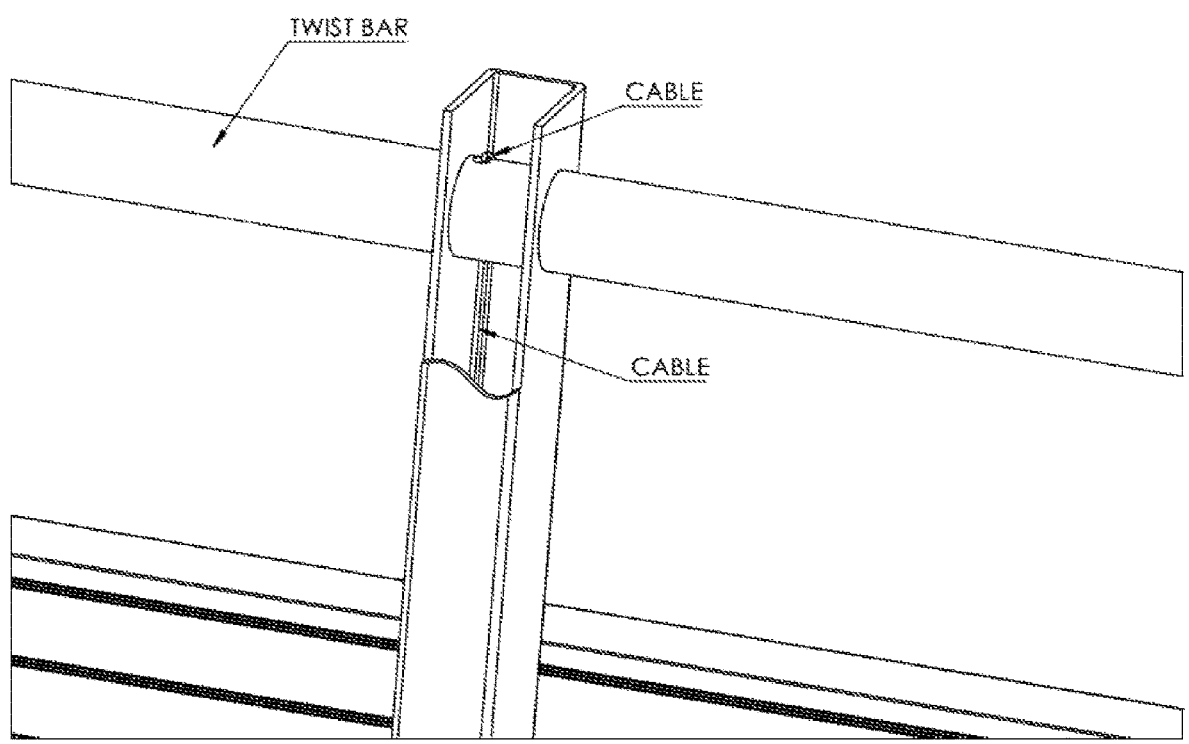

When the application deck/bin is rolled on a sloped surface it needs a brake system that engages automatically to prevent the application deck/bin from rolling downhill out of control. Brake shoes are installed over the rear wheels (FIG. 83). The rear wheels are stationary and do not slide in track 1C like the front wheels do. A cable is attached to the brake shoes to hold the shoes up (disengaged) when the application deck/bin is being pushed around (FIG. 84). This brake release cable is routed along the side the application deck and into the handle bar (FIG. 85). The operator must hold them up by pulling up on the cable (FIG. 85) or by using a lever device (FIG. 86) or by turning a twist bar (FIG. 87). If the operator lets go, the brakes come on, i.e., are applied, automatically.

Figure 88:
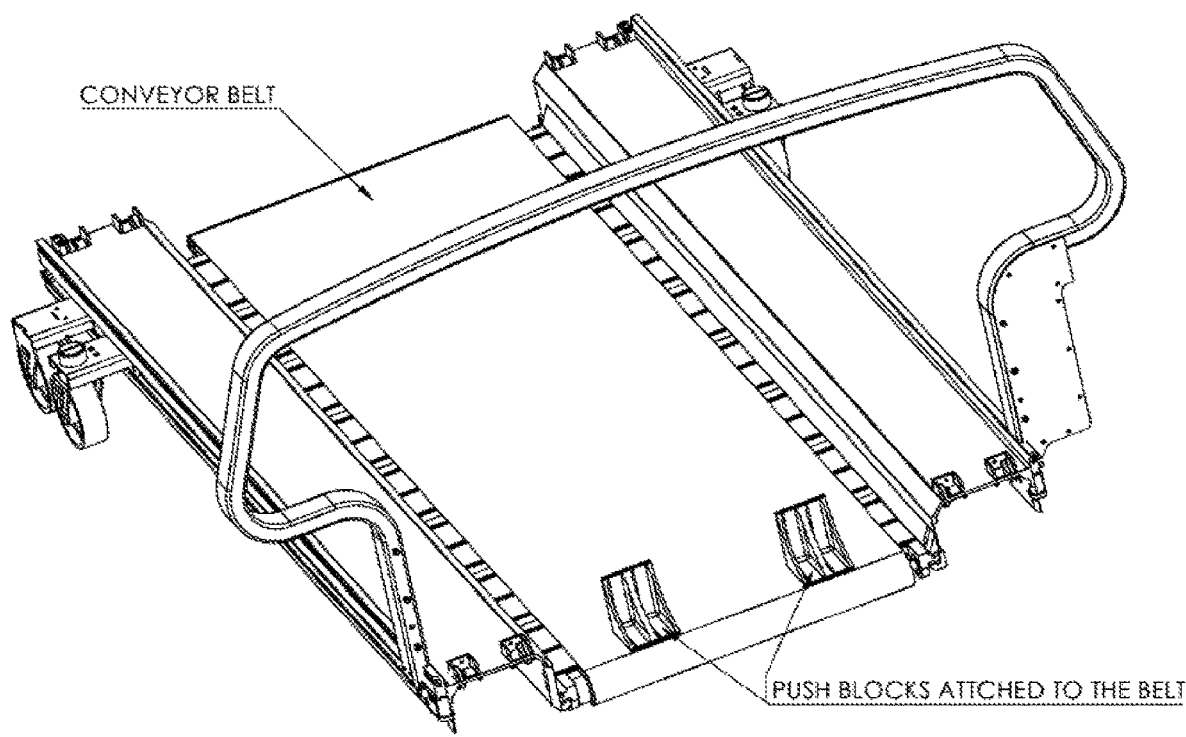
Figure 89:
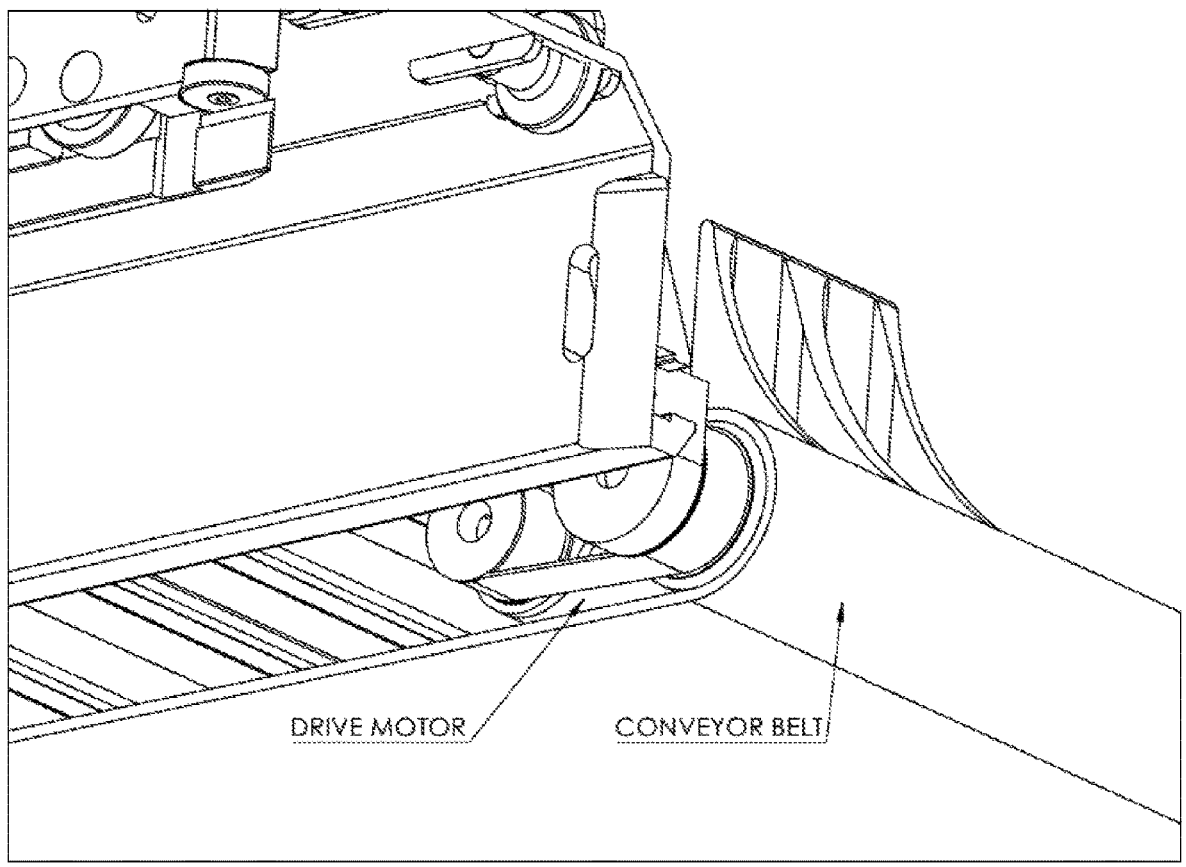
Figure 90:
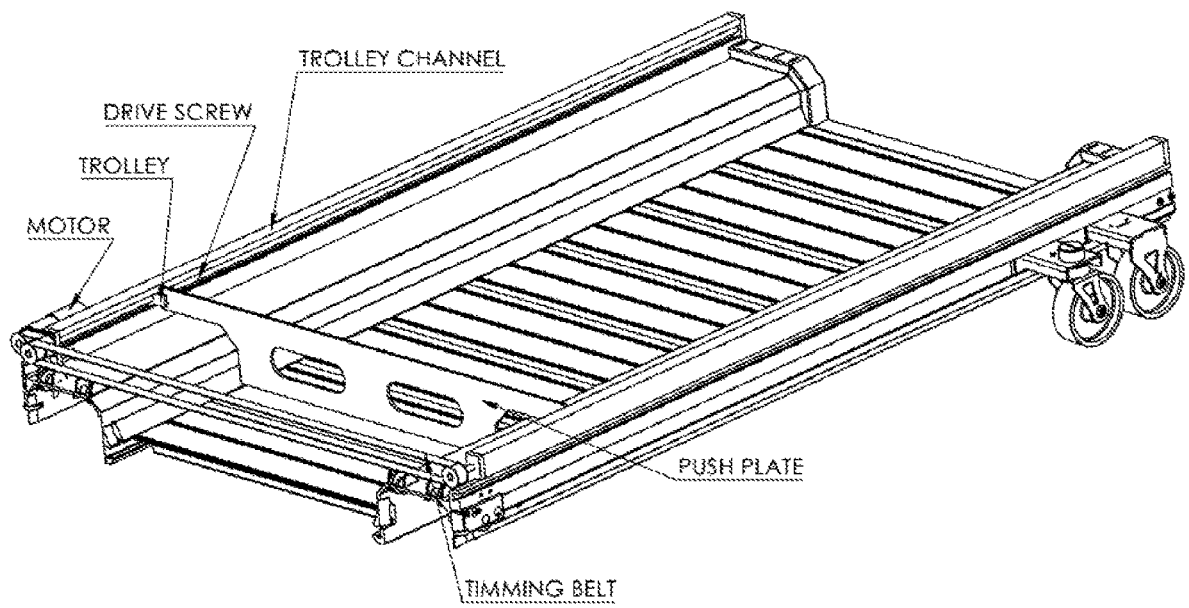

A version of the application deck for delivering packages has a motorized conveyor belt build into it for moving the cargo or packages off of it (FIG. 88). The conveyor belt could have push blocks attached to it to assure that packaged are pushed completely off the application deck (FIG. 88). A view of a preferred motor drive system is shown in FIG. 89. An alternative to a conveyor belt, a push plate could travel in channels on each side of the application deck and be motor driven to push packages off the app deck (FIG. 90).

Figure 91:
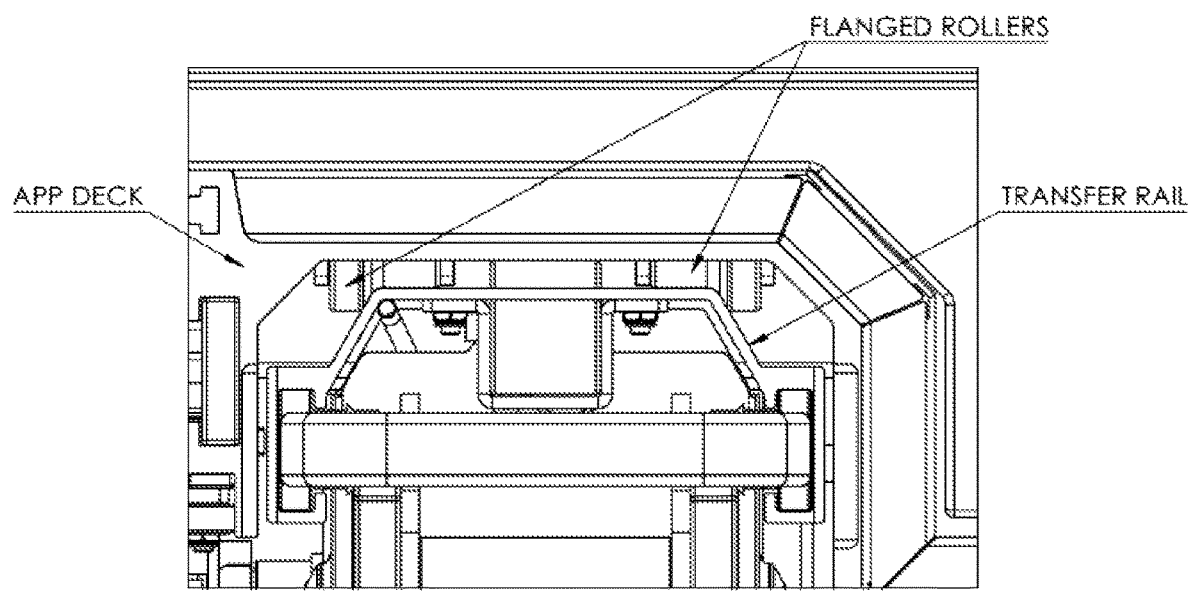

The application deck/bin has rollers under its channel for rolling on the transfer rail. These rollers have a flange on one side so that two rollers straddle the crowned top on the transfer rail. This keeps the app deck centered over the transfer rail guiding it into the truck rails (FIG. 91).

Figure 92:
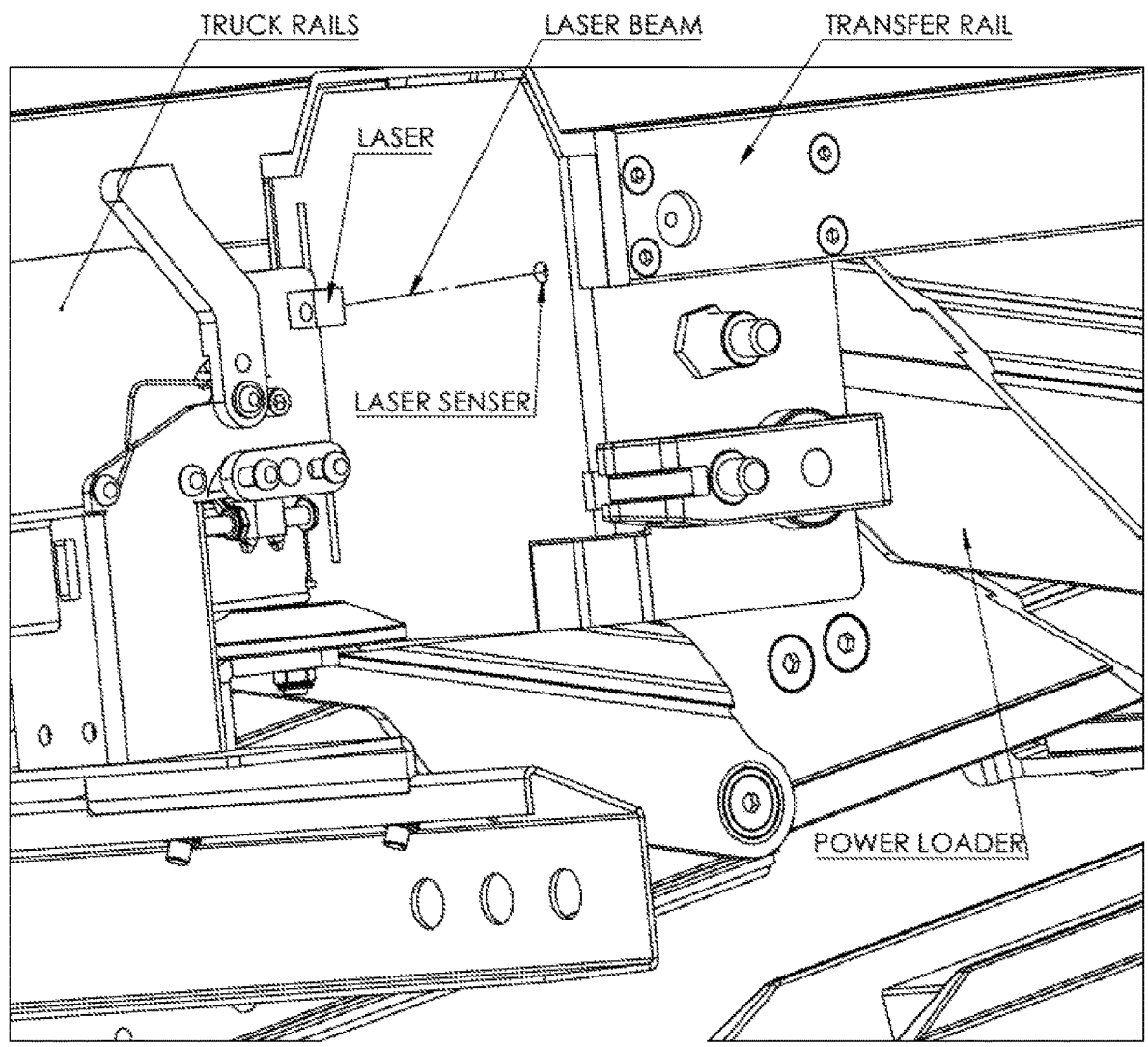

In FIG. 92, there are shown a sensor assembly operatively mounted on the transfer rails to monitor the position of the first transfer rail relative to the second transfer rail. The sensor assembly is interconnected to the first and second motors to maintain the transfer rails at the same height relative to one another. In one embodiment, the sensor assembly is an optical sensor (e.g., laser transmitter and receiver) although other type of sensors could be used. The positions of the transfer rails relative to the truck rails may also be monitored/sensed by a sensor assembly (preferably locating a transmitter on one of the truck rail/track bed or transfer rails, and the receiver on the other of the transfer rails or truck rail/track bed).

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept, or if they include equivalent structural elements with insubstantial differences.

What is claimed is:

1. A loading/unloading system for an associated cavity or vehicle bed comprising:
    first and second laterally spaced vehicle rails configured for receipt in the associated cavity or vehicle bed;
    a power loader assembly that includes (i) first and second support leg assemblies that include (ii) first and second transfer rails, respectively, that operatively cooperate with the first and second vehicle rails, respectively,
    first and second motors received on the first and second leg assemblies, respectively, and configured to selectively raise and lower the first and second transfer rails; and
    one of a bin or application deck having first and second application deck/bin rails that slidingly engage the vehicle rails, and a motor that selectively slides the bin or application deck relative to the vehicle rails.

2. The system of claim 1 further comprising a sensor assembly operatively mounted on the transfer rails to maintain the transfer rails at the same height, wherein the sensor assembly includes an optical transmitter and receiver.

3. The system of claim 2
    further comprising a second sensor assembly having a second transmitter and a second receiver and wherein the second transmitter is received on at least one of (i) the power loader assembly and (ii) the associated vehicle bed or vehicle rails, and the second receiver is received on the other of (ii) the associated vehicle bed or vehicle rails and (i) the power loader assembly.

4. The system of claim 3 wherein the first and second vehicle rails mounted in the vehicle bed slidingly receive the first and second transfer rails, respectively.

5. The system of claim 4 further comprising at least one transfer motor that selectively slides the first and second transfer rails relative to the vehicle bed.

6. The system of claim 4 wherein the first and second transfer rails and the first and second vehicle rails are extruded channels that slidingly mate the first and second transfer rails with the first and second vehicle rails, respectively.

7. The system of claim 1 further comprising third and fourth motors, and each of the first and second leg assemblies including first and second portions, the first portion of the first leg assembly dimensioned to receive the first motor, the second portion of the first leg assembly dimensioned to receive the second motor, the first portion of the second leg assembly dimensioned to receive the third motor, and the second portion of the second leg assembly dimensioned to receive the fourth motor.

8. The system of claim 1 wherein the first and second vehicle rails mounted in the vehicle bed cooperate and slidingly receive the first and second transfer rails, respectively; and
    a loading/unloading motor in each of the vehicle rails that assist in the loading and unloading of the power loader from the vehicle bed.

9. The system of claim 8 further comprising a first holding mechanism that temporarily prevents the first and second transfer rails from sliding relative to the first and second vehicle rails, respectively.

10. The system of claim 1 wherein the first and second transfer rails are mounted for movement relative to the first and second legs of the leg assemblies, respectively, during loading and unloading of the power loader assembly into the vehicle bed.

11. The system of claim 1 further comprising a second motor in the leg assemblies that selectively tilts the bin or application deck relative to the vehicle rails whereby the system is used to dump.

12. The system of claim 11 wherein the leg assemblies include front leg portions, and the system further comprising at least one load/unload motor to reciprocate a bin relative to the vehicle rails to load/unload the bin and a motor in the front leg portions that selectively tilts the bin relative to the vehicle rails whereby the system is used to dump.

13. The system of claim 12 wherein the combination load/unload motor is configured to reciprocate the bin relative to the vehicle bed independently of tilting the bin.

14. The system of claim 1 wherein the bin or application deck includes a movable conveyor belt that aids in loading/unloading cargo onto the application deck, the system further comprising a drive motor that moves the conveyor belt.

15. The system of claim 14 further comprising one of (i) a push block attached to the conveyor belt or (ii) a push plate driven by the drive motor and movable relative to the application deck for pushing cargo from the conveyor belt.

16. The system of claim 1 further comprising a powered track device having first and second continuous tracks, the power loader unloading the bin or application deck on to the track device.

17. A loading/unloading system for an associated vehicle bed comprising:
    first and second laterally spaced vehicle rails configured for receipt in the associated vehicle bed; and
    a power loader assembly that includes
    first and second support leg assemblies that include first and second transfer rails, respectively, that operatively cooperate with the first and second vehicle rails, respectively, wherein each leg assembly includes a pad and first and second spaced apart rollers, the pad of each leg assembly pivotally mounted to the respective leg assembly whereby the pad of each leg initially engages a horizontal surface prior to the first roller engaging the horizontal surface;
    first and second motors received on the first and second leg assemblies, respectively, and configured to selectively raise and lower the first and second transfer rails; and
    a sensor assembly operatively mounted on the transfer rails to monitor the position of the first transfer rail relative to the second transfer rail, the sensor assembly operatively interconnected to the first and second motors to maintain the transfer rails at the same height relative to one another.

18. A loading/unloading system for an associated vehicle bed comprising:
    first and second laterally spaced vehicle rails configured for receipt in the associated vehicle bed;
    a power loader assembly that includes (i) first and second support leg assemblies that include (ii) first and second transfer rails, respectively, that operatively cooperate with the first and second vehicle rails, respectively, first and second motors received on the first and second leg assemblies, respectively, and configured to selectively raise and lower the first and second transfer rails;

a sensor assembly operatively mounted on the transfer rails to monitor the position of the first transfer rail relative to the second transfer rail, the sensor assembly operatively interconnected to the first and second motors to maintain the transfer rails at the same height relative to one another; and one of a bin or application deck having first and second rails that slidingly engage the vehicle rails, and a third motor that selectively slides the bin or application deck relative to the vehicle rails.

19. The system of claim 18 wherein the first and second rails selectively, slidably engage with the first and second transfer rails, respectively.

20. The system of claim 19 further comprising a locking mechanism that selectively prevents the bin or application deck from sliding relative to the first and second transfer rails.

21. The system of claim 20 further comprising a detent mechanism that selectively prevents the bin or application deck from sliding relative to the vehicle bed.

22. The system of claim 18 further comprising casters mounted on the application deck.

23. The system of claim 22 wherein the vehicle rails are dimensioned to receive the casters.

24. The system of claim 23 wherein the casters, when the application deck is loaded in the vehicle bed, are mounted for limited sliding movement relative to the application deck.

25. The system of claim 24 further comprising a latch that engages a respective caster to a respective first or second rail of the application deck when the application deck is separated from the power loader assembly.

26. The system of claim 18 wherein the application deck includes a movable conveyor belt that aids in loading/unloading cargo onto the application deck.

27. The system of claim 26 further comprising a drive motor that moves the conveyor belt.

28. The system of claim 27 further comprising one of (i) a push block attached to the conveyor belt or (ii) a push bar driven by the drive motor and movable relative to the application deck for pushing cargo from the conveyor belt.

29. The system of claim 18 further comprising a powered track device having first and second continuous tracks, the power loader assembly unloading the bin or application deck on to the track device.

30. The system of claim 29 further comprising first and second crossbars extending between the tracks, and roller surfaces on the crossbars to assist with loading and unloading of the application deck on and off the track device.

* * * * *